US012812226B2

(12) United States Patent
Park et al.

(10) Patent No.: US 12,812,226 B2
(45) Date of Patent: Nov. 24, 2026

(54) CAMERA DEVICE AND OPTICAL DEVICE

(71) Applicant: LG INNOTEK CO., LTD., Seoul (KR)

(72) Inventors: Sang Ok Park, Seoul (KR); Jung Cheol Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 198 days.

(21) Appl. No.: 18/564,963

(22) PCT Filed: May 16, 2022

(86) PCT No.: PCT/KR2022/006966

§ 371 (c)(1),
(2) Date: Nov. 28, 2023

(87) PCT Pub. No.: WO2022/250355

PCT Pub. Date: Dec. 1, 2022

(65) Prior Publication Data

US 2024/0292076 A1 Aug. 29, 2024

(30) Foreign Application Priority Data

May 28, 2021 (KR) ........................ 10-2021-0068967
May 28, 2021 (KR) ........................ 10-2021-0068968
May 28, 2021 (KR) ........................ 10-2021-0069028

(51) Int. Cl.
*H04N 23/54* (2023.01)
*H04N 23/68* (2023.01)

(52) U.S. Cl.
CPC ........... *H04N 23/54* (2023.01); *H04N 23/687* (2023.01)

(58) Field of Classification Search
CPC ...... H04N 23/54; H04N 23/687; H04N 23/55; H04N 23/57; H04N 23/60; G03B 5/04; G03B 17/12; H02K 33/18
See application file for complete search history.

(56) References Cited

U.S. PATENT DOCUMENTS

2008/0310037 A1* 12/2008 Kuo ........................ H02K 33/18 359/823
2016/0139426 A1* 5/2016 Park ...................... G02B 27/646 359/557

(Continued)

FOREIGN PATENT DOCUMENTS

CN 106461908 A 2/2017
CN 110169048 A 8/2019

(Continued)

OTHER PUBLICATIONS

International Search Report dated Aug. 26, 2022 in International Application No. PCT/KR2022/006966.

(Continued)

*Primary Examiner* — Sinh Tran
*Assistant Examiner* — Zhenzhen Wu
(74) *Attorney, Agent, or Firm* — SALIWANCHIK, LLOYD & EISENSCHENK

(57) ABSTRACT

An embodiment comprises: a stationary part; a first magnet disposed in the stationary part; a first movable part including a first coil and moving in an optical-axis direction by interaction between the first magnet and the first coil; a second movable part including a first substrate portion spaced apart from the stationary part, a second coil opposite to the first magnet in the optical-axis direction, and an image sensor disposed in the first substrate portion; and a first yoke disposed in the stationary part and arranged to be opposite to the first magnet in the optical-axis direction, wherein the second movable part moves in a direction perpendicular to the optical-axis direction by interaction between the first magnet and the second coil.

19 Claims, 56 Drawing Sheets

(56) References Cited

U.S. PATENT DOCUMENTS

| | | | | |
|---|---|---|---|---|
| 2017/0336699 | A1* | 11/2017 | Hu | G03B 13/36 |
| 2019/0317298 | A1 | 10/2019 | Ichihashi | |
| 2020/0033551 | A1* | 1/2020 | Lee | G02B 7/08 |
| 2020/0033554 | A1* | 1/2020 | Chan | G03B 19/22 |
| 2020/0081221 | A1* | 3/2020 | Lee | G03B 5/00 |
| 2020/0259993 | A1* | 8/2020 | Brodie | G02B 7/09 |
| 2021/0132327 | A1* | 5/2021 | Sharma | G02B 7/09 |
| 2021/0314469 | A1* | 10/2021 | Shahparnia | H04N 23/55 |
| 2022/0035173 | A1* | 2/2022 | Min | G03B 3/10 |
| 2022/0247931 | A1* | 8/2022 | Mahmoudzadeh | G03B 3/00 |

FOREIGN PATENT DOCUMENTS

| | | | | |
|---|---|---|---|---|
| CN | 110531480 | A | 12/2019 | |
| CN | 110678803 | A | 1/2020 | |
| KR | 10-1561422 | B1 | 10/2015 | |
| KR | 10-2016-0059143 | A | 5/2016 | |
| KR | 10-2018-0033959 | A | 4/2018 | |
| KR | 10-2020-0068886 | A | 6/2020 | |
| WO | WO-2020076029 | A1 * | 4/2020 | H04N 23/57 |

OTHER PUBLICATIONS

Office Action dated Aug. 29, 2026 in Chinese Application No. 202280045977.8.

* cited by examiner

CAMERA DEVICE AND OPTICAL DEVICE

CROSS-REFERENCE TO RELATED APPLICATIONS

This application is the U.S. national stage application of International Patent Application No. PCT/KR2022/006966, filed May 16, 2022, which claims the benefit under 35 U.S.C. § 119 of Korean Application Nos. 10-2021-0068967, filed May 28, 2021; 10-2021-0068968, filed May 28, 2021; and 10-2021-0069028, filed May 28, 2021; the disclosures of each of which are incorporated herein by reference in their entirety.

TECHNICAL FIELD

Embodiments relate to a camera device and an optical instrument including the same.

BACKGROUND ART

Voice coil motor (VCM) technology, which is used in conventional general camera devices, is difficult to apply to a micro-scale camera device, which is intended to exhibit low power consumption, and study related thereto has been actively conducted.

There is increasing demand for, and production of, electronic products such as smartphones and cellular phones equipped with cameras. Cameras for cellular phones have been increasing in resolution and decreasing in size, and accordingly, actuators therefor are also becoming smaller, larger in diameter, and more multifunctional. In order to realize a high-resolution cellular phone camera, improvement in the performance of the cellular phone camera and additional functions, such as autofocus, shutter shaking prevention, and zooming in and out, are required.

DISCLOSURE

Technical Problem

Embodiments provide a camera device capable of improving electromagnetic force for AF operation and electromagnetic force for OIS operation and an optical instrument including the same.

Technical Solution

A camera device according to an embodiment includes a fixed unit, a first magnet disposed on the fixed unit, a first moving unit, which includes a first coil and is configured to be moved in an optical-axis direction by interaction between the first magnet and the first coil, a second moving unit, which includes a first board unit disposed so as to be spaced apart from the fixed unit, a second coil facing the first magnet in the optical-axis direction, and an image sensor disposed on the first board unit, and a first yoke disposed on the fixed unit so as to be opposite to the first magnet in the optical-axis direction. The second moving unit is moved in a direction perpendicular to the optical-axis direction by interaction between the first magnet and the second coil.

The first magnet may be disposed above the second coil, and the first yoke may be disposed below the second coil. The first magnet may include a first magnet part including a first N pole and a first S pole and a second magnet part including a second N pole and a second S pole and disposed under the first magnet part. A partition wall disposed between the first magnet part and the second magnet part may be included, and the partition wall may be a neutral zone. The first magnet part and the second magnet part may be spaced apart from each other. The first N pole may be in contact with the second S pole, and the first S pole may be in contact with the second N pole.

The camera device may include a second yoke disposed between the first magnet part and the second magnet part. The camera device may include a third yoke disposed on the side surface of the first magnet. The camera device may include a fourth yoke disposed on the upper surface of the second magnet. The first yoke may be a magnetic body. The camera device may include a fifth yoke disposed on the side surface of at least one of the first magnet part or the second magnet part. The first yoke may overlap at least a portion of the first magnet in the optical-axis direction.

A spacing distance between the first magnet and the second coil in the optical-axis direction may be shorter than a spacing distance between the first magnet and the first yoke in the optical-axis direction. The fixed unit may include a second board unit disposed so as to be spaced apart from the first board unit and a support board conductively connecting the first board unit to the second board unit. The first yoke may be disposed between the second coil and the second board unit. The first yoke may be disposed on the upper surface of the second board unit.

A camera device according to another embodiment includes a fixed unit, a first magnet and a yoke disposed so as to be spaced apart from each other in the fixed unit, a first moving unit including a first coil facing the first magnet in a direction perpendicular to an optical axis, and a second moving unit, which includes a first board unit disposed so as to be spaced apart from the fixed unit, an image sensor disposed on the first board unit, and a second coil facing the first magnet in the optical-axis direction. The second coil is disposed between the first magnet and the yoke, and moves the second moving unit in a direction perpendicular to the optical-axis direction through interaction with the first magnet.

A camera device according to still another embodiment includes a fixed unit, a first magnet disposed in the fixed unit, a first moving unit, which includes a first coil and is configured to be moved in an optical-axis direction by interaction between the first magnet and the first coil, a second moving unit, which includes a first board unit disposed so as to be spaced apart from the fixed unit, a second coil facing the first magnet in the optical-axis direction, and an image sensor disposed on the first board unit, and a second magnet disposed in the fixed unit so as to face the second coil in the optical-axis direction. The second moving unit is moved in a direction perpendicular to the optical-axis direction by interaction between each of the first and second magnets and the second coil.

The first magnet may be disposed above the second coil, and the second magnet may be disposed below the second coil. The first magnet may include a first magnet part including a first N pole and a first S pole and a second magnet part including a second N pole and a second S pole and disposed under the first magnet part. A partition wall disposed between the first magnet part and the second magnet part may be included, and the partition wall may be a neutral zone. The first magnet part and the second magnet part may be spaced apart from each other.

The first N pole may be in contact with the second S pole, and the first S pole may be in contact with the second N pole. At least a portion of the first magnet part may overlap the first coil in a direction perpendicular to the optical-axis direction. The length of the first magnet part in the optical-axis direction may be longer than the length of the second magnet part in the optical-axis direction.

The second coil may be disposed below the second magnet part, and the second magnet may be disposed below the second coil.

When viewed from above, each of the first magnet part and the second magnet part may include a long side and a short side, and the length of the short side of the first magnet part may be longer than the length of the short side of the second magnet part. When viewed from above, each of the first magnet part and the second magnet part may include a long side and a short side, and the length of the long side of the first magnet part may be longer than the length of the long side of the second magnet part. When viewed from above, each of the first magnet part and the second magnet part may include a long side and a short side, and the length of the long side of each of the first magnet part and the second magnet part may be longer than the length of a long side of the coil.

The camera device may include a third magnet disposed between the first magnet and the second coil and facing the second coil in the optical-axis direction.

The volume of the first magnet may be larger than the volume of the second magnet. The first magnet and the second magnet may be disposed such that opposite polarities thereof face each other in the optical-axis direction. The fixed unit may include a second board unit disposed so as to be spaced apart from the first board unit and a support board conductively connecting the first board unit to the second board unit. The second magnet may be disposed on the second board unit. The first magnet may be a monopolar-magnetized magnet including one N pole and one S pole.

A camera device according to still another embodiment includes a fixed unit, a first magnet and a second magnet disposed so as to be spaced apart from each other in the fixed unit, a first moving unit including a first coil facing the first magnet in a direction perpendicular to an optical axis, and a second moving unit, which includes a first board unit disposed so as to be spaced apart from the fixed unit, an image sensor disposed on the first board unit, and a second coil facing the first and second magnets in the optical-axis direction. The second coil is disposed between the first magnet and the second magnet, and moves the second moving unit in a direction perpendicular to the optical-axis direction through interaction with each of the first and second magnets.

A camera device according to still another embodiment includes a fixed unit, which includes a cover member and a first magnet disposed in the cover member, a first moving unit, which includes a bobbin disposed in the cover member and a first coil disposed on the bobbin and is configured to be moved in an optical-axis direction, and a second moving unit, which includes a first board unit disposed so as to be spaced apart from the fixed unit, a second coil facing the first magnet, and an image sensor disposed on the first board unit and is configured to be moved in a direction perpendicular to the optical-axis direction by interaction between the first magnet and the second coil. The cover member includes a protruding portion protruding therefrom toward the bobbin, and at least part of the protruding portion overlaps the first magnet in a direction perpendicular to the optical-axis direction.

The protruding portion may be formed of a metallic material or a magnetic material. The cover member may be formed of a metallic material or a magnetic material. The cover member may include an oxidation-resistant metal plated on a surface thereof in order to inhibit oxidation. The cover member may include an upper plate, a side plate connected to the upper plate, and a bore formed in the upper plate, and the protruding portion may extend from a region adjacent to the bore.

The protruding portion may be formed in a plate shape, and at least part of the protruding portion may include a curved portion. The bobbin may include a groove corresponding to the protruding portion, and at least part of the protruding portion may be inserted into and disposed in the groove in the bobbin. The first magnet may include a plurality of magnets, and the cover member may include a plurality of protruding portions corresponding to the plurality of magnets. The first coil may have a ring shape wound around an outer surface of the bobbin, and the protruding portion may be located inside the first coil. At least a portion of the first coil may be disposed between the protruding portion and the first magnet. The second coil may be disposed below the first magnet. The first magnet may include a first magnet part including a first N pole and a first S pole and a second magnet part including a second N pole and a second S pole and disposed under the first magnet part, and at least part of the protruding portion may overlap the first magnet part in a direction perpendicular to the optical-axis direction. The camera device may include a yoke disposed below the second coil. The camera device may include a second magnet disposed below the second coil.

A camera device according to another embodiment includes a fixed unit, which includes a cover member and a first magnet disposed in the cover member, a first moving unit, which includes a bobbin disposed in the cover member and a first coil disposed on the bobbin and is configured to be moved in an optical-axis direction, and a second moving unit, which includes a first board unit disposed so as to be spaced apart from the fixed unit, a second coil facing the first magnet, and an image sensor disposed on the first board unit and is configured to be moved in a direction perpendicular to the optical-axis direction by interaction between the first magnet and the second coil. The cover member may be formed of a metallic material.

Advantageous Effects

The embodiments may improve electromagnetic force caused by interaction between a first magnet and a second coil using a yoke disposed below the second coil, may improve OIS driving force or electromagnetic force for OIS operation, and may inhibit increase in power consumption.

In addition, the embodiments may improve electromagnetic force caused by interaction between the first magnet and a first coil and electromagnetic force caused by interaction between the first magnet and the second coil using a yoke disposed on the first magnet.

In addition, in the embodiments, since the first magnet is implemented as a bipolar-magnetized magnet, OIS electromagnetic force may be improved.

In addition, in the embodiments, since the length of a first magnet part of the first magnet is set to be longer than the length of a second magnet part thereof, electromagnetic force for AF operation may be improved, and increase in power consumption may be inhibited.

In addition, in the embodiments, since the length of the first magnet part of the first magnet is set to be longer than the length of the second magnet part thereof, the linearity of the correlation between displacement of a bobbin and an output from a first position sensor may be improved.

In addition, the embodiments may improve electromagnetic force caused by interaction with the second coil using the first magnet and the second magnet, may improve OIS driving force or electromagnetic force for OIS operation, and may inhibit increase in power consumption.

The embodiments may improve electromagnetic force caused by interaction between the first magnet and the first coil using a cover member formed of a metallic material or a magnetic material, may improve AF driving force, and may inhibit increase in power consumption.

In addition, since a protruding portion provided on the cover member disposed so as to face the first magnet serves as a yoke, electromagnetic force for AF operation may be improved, and increase in power consumption may be inhibited.

BEST MODE

Figure 1:
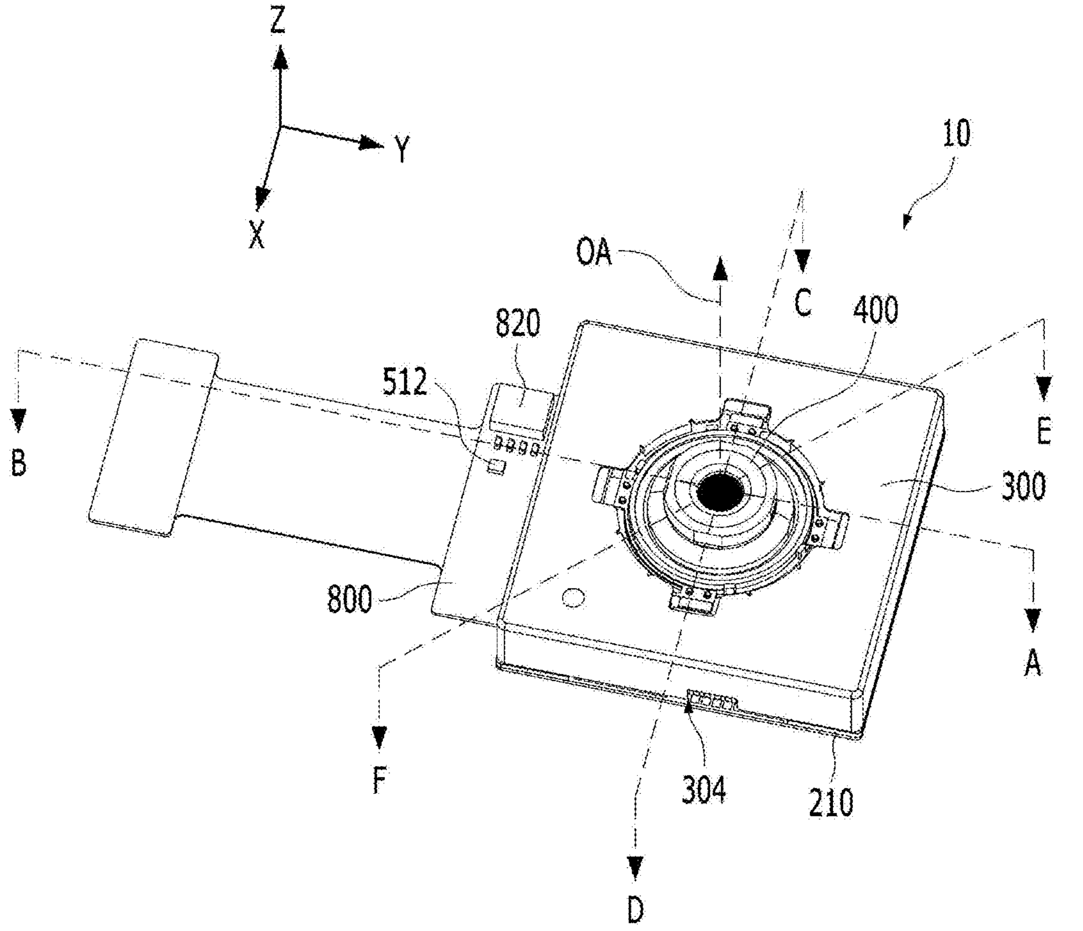
FIG. 1 is a perspective view of a camera device according to an embodiment.

Hereinafter, embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first", "second", "A", "B", "(a)", and "(b)" can be used. Such terms are only for distinguishing one component from another component, and do not determine the nature, sequence, or procedure of the corresponding constituent elements.

In addition, when it is described that a component is "connected", "coupled" or "joined" to another component, the description may include not only being directly "connected", "coupled" or "joined" to the other component but also being "connected", "coupled" or "joined" by another component between the component and the other component. In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)", it may refer to a downward direction as well as an upward direction with respect to one element.

Hereinafter, an AF moving unit may alternatively be referred to as a lens moving apparatus, a lens moving unit, a voice coil motor (VCM), an actuator, or a lens moving device. Hereinafter, a "coil" may alternatively be referred to as a coil unit, and an "elastic member" may alternatively be referred to as an elastic unit or a spring.

In addition, in the following description, a "terminal" may alternatively be referred to as a pad, an electrode, a conductive layer, or a bonding unit.

For convenience of description, a camera device according to an embodiment will be described using the Cartesian coordinate system (x,y,z), but the embodiments are not limited thereto, and may be described using other coordinate systems. In the respective drawings, the x-axis and the y-axis may be directions perpendicular to the z-axis, which is an optical-axis direction, the z-axis direction, which is the direction of the optical axis OA, may be referred to as a "first direction", the x-axis direction may be referred to as a "second direction", and the y-axis direction may be referred to as a "third direction". For example, the first direction may be a direction perpendicular to an image-capturing area of an image sensor.

The camera device according to the embodiment may perform an "autofocus function". Here, the autofocus function is a function of automatically focusing an image of a subject on the surface of an image sensor.

Hereinafter, the camera device may alternatively be referred to as a "camera module", a "camera", a "photographing device", or a "lens moving device".

In addition, the camera device according to the embodiment may perform a "hand-tremor compensation function". Here, the hand-tremor compensation function is a function of inhibiting the contour of a captured still image from being blurred due to vibration caused by shaking of a hand of a user when capturing the still image.

Figure 2:
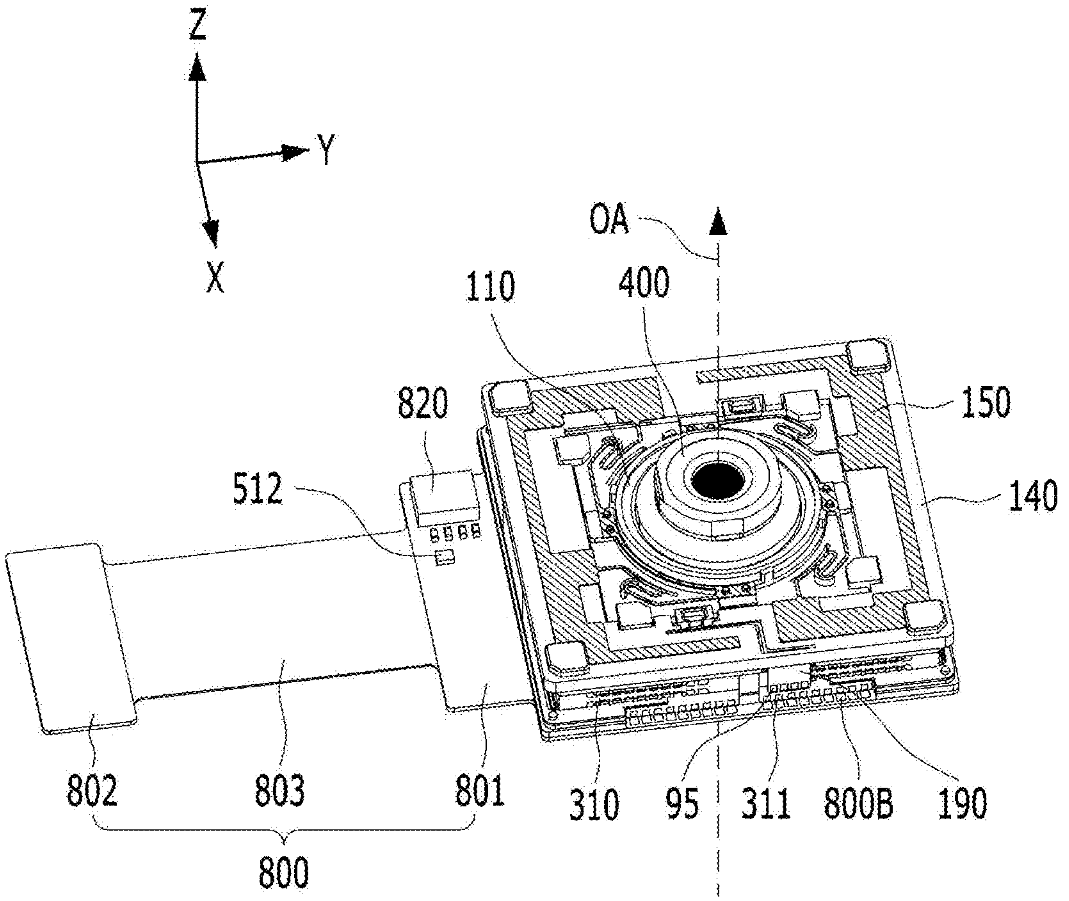
FIG. 2 is a perspective view of the camera device, with a cover member removed therefrom.
Figure 3:
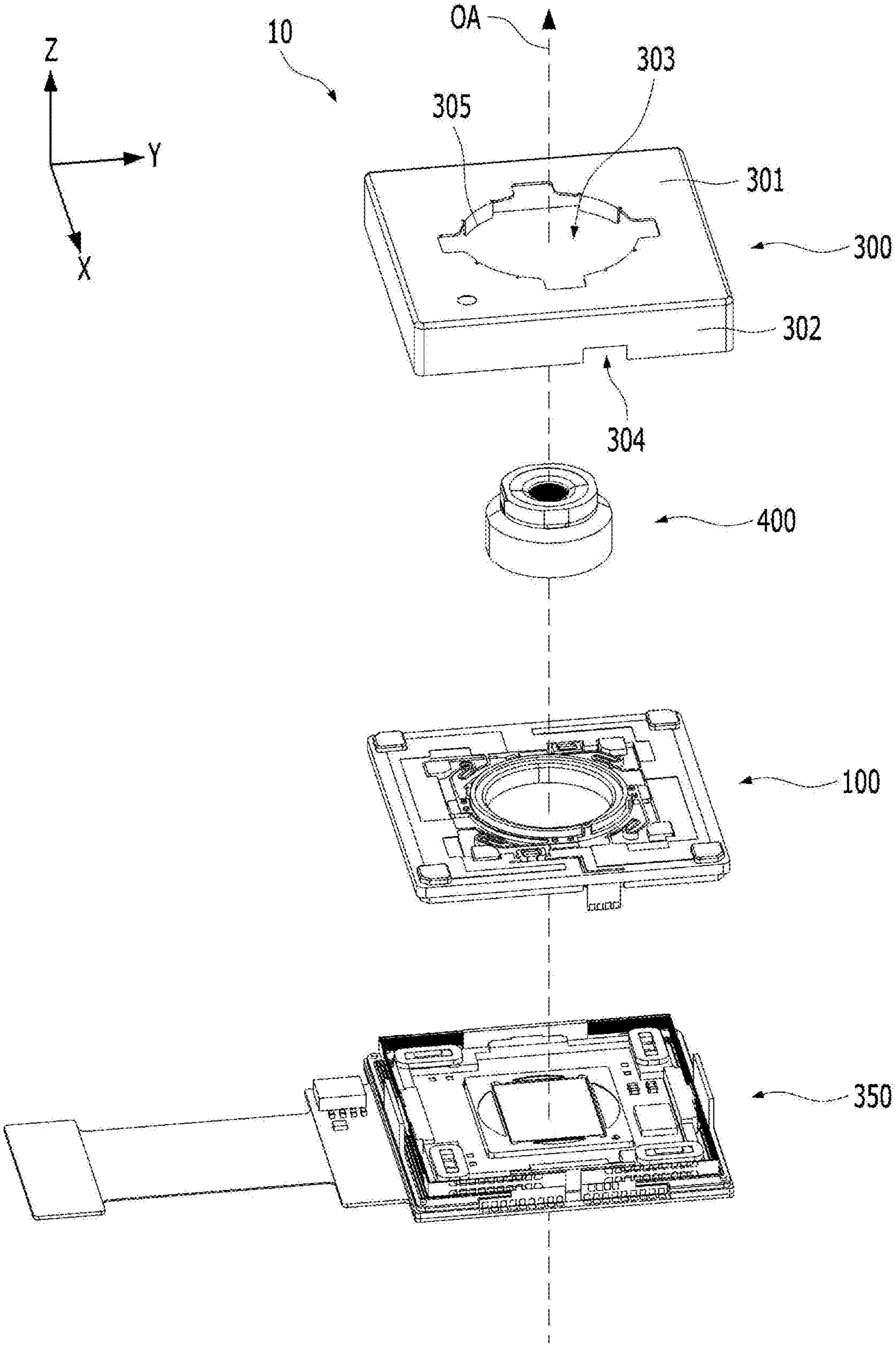
FIG. 3 is an exploded perspective view of the camera device in FIG. 1.
Figure 4A:
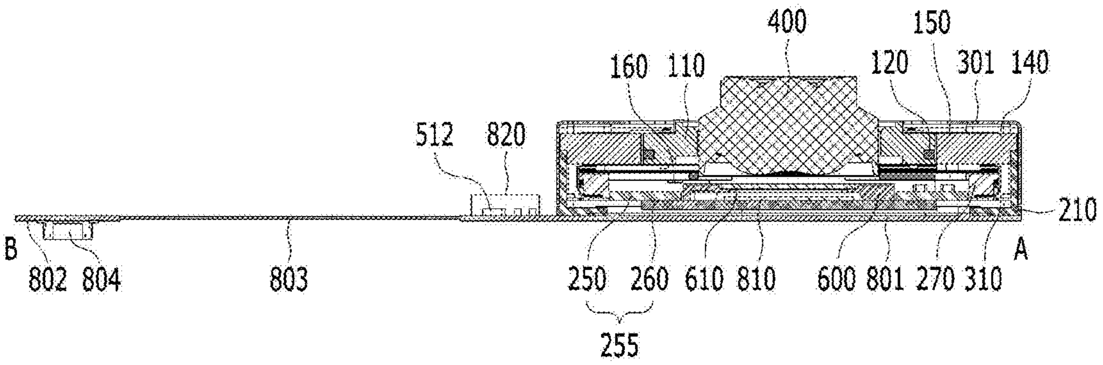
FIG. 4A is a cross-sectional view taken along line AB in the camera device in FIG. 1.
Figure 4B:
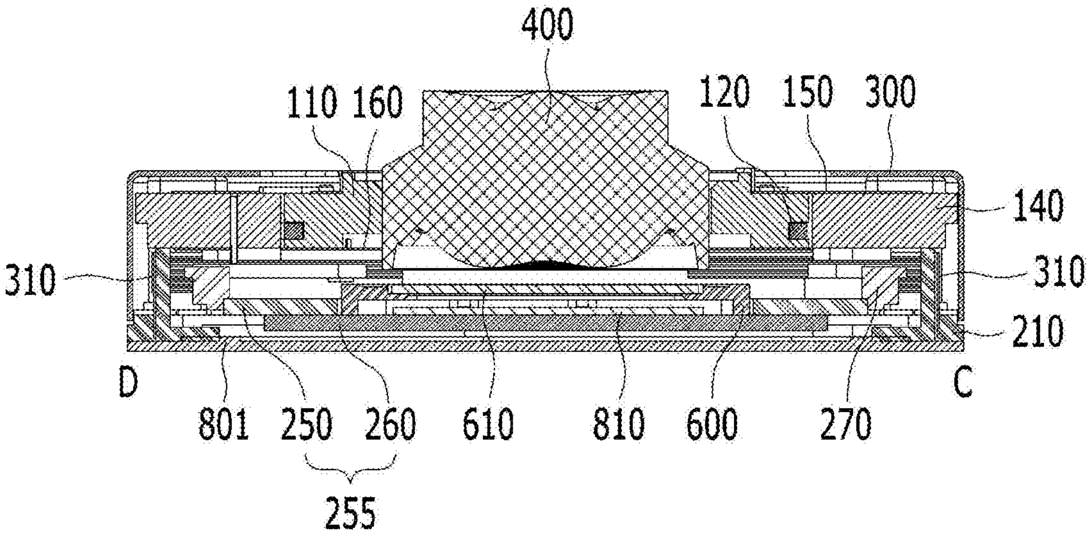
FIG. 4B is a cross-sectional view taken along line CD in the camera device in FIG. 1.
Figure 4C:
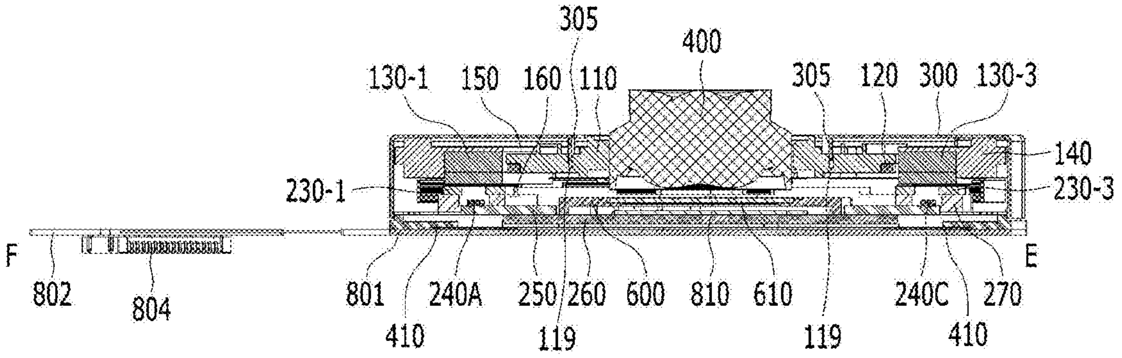
FIG. 4C is a cross-sectional view taken along line EF in the camera device in FIG. 1.
Figure 5:
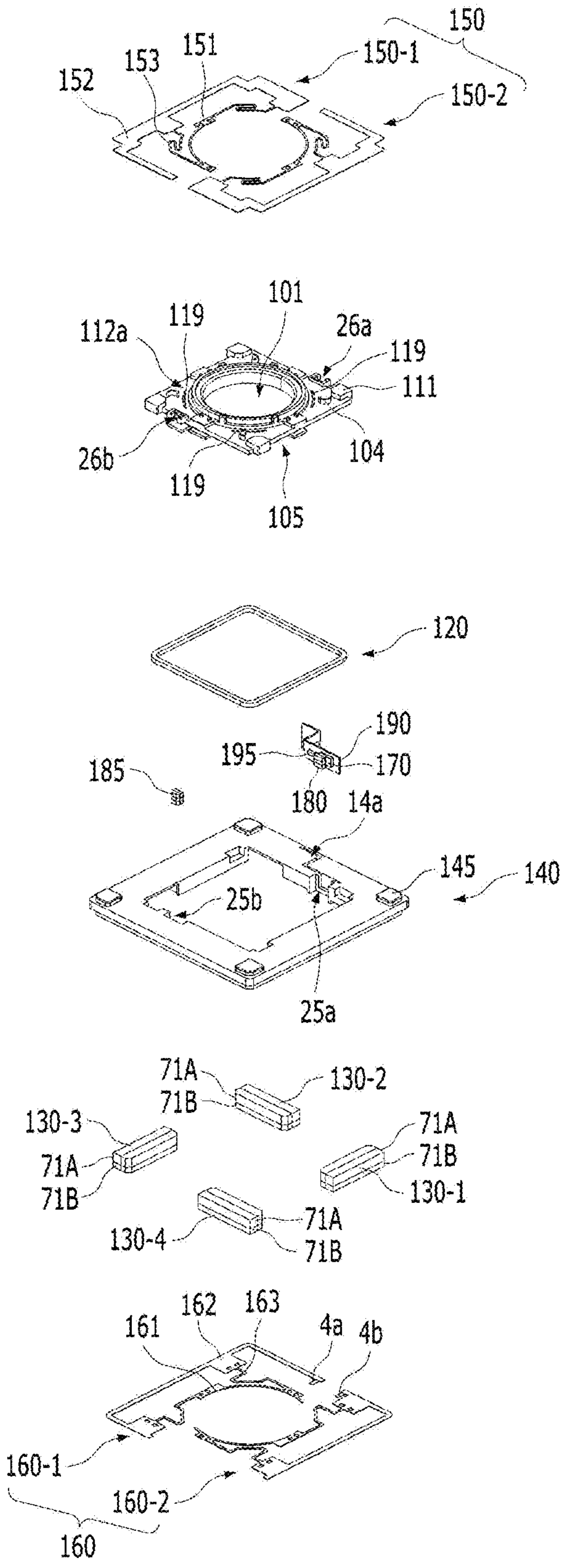
FIG. 5 is an exploded perspective view of the AF moving unit in FIG. 3.
Figure 6:
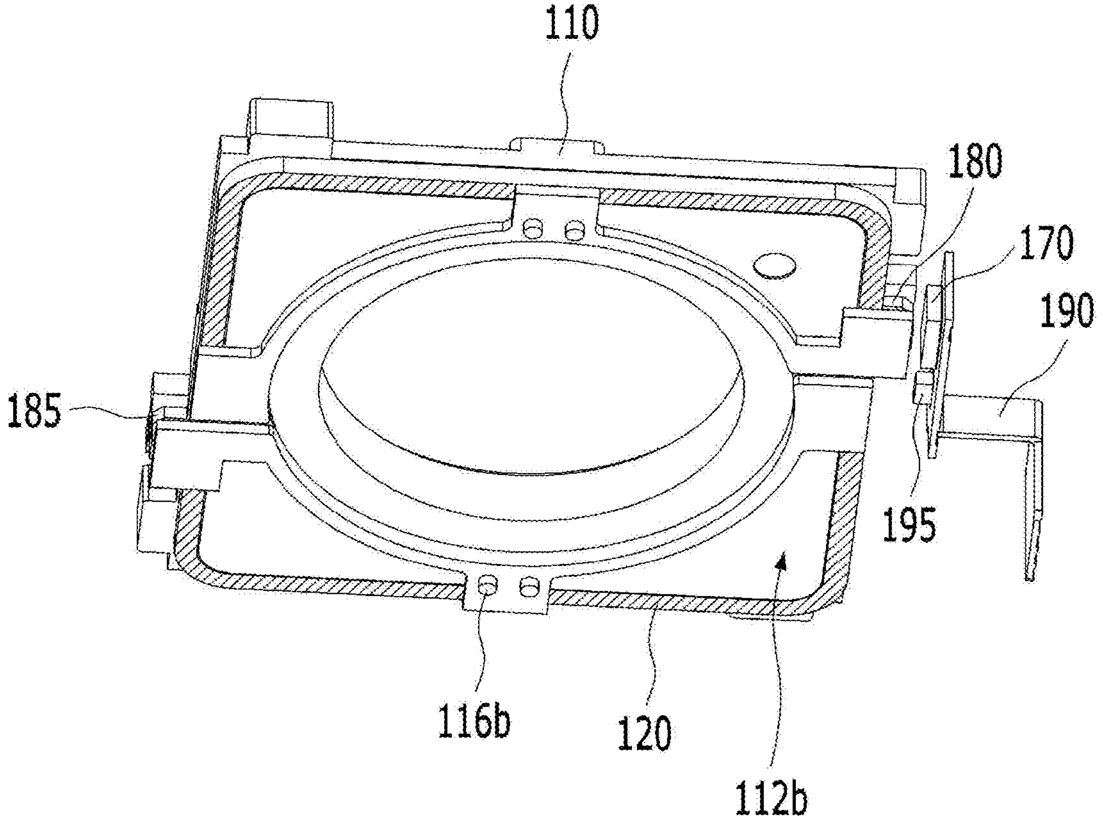
FIG. 6 is a perspective view of a bobbin, a sensing magnet, a balancing magnet, a first coil, a circuit board, a first position sensor, and a capacitor.
Figure 7:
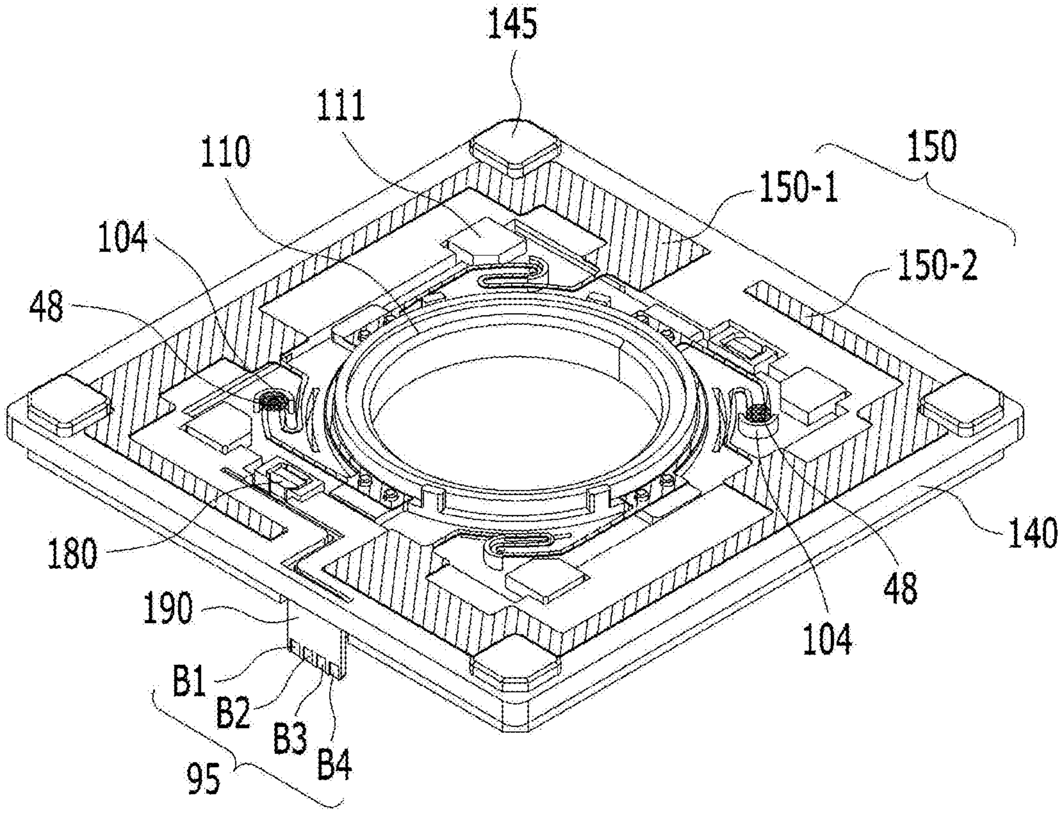
FIG. 7 is a perspective view of the bobbin, a housing, the circuit board, an upper elastic member, the sensing magnet, and the balancing magnet.
Figure 8:
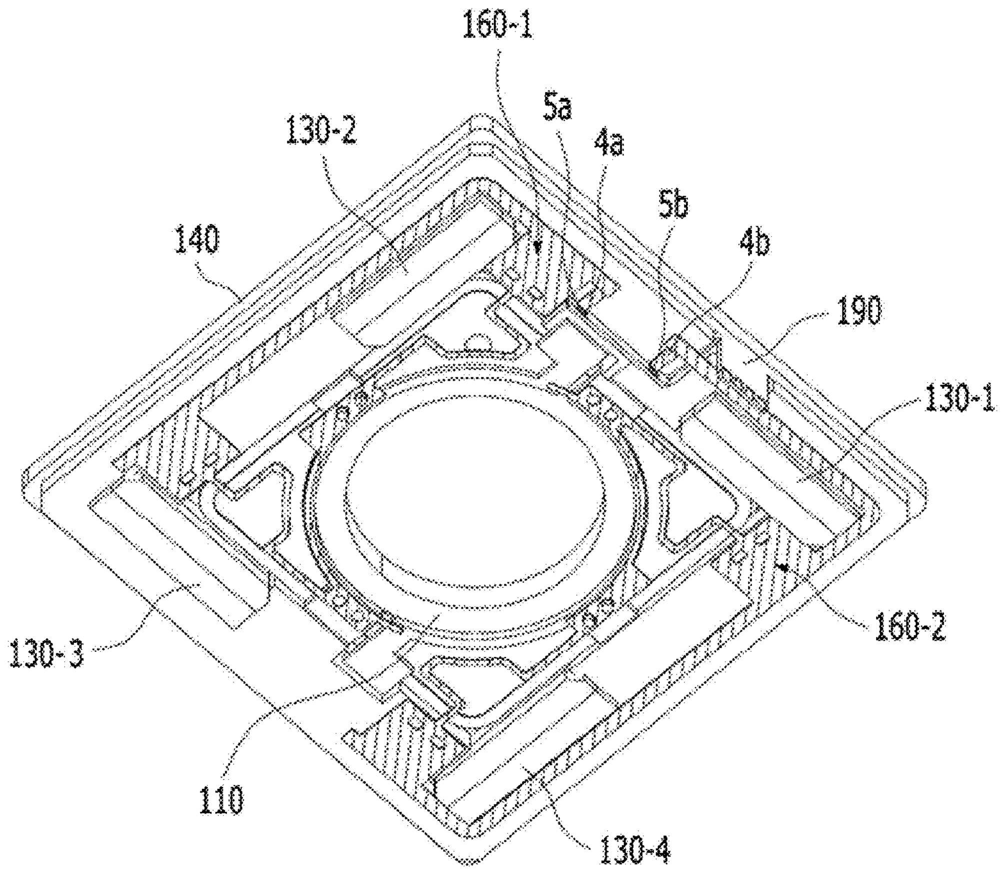
FIG. 8 is a bottom perspective view of the housing, the bobbin, a lower elastic member, a magnet, and the circuit board.

FIG. 1 is a perspective view of a camera device 10 according to an embodiment, FIG. 2 is a perspective view of the camera device 10, with a cover member 300 removed therefrom, FIG. 3 is an exploded perspective view of the camera device 10 in FIG. 1, FIG. 4A is a cross-sectional view taken along line AB in the camera device 10 in FIG. 1, FIG. 4B is a cross-sectional view taken along line CD in the camera device 10 in FIG. 1, FIG. 4C is a cross-sectional view taken along line EF in the camera device 10 in FIG. 1, FIG. 5 is an exploded perspective view of an AF moving unit 100 in FIG. 3, FIG. 6 is a perspective view of a bobbin 110, a sensing magnet 180, a balancing magnet 185, a first coil 120, a circuit board 190, a first position sensor 170, and a capacitor 195, FIG. 7 is a perspective view of the bobbin 110, a housing 140, the circuit board 190, an upper elastic member 150, the sensing magnet 180, and the balancing magnet 185, and FIG. 8 is a bottom perspective view of the housing 140, the bobbin 110, a lower elastic member 160, a magnet 130, and the circuit board 190.

Referring to FIGS. 1 to 8, the camera device 10 may include an AF moving unit 100 and an image sensor unit 350.

The camera device 10 may further include at least one of a cover member 300 or a lens module 400. The cover member 300 and a base 210 to be described later may constitute a case.

The AF moving unit 100 may be coupled to a lens module 400, and may move the lens module in the direction of the optical axis OA or a direction parallel to the optical axis, thereby performing the autofocus function of the camera device 10.

The image sensor unit 350 may include an image sensor 810. The image sensor unit 350 may move the image sensor 810 in a direction perpendicular to the optical axis. In addition, the image sensor unit 350 may tilt the image sensor 810 with respect to the optical axis or may rotate the image sensor 810 about the optical axis. The hand-tremor compensation function of the camera device 10 may be performed by the image sensor unit 350.

In an example, the image sensor 810 may include an image-capturing area for sensing of light that has passed through the lens module 400. Here, the image-capturing area may alternatively be referred to as an effective area, a light-receiving area, or an active area. For example, the image-capturing area of the image sensor 810 may be a portion into which light that has passed through a filter 610 is introduced so as to form an image contained in the light, and may include at least one pixel.

The AF moving unit 100 may alternatively be referred to as a "lens moving unit" or a "lens moving apparatus". Alternatively, the AF moving unit 100 may be referred to as a "first moving unit (or second moving unit)", a "first actuator (or second actuator)", or an "AF driving unit".

In addition, the image sensor unit 350 may alternatively be referred to as an "image sensor moving unit", an "image sensor shift unit", a "sensor moving unit", or a "sensor shift unit". Alternatively, the image sensor unit 350 may be referred to as a "second moving unit (or first moving unit)", a "second actuator (or first actuator)", or an "OIS driving unit".

Referring to FIG. 5, the AF moving unit 100 may include a bobbin 110, a first coil 120, a magnet 130, and a housing 140.

The AF moving unit 100 may further include an upper elastic member 150 and a lower elastic member 160.

In addition, the AF moving unit 100 may further include a first position sensor 170, a circuit board 190, and a sensing magnet 180 in order to implement AF feedback. In addition, the AF moving unit 100 may further include at least one of a balancing magnet 185 or a capacitor 195.

The bobbin 110 may be disposed in the housing 140, and may be moved in the direction of the optical axis OA or the first direction (e.g., the Z-axis direction) by electromagnetic interaction between the first coil 120 and the magnet 130.

The bobbin 110 may have a bore formed therein in order to be coupled to the lens module 400 or to mount the lens module 400 therein. In an example, the bore in the bobbin 110 may be a through-hole formed through the bobbin 110 in the optical-axis direction, and may have a circular shape, an elliptical shape, or a polygonal shape, without being limited thereto.

The lens module 400 may include at least one lens and/or a lens barrel.

For example, the lens module 400 may include one or more lenses and a lens barrel accommodating the one or more lenses. However, the disclosure is not limited thereto. Any of various holding structures may be used in place of the lens barrel, so long as the same is capable of supporting one or more lenses.

In an example, the lens module 400 may be screwed to the bobbin 110. Alternatively, in another example, the lens module 400 may be coupled to the bobbin 110 by means of an adhesive (not shown). Meanwhile, light that has passed through the lens module 400 may pass through the filter 610, and may be introduced into the image sensor 810.

The bobbin 110 may be provided on the outer surface thereof with a protruding portion 111. In an example, the protruding portion 111 may protrude in a direction parallel to a line perpendicular to the optical axis OA. However, the disclosure is not limited thereto.

The protruding portion 111 of the bobbin 110 may correspond to a recessed portion **25*a* in the housing 140, and may be inserted into or disposed in the recessed portion 25*a* in the housing 140. The protruding portion 111 may suppress or inhibit the bobbin 110 from rotating beyond a predetermined range about the optical axis. In addition, the protruding portion 111 may serve as a stopper for inhibiting the bobbin 110 from moving beyond a predetermined range in the optical-axis direction (e.g., the direction from the upper elastic member 150 toward the lower elastic member 160**) due to external impact or the like.

The bobbin 110 may have a first escape recess **112*a* formed in the upper surface thereof to avoid spatial interference with a first frame connection portion 153 of the upper elastic member 150. In addition, the bobbin 110 may have a second escape recess 112*b* formed in the lower surface thereof to avoid spatial interference with a second frame connection portion 163 of the lower elastic member 160**.

The bobbin 110 may include a first coupling portion **116*a* in order to be coupled or secured to the upper elastic member 150. In an example, the first coupling portion of the bobbin 110** may take the form of a protrusion, but the disclosure is not limited thereto. In another embodiment, the first coupling portion of the bobbin may take the form of a flat surface or a recess.

In addition, the bobbin 110 may include a second coupling portion **116*b* in order to be coupled or secured to the lower elastic member 160. In an example, the second coupling portion 116*b*** may take the form of a protrusion, but the disclosure is not limited thereto. In another embodiment, the second coupling portion may take the form of a flat surface or a recess.

Referring to FIG. 6, the bobbin 110 may have a recess formed in the outer surface thereof to allow the first coil 120 to be seated therein, inserted thereinto, or disposed therein. The recess in the bobbin 110 may have a closed curve shape (e.g., a ring shape), which coincides with the shape of the first coil 120.

In addition, the bobbin 110 may have a first seating recess **26*a* formed therein to allow the sensing magnet 180 to be seated therein, inserted thereinto, secured thereto, or disposed therein. In addition, the bobbin 110 may have a second seating recess 26*b* formed in the outer surface thereof to allow the balancing magnet 185 to be seated therein, inserted thereinto, secured thereto, or disposed therein. In an example, the first and second seating recesses 26*a* and 26*b* in the bobbin 110 may be formed in the outer surfaces of the bobbin 110** that face each other.

Referring to FIGS. 5 and 7, the bobbin 110 may be provided with a protrusion 104 protruding from the upper surface thereof so as to correspond to the first frame connection portion 153 of the upper elastic member 150. In an example, the protrusion 104 may protrude from the bottom surface of the first escape recess in the bobbin 110.

A damper 48 may be disposed between the protrusion 104 and the first frame connection portion 153 of the upper elastic member 150. The damper 48 may be in contact with and attached to the protrusion 104 of the bobbin 110 and the first frame connection portion 153, and may serve to alleviate or absorb vibration of the bobbin 110. For example, the damper 48 may be embodied as a damping member (e.g., silicone). The protrusion 104 may serve to guide the damper 48.

The bobbin 110 may have a groove 119 or a groove portion formed in the upper surface thereof at a position corresponding to, facing, or overlapping the protruding portion 305 of the cover member 300 in the first direction (or the optical-axis direction). In an example, the groove 119 may be formed so as to be depressed into the bottom surface of the first escape recess 112*a*.

In another embodiment, the groove 119 may be formed so as to be depressed into the upper surface of the bobbin 110.

The first coil 120 may be disposed on or coupled to the bobbin 110. In an example, the first coil 120 may be disposed on the outer surface of the bobbin 110. In an example, the first coil 120 may surround the outer surface of the bobbin 110 in the direction of rotation about the optical axis OA, but the disclosure is not limited thereto.

The first coil 120 may be directly wound around the outer surface of the bobbin 110, but the disclosure is not limited thereto. In another embodiment, the first coil 120 may be wound around the bobbin 110 using a coil ring, or may be embodied as a coil block having an angled ring shape.

Power or a driving signal may be supplied to the first coil 120. The power or the driving signal supplied to the first coil 120 may be a DC signal, an AC signal, or a signal containing both DC and AC components, and may be of a voltage type or a current type.

When a driving signal (e.g., driving current) is supplied to the first coil 120, electromagnetic force may be generated by electromagnetic interaction with the magnet 130, and the bobbin 110 may be moved in the direction of the optical axis OA by the generated electromagnetic force.

At the initial position of an AF operation unit, the bobbin 110 may be movable upward or downward, which is referred to as bidirectional driving of the AF operation unit. Alternatively, at the initial position of the AF operation unit, the bobbin 110 may be movable upward, which is referred to as unidirectional driving of the AF operation unit.

For example, the maximum stroke of the bobbin 110 in the upward direction from the initial position thereof may be 400 micrometers to 500 micrometers, and the maximum stroke of the bobbin 110 in the downward direction from the initial position thereof may be 100 micrometers to 200 micrometers.

At the initial position of the AF operation unit, the first coil 120 may be disposed so as to correspond to or overlap the magnet 130, which is disposed in the housing 140, in a direction parallel to a line that is perpendicular to the optical axis OA and extends through the optical axis.

In an example, the AF operation unit may include the bobbin 110 and components coupled to the bobbin 110 (e.g., the first coil 120, the sensing magnet 180, and the balancing magnet 185). In addition, the AF operation unit may further include the lens module 400.

The initial position of the AF operation unit may be the original position of the AF operation unit in the state in which no power is supplied to the first coil 120 or a position at which the AF operation unit is located as the result of the upper and lower elastic members 150 and 160 being elastically deformed due only to the weight of the AF operation unit. In addition, the initial position of the bobbin 110 may be a position at which the AF operation unit is located when gravity acts in the direction from the bobbin 110 toward the base 210 or when gravity acts in the direction from the base 210 toward the bobbin 110.

The sensing magnet 180 may provide a magnetic field, which is to be detected by the first position sensor 170, and the balancing magnet 185 may cancel out the influence of the magnetic field of the sensing magnet 180 and may establish weight equilibrium with the sensing magnet 180.

The sensing magnet 180 may alternatively be referred to as a “sensor magnet” or a “second magnet”. The sensing magnet 180 may be disposed on the bobbin 110, or may be coupled to the bobbin 110. The sensing magnet 180 may be disposed so as to face the first position sensor 170. The balancing magnet 185 may be disposed on the bobbin 110, or may be coupled to the bobbin 110. In an example, the balancing magnet 185 may be disposed opposite the sensing magnet 180.

In an example, each of the sensing magnet 180 and the balancing magnet 185 may be a monopolar-magnetized magnet, which has one N pole and one S pole, but the disclosure is not limited thereto. In another embodiment, each of the sensing magnet 180 and the balancing magnet 185 may be a bipolar-magnetized magnet or a 4-pole magnet, which includes two N poles and two S poles.

The sensing magnet 180 may be moved together with the bobbin 110 in the optical-axis direction, and the first position sensor 170 may detect the intensity of the magnetic field or the magnetic force of the sensing magnet 180, which is moved in the optical-axis direction, and may output an output signal corresponding to the result of the detection.

In an example, the intensity of the magnetic field or the magnetic force detected by the first position sensor 170 may vary depending on displacement of the bobbin 110 in the optical-axis direction. The first position sensor 170 may output an output signal proportional to the detected intensity of the magnetic field, and the displacement of the bobbin 110 in the optical-axis direction may be detected using the output signal from the first position sensor 170.

The housing 140 is disposed inside the cover member 300. The housing 140 may accommodate therein the bobbin 110, and may support the magnet 130, the first position sensor 170, and the circuit board 190.

Referring to FIGS. 5, 7, and 8, the housing 140 may be formed so as to take the overall shape of a hollow column. In an example, the housing 140 may have a polygonal (e.g., quadrangular or octagonal) or circular bore formed therein, and the bore in the housing 140 may take the form of a through-hole formed through the housing 140 in the optical-axis direction.

The housing 140 may include side portions, which correspond to or face side plates 302 of the cover member 300, and corners, which correspond to or face the corners of the cover member 300.

The housing 140 may be provided on the upper portion, the upper surface, or the upper end thereof with a stopper 145 in order to be inhibited from directly colliding with the inner surface of the upper plate 301 of the cover member 300.

Referring to FIG. 5, the housing 140 may include a mounting groove (or a seating groove) 14*a* formed therein to accommodate the circuit board 190. The mounting groove 14*a* may have a shape coinciding with the shape of the circuit board 190.

Referring to FIG. 7, the housing 140 may include an opening formed therein to expose terminals B1 to B4 of a terminal unit 95 of the circuit board 190 therethrough. The opening may be formed in the side portion of the housing 140.

The housing 140 may be provided on the upper portion, the upper end, or the upper surface thereof with at least one first coupling portion for coupling to a first outer frame 152 of the upper elastic member 150. The housing 140 may be provided on the lower portion, the lower end, or the lower surface thereof with a second coupling portion for coupling and securing to a second outer frame 162 of the lower elastic member 160. For example, each of the first and second coupling portions of the housing 140 may be formed in the shape of a flat surface, a protrusion, or a recess.

The magnet 130 may be disposed on the housing 140. In an example, the magnet 130 may be disposed on the side portion of the housing 140. The magnet 130 may be a driving magnet for AF operation.

For example, the magnet 130 may include a plurality of magnet units. In an example, the magnet 130 may include first to fourth magnet units 130-1 to 130-4 disposed on the housing 140.

In another embodiment, the magnet 130 may include two or more magnet units.

The magnet 130 may be disposed on at least one of the side portion or the corner of the housing 140. In an example, at least a portion of the magnet 130 may be disposed on the side portion or the corner of the housing 140.

For example, each of the magnet units 130-1 to 130-4 may include a first portion disposed on a corresponding corner among the four corners of the housing 130. In addition, each of the magnet units 130-1 to 130-4 may include a second portion disposed on the side portion of the housing 140 that is adjacent to the corresponding corner of the housing 140.

At the initial position of the AF operation unit, the magnet 130 may be disposed on the housing 140 such that at least a portion thereof overlaps the first coil 120 in a direction parallel to a line that is perpendicular to the optical axis OA and extends through the optical axis OA.

The magnet 130 may be a monopolar-magnetized magnet. In another embodiment, the magnet 130 may be a bipolar-magnetized magnet or a 4-pole magnet, which includes two N poles and two S poles.

In an example, the magnet 130 may be a common magnet for implementing AF operation and OIS operation, which will be described later.

The circuit board 190 may be disposed in the housing 140. The first position sensor 170 may be disposed or mounted on the circuit board 190, and may be conductively connected to the circuit board 190. In an example, the circuit board 190 may be disposed in the mounting groove **14*a* in the housing 140, and the terminals B1 to B4 of the circuit board 190 may be exposed outside the housing 140**.

The circuit board 190 may be provided with a terminal unit (or terminal part) 95 including a plurality of terminals B1 to B4 for conductive connection to an external terminal or an external device. The plurality of terminals B1 to B4 of the circuit board 190 may be conductively connected to the first position sensor 170.

The first position sensor 170 may be disposed on a first surface of the circuit board 190, and the plurality of terminals B1 to B4 may be disposed on a second surface of the circuit board 190. Here, the second surface of the circuit board 190 may be a surface opposite the first surface of the circuit board 190. For example, the first surface of the circuit board 190 may be the surface of the circuit board 190 that faces the bobbin 110 or the sensing magnet 180.

For example, the circuit board 190 may be a printed circuit board or an FPCB.

The circuit board 190 may include a circuit pattern or wiring (not shown) for conductive connection of the first to fourth terminals B1 to B4 to the first position sensor 170.

In an example, at the initial position of the AF operation unit, at least a portion of the first position sensor 170 may face or overlap the sensing magnet 180 in a direction parallel to a line that is perpendicular to the optical axis OA and extends through the optical axis OA. In another embodiment, at the initial position of the AF operation unit, the first position sensor may not face or overlap the sensing magnet.

When the bobbin 110 is moved, the first position sensor 170 may detect the magnetic field or the intensity of the magnetic field of the sensing magnet 180 mounted to the bobbin 110, and may output an output signal corresponding to the result of the detection.

The first position sensor 170 may be a driver IC including a Hall sensor and a driver. The first position sensor 170 may include first to fourth terminals for transmitting and receiving data to and from the outside through data communication using a protocol, such as I2C communication, and fifth and sixth terminals for directly supplying a driving signal to the first coil 120.

The first position sensor 170 may be conductively connected to the first to fourth terminals B1 to B4 of the circuit board 190. In an example, each of the first to fourth terminals of the first position sensor 170 may be conductively connected to a corresponding one of the first to fourth terminals of the circuit board 190.

The fifth and sixth terminals of the first position sensor 170 may be conductively connected to the first coil 120 via at least one of the upper elastic member 150 or the lower elastic member 160, and may supply a driving signal to the first coil 120. In an example, a portion of the first lower elastic member 160-1 may be connected to one end of the first coil 120, and another portion of the first lower elastic member 160-1 may be conductively connected to the circuit board 190. A portion of the second lower elastic member 160-2 may be connected to the other end of the first coil 120, and another portion of the second lower elastic member 160-2 may be conductively connected to the circuit board 190. In another embodiment, the first coil may be conductively connected to the circuit board 190 and the fifth and sixth terminals of the first position sensor 170 via the two upper elastic members.

For example, in an embodiment in which the first position sensor 170 is a driver IC, the first and second terminals B1 and B2 of the circuit board 190 may be a power terminal for supply of power, the third terminal may be a terminal for transmission and reception of a clock signal, and the fourth terminal may be a terminal for transmission and reception of a data signal.

In another embodiment, the first position sensor 170 may be a Hall sensor. The first position sensor 170 may include two input terminals for reception of a driving signal or power supplied thereto and two output terminals for output of a sensing voltage (or output voltage). In an example, a driving signal may be supplied to the first position sensor 170 through the first and second terminals B1 and B2 of the circuit board 190, and the output from the first position sensor 170 may be output to the outside through the third and fourth terminals B3 and B4. In addition, the first coil 120 may be conductively connected to the circuit board 190, and a driving signal may be supplied to the first coil 120 from the outside through the circuit board 190. In this case, the circuit board 190 may further include two separate terminals to receive a driving signal to be supplied to the first coil 120.

In an example, among the power terminals of the first position sensor 170, a ground terminal may be conductively connected to the cover member 300.

The capacitor 195 may be disposed or mounted on the first surface of the circuit board 190. The capacitor 195 may be of a chip type. In this case, the chip may include a first terminal, which corresponds to one end of the capacitor 195, and a second terminal, which corresponds to the other end of the capacitor 195. The capacitor 195 may alternatively be referred to as a "capacitive element" or a condenser.

The capacitor 195 may be conductively connected in parallel to the first and second terminals B1 and B2 of the circuit board 190, through which power (or a driving signal) is supplied to the first position sensor 170 from the outside. Alternatively, the capacitor 195 may be conductively connected in parallel to the terminals of the first position sensor 170, which are conductively connected to the first and second terminals B1 and B2 of the circuit board 190.

Since the capacitor 195 is conductively connected in parallel to the first and second terminals B1 and B2 of the circuit board 190, the capacitor 195 may serve as a smoothing circuit for removing ripple components included in power signals GND and VDD, which are supplied to the first position sensor 170 from the outside, and thus may supply stable and consistent power signals to the first position sensor 170.

The upper elastic member 150 may be coupled to the upper portion, the upper end, or the upper surface of the bobbin 110 and to the upper portion, the upper end, or the upper surface of the housing 140, and the lower elastic member 160 may be coupled to the lower portion, the lower end, or the lower surface of the bobbin 110 and to the lower portion, the lower end, or the lower surface of the housing 140.

The upper elastic member 150 and the lower elastic member 160 may elastically support the bobbin 110 with respect to the housing 140.

The upper elastic member 150 may include a plurality of upper elastic units (e.g., 150-1 and 150-2), which are conductively separated or isolated from each other, and the lower elastic member 160 may include a plurality of lower elastic units (e.g., 160-1 and 160-2), which are conductively separated or isolated from each other.

Each of the upper elastic member and the lower elastic member is described as including two elastic units. However, in another embodiment, at least one of the upper elastic member or the lower elastic member may be embodied as a single unit or a single construction.

The upper elastic member 150 may further include a first inner frame 151 coupled or secured to the upper portion, the upper surface, or the upper end of the bobbin 110, a second inner frame 152 coupled or secured to the upper portion, the upper surface, or the upper end of the housing 140, and a first frame connection portion 153 interconnecting the first inner frame 151 and the first outer frame 152.

The lower elastic member 160 may further include a second inner frame 161 coupled or secured to the lower portion, the lower surface, or the lower end of the bobbin 110, a second outer frame 162 coupled or secured to the lower portion, the lower surface, or the lower end of the housing 140, and a second frame connection portion 163 interconnecting the second inner frame 161 and the second outer frame 162. The inner frame may alternatively be referred to as an inner portion, the outer frame may alternatively be referred to as an outer portion, and the frame connection portion may alternatively be referred to as a connection portion.

Each of the first and second frame connection portions 153 and 163 may be formed so as to be bent or curved (or crooked) at least once to form a predetermined pattern.

Each of the upper elastic member 150 and the lower elastic member 160 may be formed of a conductive material.

Referring to FIG. 8, the circuit board 190 may be provided with two pads 5*a* and 5*b*. The two pads 5*a* and 5*b* may be conductively connected to the first position sensor 170. In addition, the first pad 5*a* of the circuit board 190 may be conductively connected to the first lower elastic unit 160-1, and the second pad 5*b* of the circuit board 190 may be conductively connected to the second lower elastic unit 160-2.

In an example, the second outer frame 162 of the first lower elastic unit 160-1 may include a first bonding portion 4*a*, which is coupled or conductively connected to the first pad 5*a* of the circuit board 190, and the second outer frame 162 of the second lower elastic unit 160-2 may include a second bonding unit 4*b*, which is conductively connected to the second pad 5*b* of the circuit board 190.

In another embodiment, at least one of the upper elastic member 150 or the lower elastic member 160 may include two elastic members. In an example, each of the two elastic members of any one of the upper elastic member 150 and the lower elastic member 160 may be coupled or conductively connected to a corresponding one of the first and second pads of the circuit board 190, and the first coil 120 may be conductively connected to the two elastic members.

Figure 9:
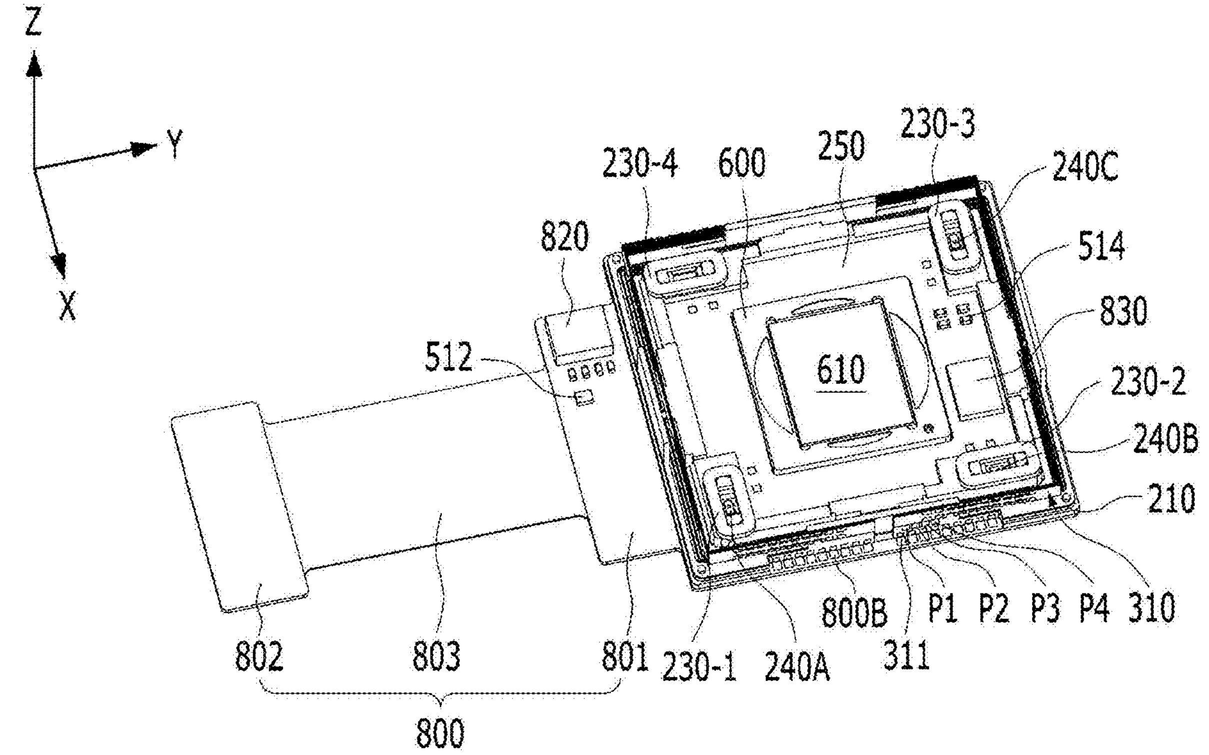
FIG. 9 is a perspective view of an image sensor unit.
Figure 10A:
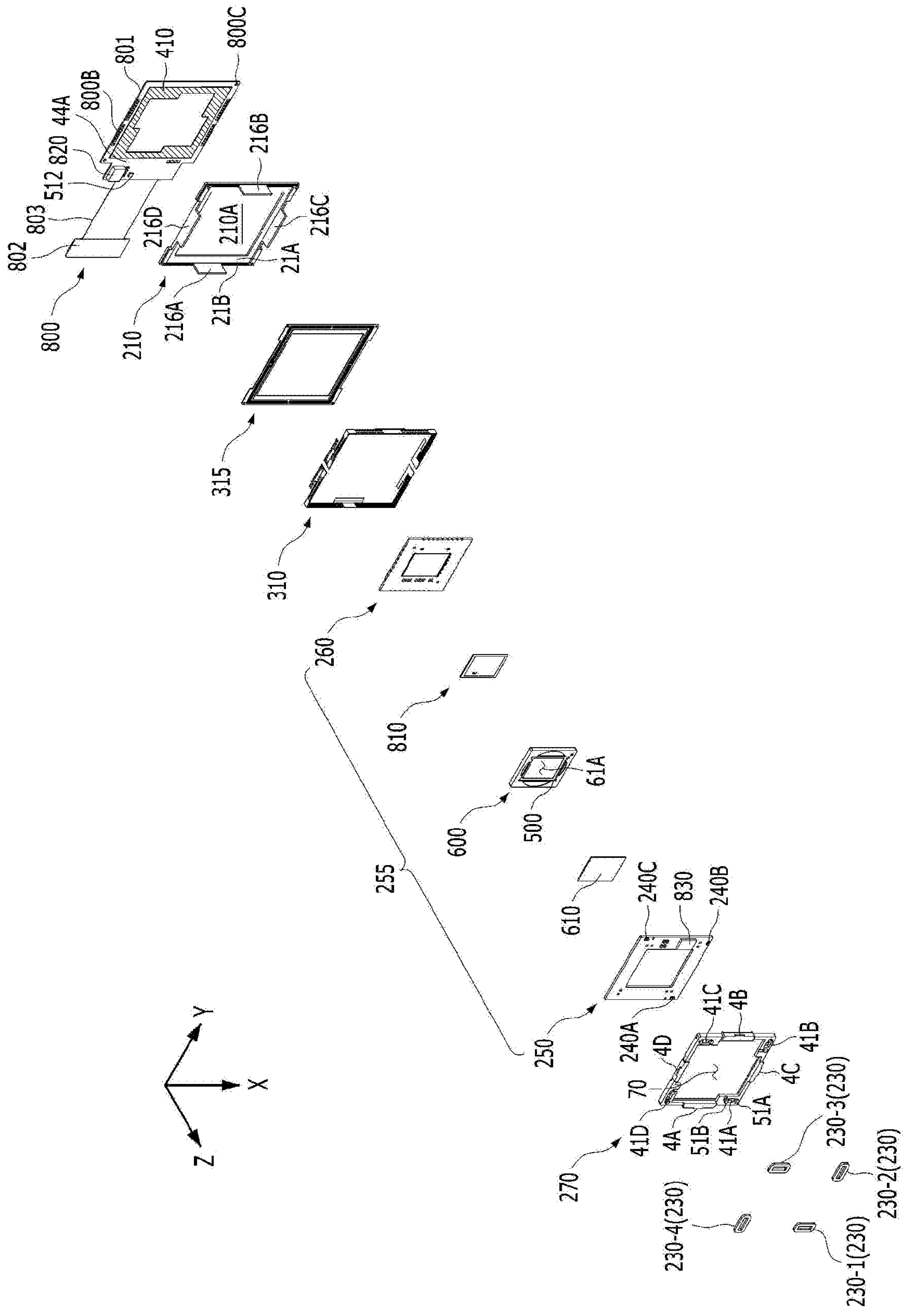
FIG. 10A is a first exploded perspective view of the image sensor unit in FIG. 9.
Figure 10B:
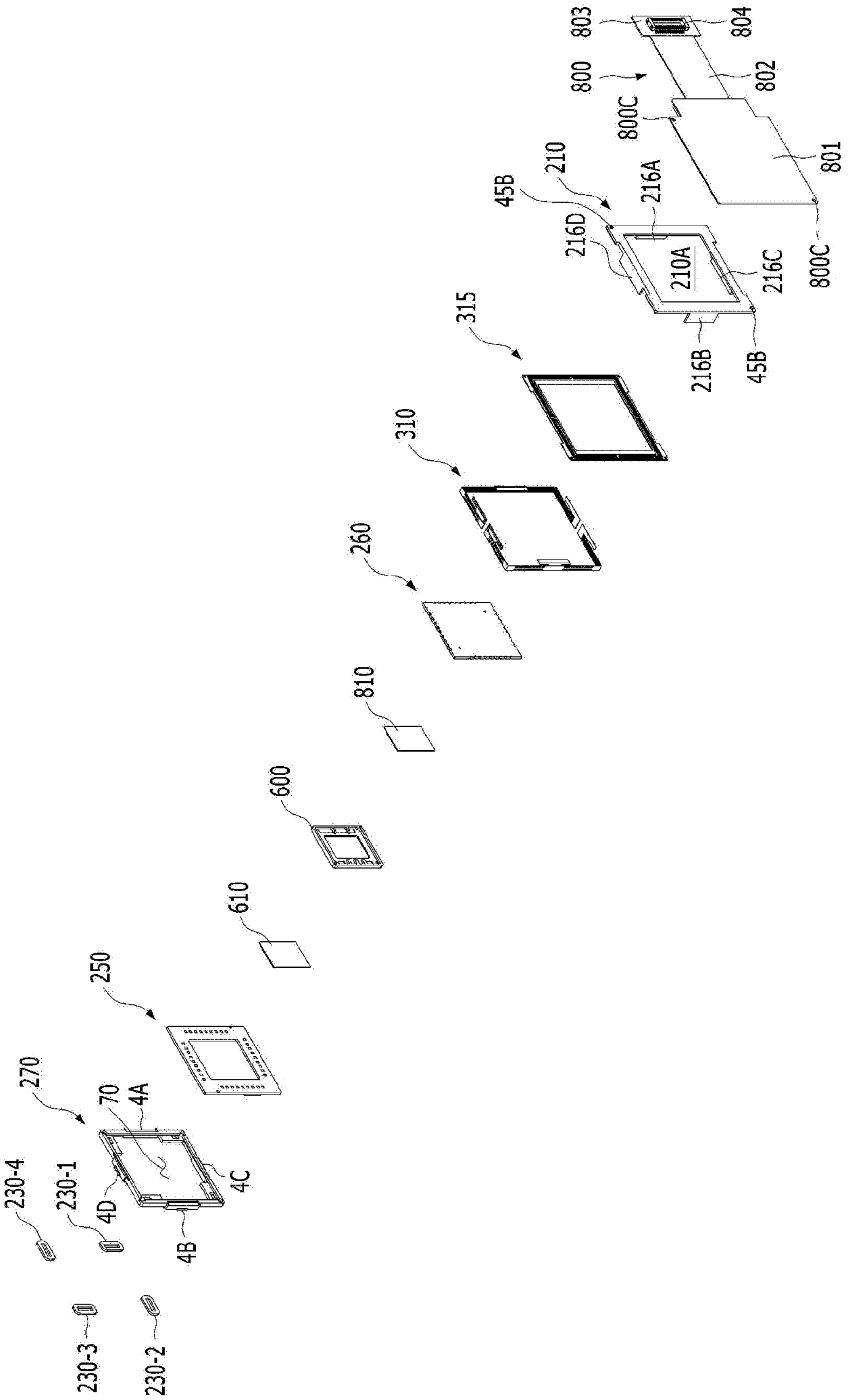
FIG. 10B is a second exploded perspective view of the image sensor unit in FIG. 9.
Figure 11:
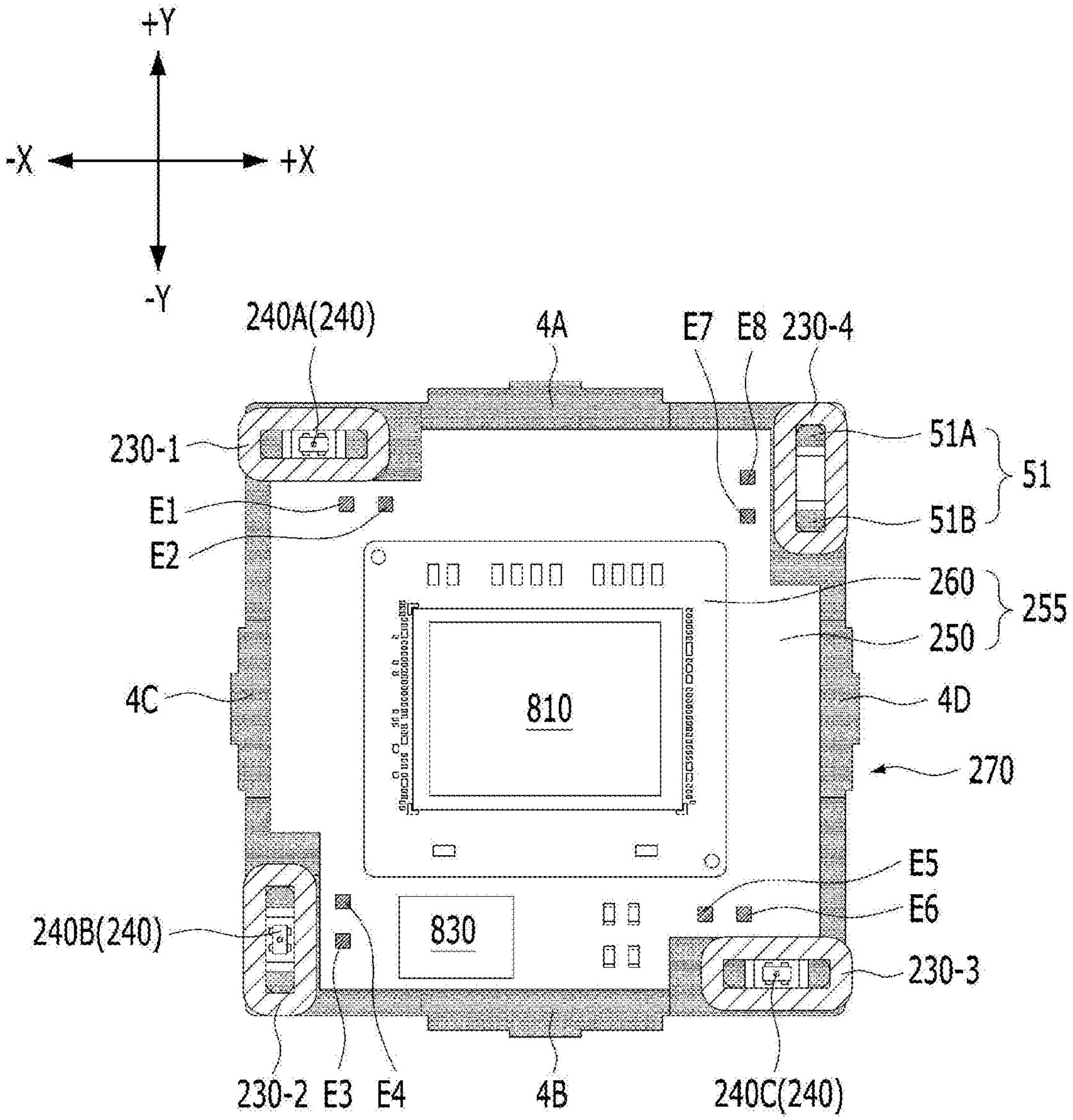
FIG. 11 is a perspective view of the holder, the second coil, the image sensor, the OIS position sensor, and the first board unit in FIG. 10A.
Figure 12:
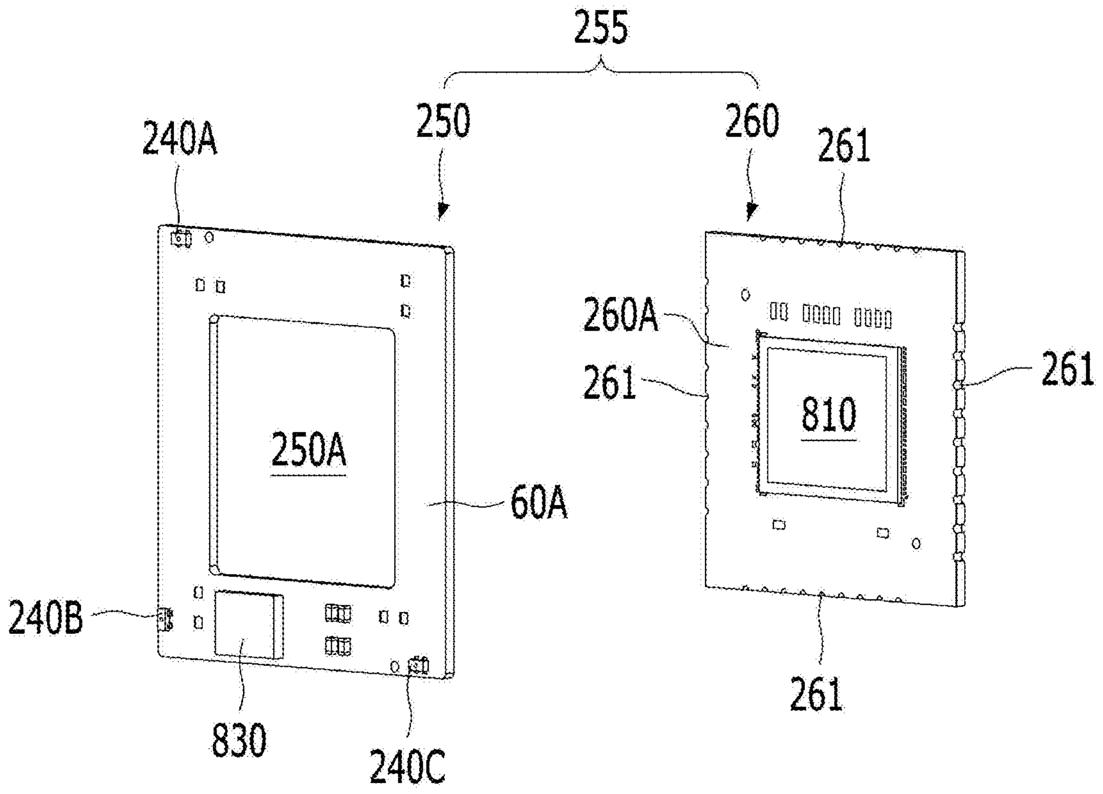
FIG. 12 is a first perspective view of a first circuit board and a second circuit board of the first board unit.
Figure 13:
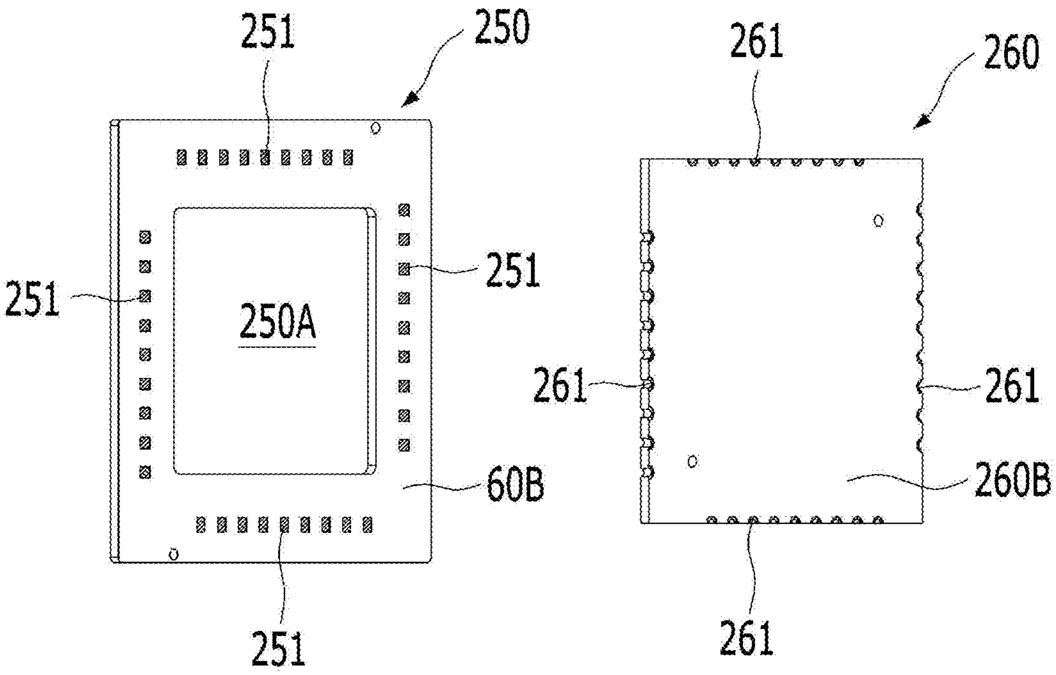
FIG. 13 is a second perspective view of the first circuit board and the second circuit board of the first board unit.
Figure 14A:
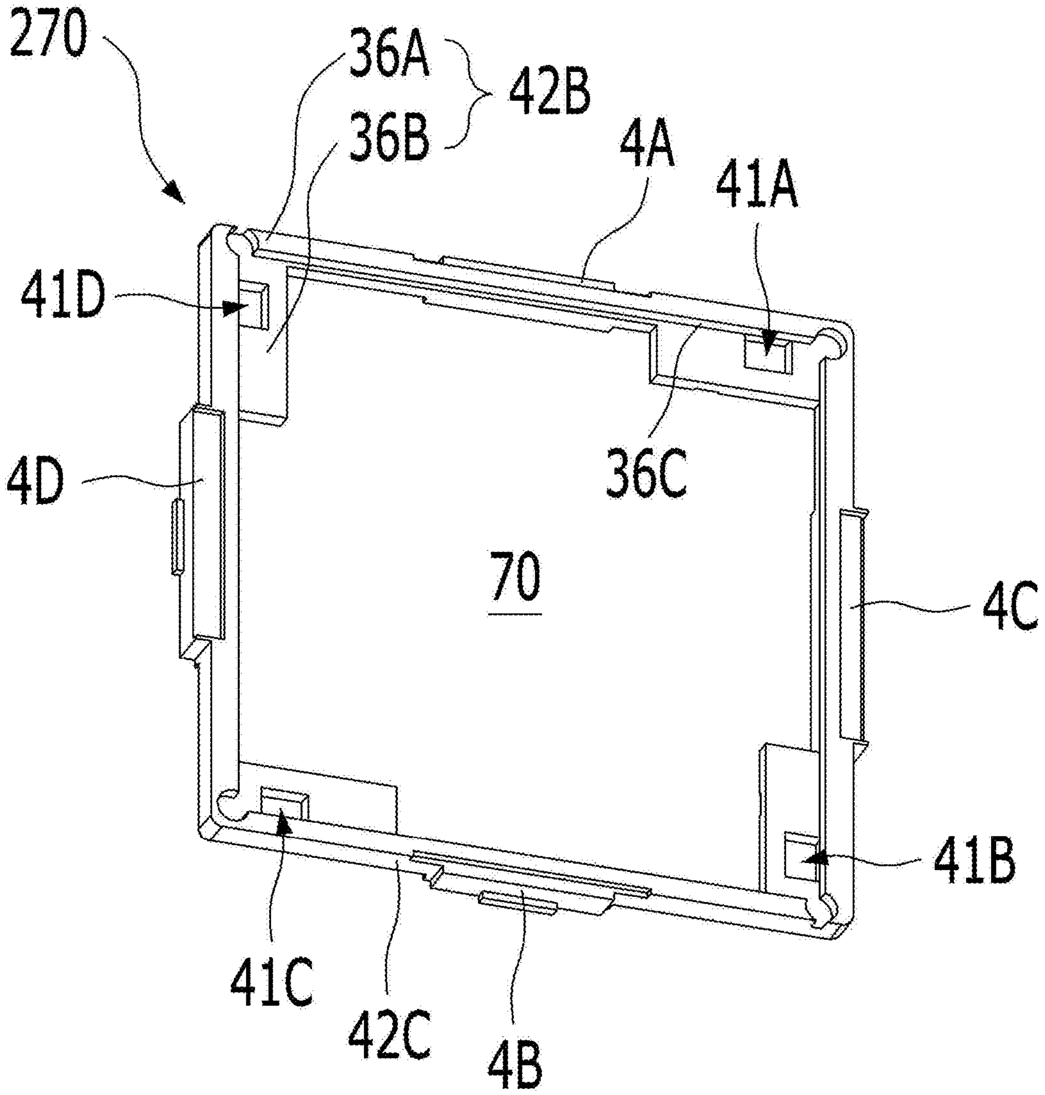
FIG. 14A is a bottom perspective view of the holder.
Figure 14B:
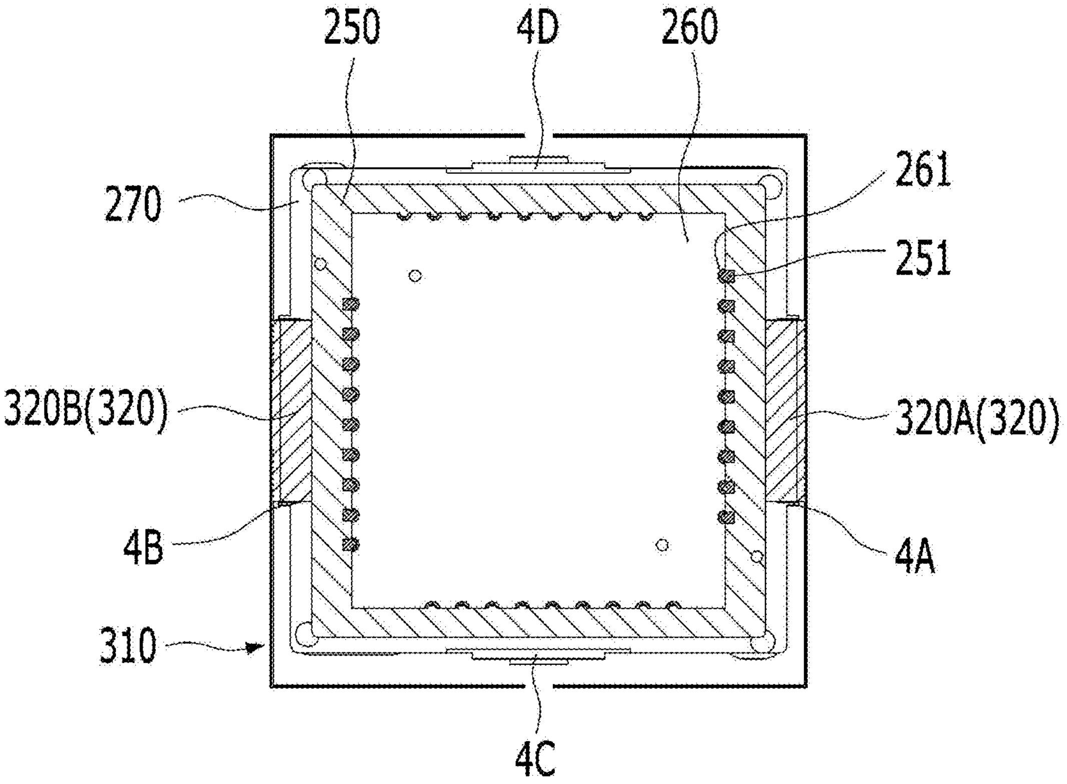
FIG. 14B illustrates the holder, the first board unit, and a support board.
Figure 15:
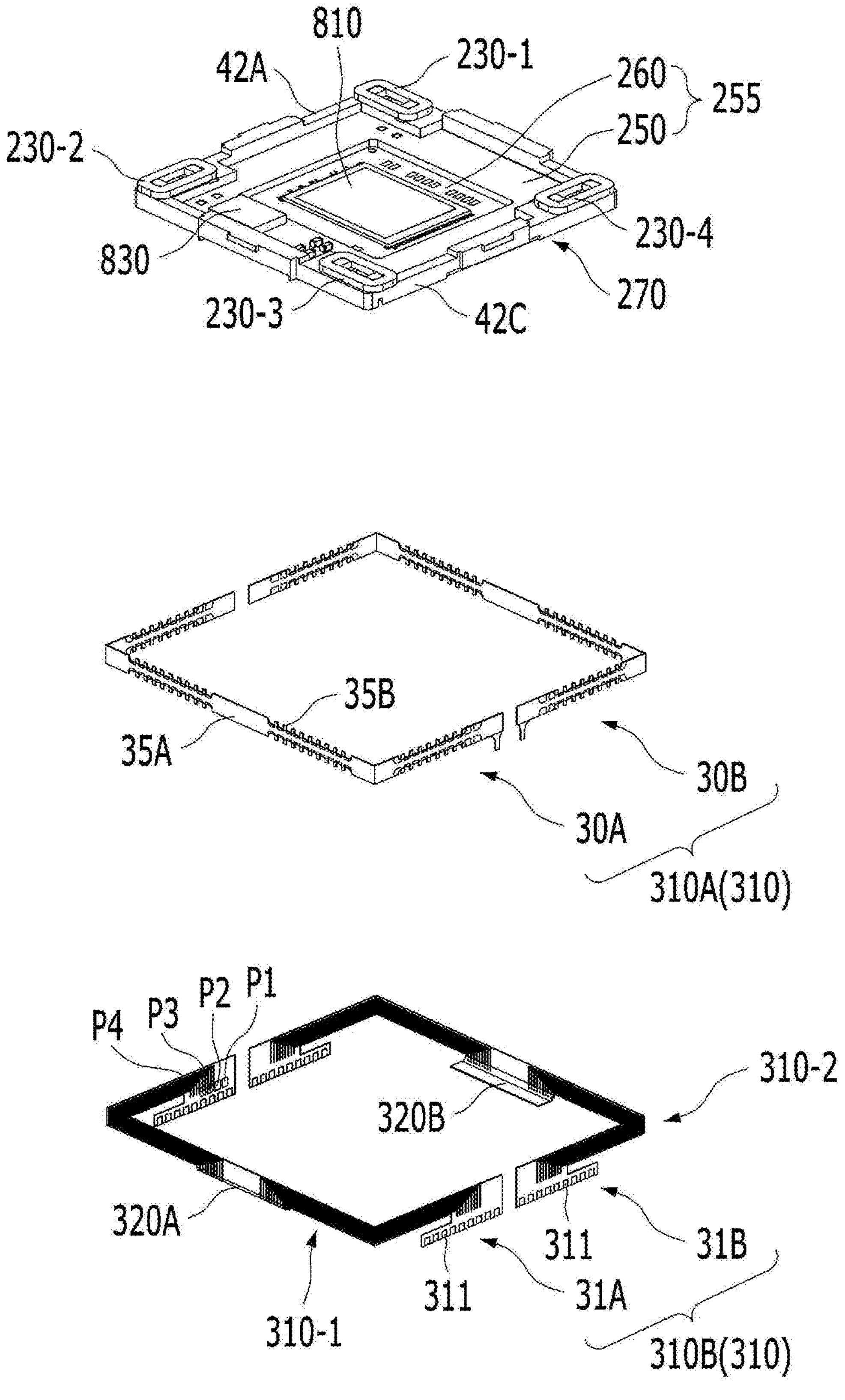
FIG. 15 is a perspective view of the holder, the second coil, the first board unit, the image sensor, and the support board.
Figure 16A:
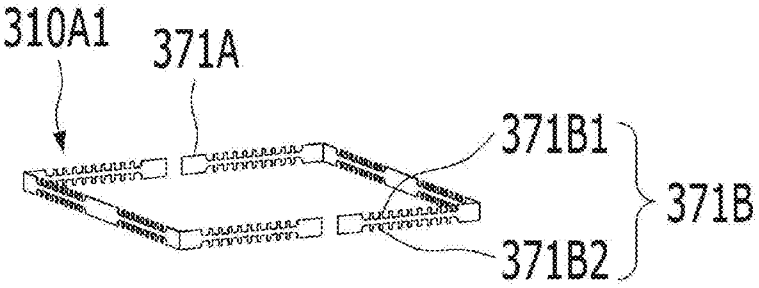
FIGS. 16(*a*)-16(*d*) illustrate embodiments of an elastic unit of the support board.
Figure 16B:
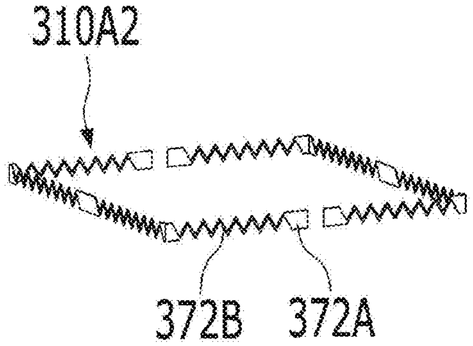
Figure 16C:
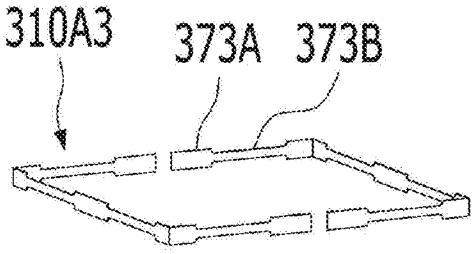
Figure 16D:
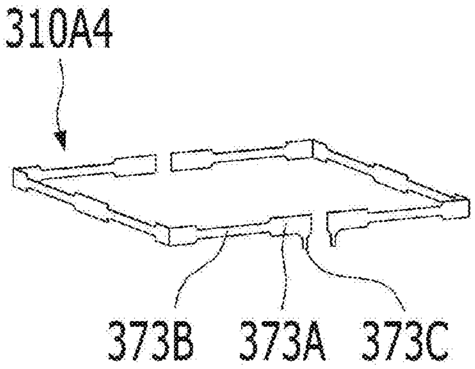
Figure 17:
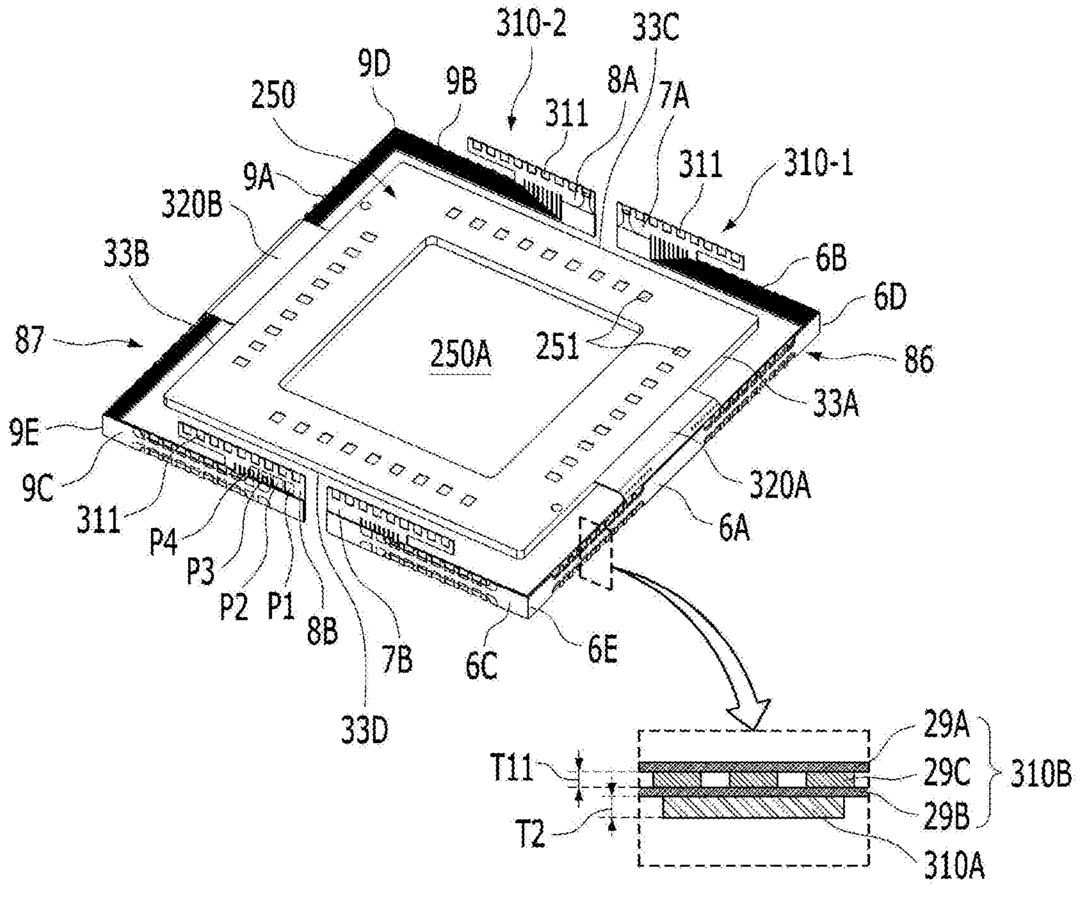
FIG. 17 is a bottom perspective view of the first circuit board and the support board.
Figure 18A:
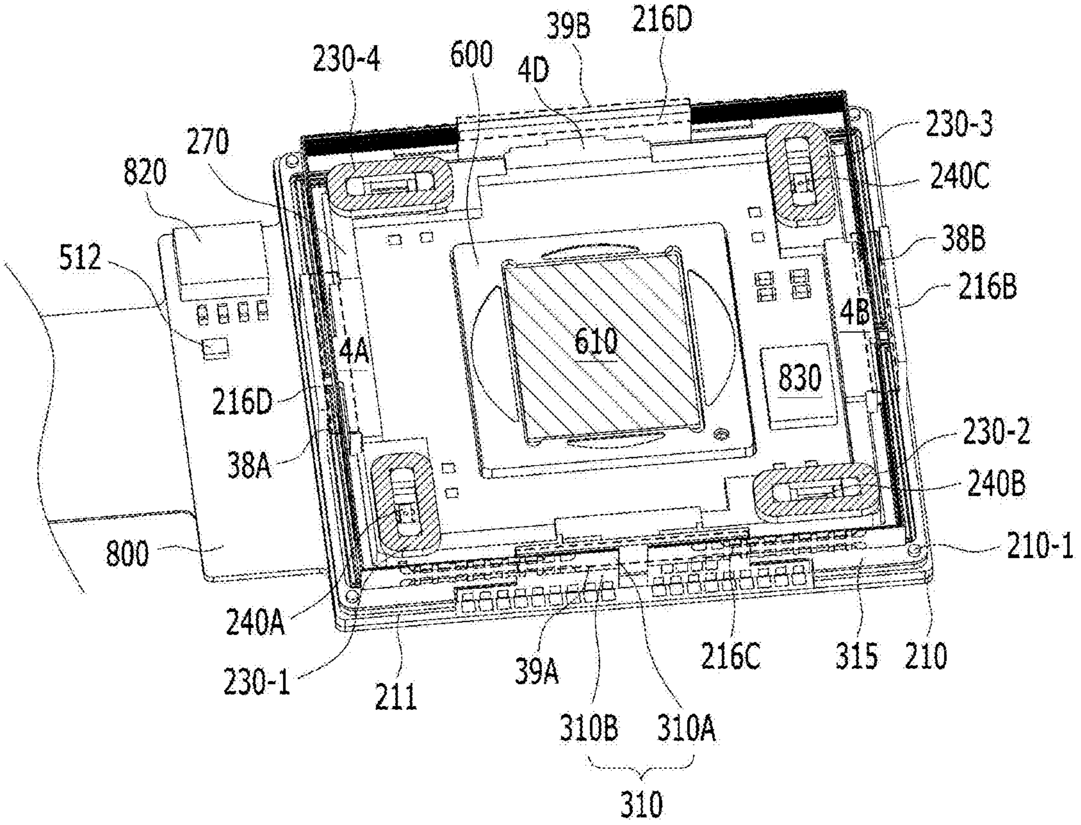
FIG. 18A is a first perspective view of the support board coupled to the holder and to the base.
Figure 18B:
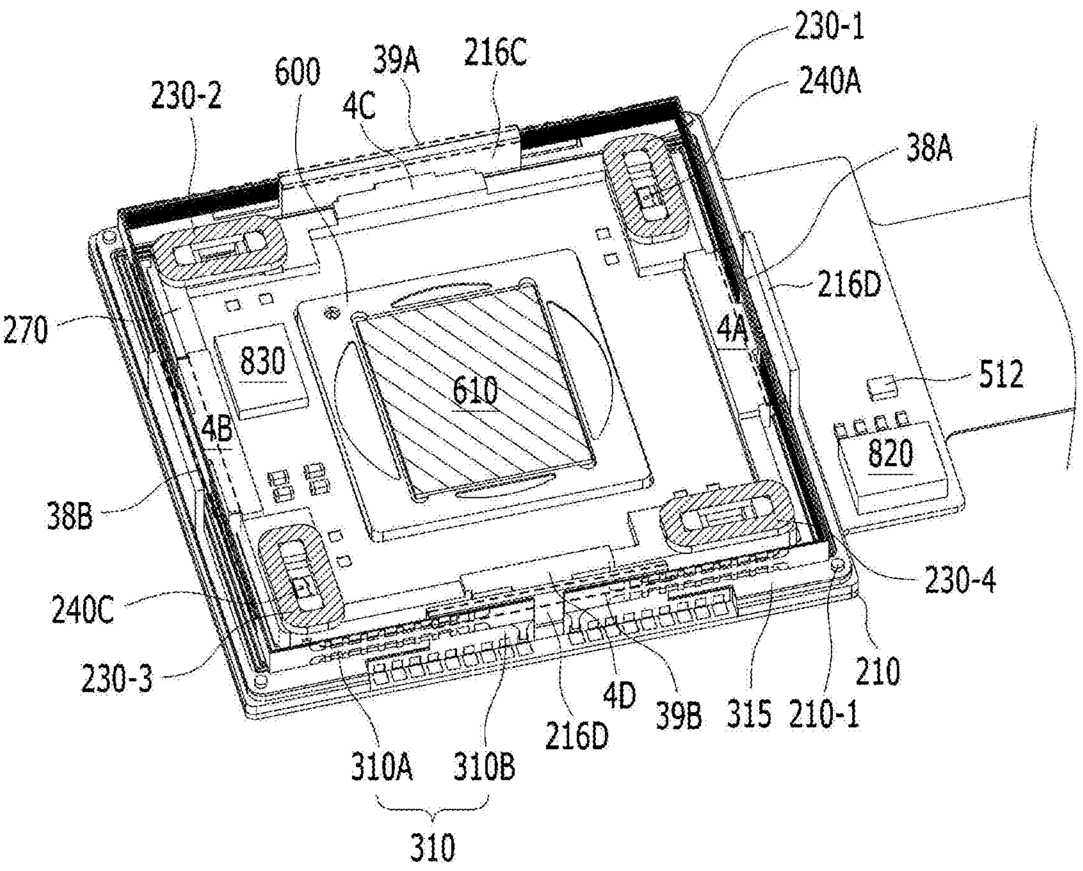
FIG. 18B is a second perspective view of the support board coupled to the holder and to the base.
Figure 19:
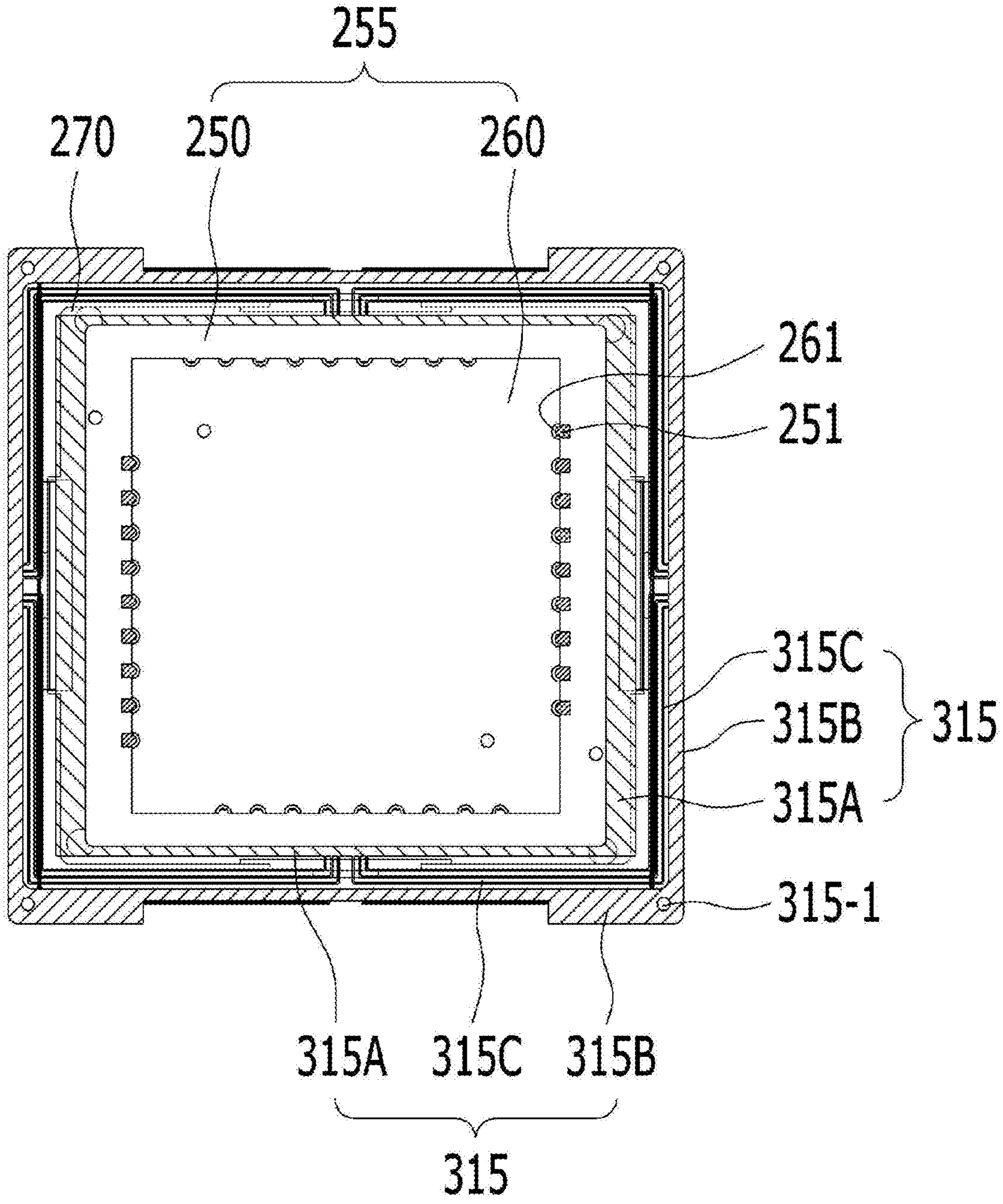
FIG. 19 is a bottom view of the first board unit, the holder, the support board, and an elastic member.

FIG. 9 is a perspective view of the image sensor unit 350, FIG. 10A is a first exploded perspective view of the image sensor unit 350 in FIG. 9, FIG. 10B is a second exploded perspective view of the image sensor unit 350 in FIG. 9, FIG. 11 is a perspective view of the holder 270, the second coil 230, the image sensor 810, the OIS position sensor 240, and the first board unit 255 in FIG. 10A, FIG. 12 is a first perspective view of a first circuit board 250 and a second circuit board 260 of the first board unit 255, FIG. 13 is a second perspective view of the first circuit board 250 and the second circuit board 260 of the first board unit 255, FIG. 14A is a bottom perspective view of the holder 270, FIG. 14B illustrates the holder 270, the first board unit 255, and a support board 310, FIG. 15 is a perspective view of the holder 270, the second coil 230, the first board unit 255, the image sensor 810, and the support board 310, FIGS. 16(*a*)-16(*d*) illustrate embodiments of the support board, FIG. 17 is a bottom perspective view of a first circuit board 250 and the support board 310, FIG. 18A is a first perspective view of the support board 310 coupled to the holder 270 and to the base 210, FIG. 18B is a second perspective view of the support board 310 coupled to the holder 270 and to the base 210, and FIG. 19 is a bottom view of the first board unit 255, the holder 270, the support board 310, and an elastic member 315.

Referring to FIGS. 9 to 19, the image sensor unit 350 may include a fixed unit and an OIS moving unit spaced apart from the fixed unit. The image sensor unit 350 may include a support board 310 interconnecting the fixed unit and the OIS moving unit. The image sensor unit 350 may further include an elastic member 315 for elastically supporting the OIS moving unit with respect to the fixed unit.

The support board 310 may support the OIS moving unit with respect to the fixed unit such that the OIS moving unit is capable of moving in a direction perpendicular to the optical axis or such that the OIS moving unit is capable of tilting or rotating within a predetermined range about the optical axis.

The OIS moving unit may include a first board unit 255, an image sensor 810 disposed on the first board unit 255, a second coil 230 disposed so as to face the magnet 130 in the optical-axis direction, and a second position sensor 240 disposed on the first board unit 255.

The OIS moving unit may further include a holder 270 disposed between the second coil 230 and the first board unit 255 and accommodating the first board unit 255. The holder 270 may alternatively be referred to as a "spacing member".

The OIS moving unit may further include a filter 610. The OIS moving unit may further include a filter holder 600 configured to accommodate the filter 610.

The fixed unit may include a second board unit 800 spaced apart from the first board unit 255 and conductively connected to the first board unit 255. The fixed unit may further include a base 210 coupled to the second board unit 800. In addition, the fixed unit may include a cover member 300 coupled to the base 210. In addition, the fixed unit may include the housing 140 of the AF moving unit and the magnet 130 disposed in the housing 140.

The fixed unit may further include a base 210 accommodating the second board unit 800 and coupled to the cover member 300. The fixed unit may further include a yoke 410 disposed on the second board unit.

The holder 270 may be disposed under the AF moving unit. In an example, the holder 270 may be embodied as a non-conductive member. In an example, the holder 270 may be made of an injection-molded material, which is easily embodied through an injection-molding process.

In addition, the holder 27 may be formed of an insulative material. In addition, for example, the holder 270 may be formed of resin or plastic.

Referring to FIGS. 11, 14A, 14B, and 15, the holder 270 may include an upper surface 42A, a lower surface 42B formed opposite the upper surface 42A, and a side surface 42C interconnecting the upper surface 42A and the lower surface 42B. In an example, the lower surface 42B of the holder 270 may face or be located opposite the second board unit 800.

The holder 270 may support the first board unit 255, and may be coupled to the first board unit 255. In an example, the first board unit 255 may be disposed under the holder 270. In an example, the lower portion, the lower surface, or the lower end of the holder 270 may be coupled to the upper portion, the upper surface, or the upper end of the first board unit 255.

Referring to FIG. 14A, the lower surface 42B of the holder 270 may include a first surface 36A and a second surface 36B. The second surface 36B may have a height difference with respect to the first surface 36A in the optical-axis direction. In an example, the second surface 36B may be located above (or at a higher position than) the first surface 36A. In an example, the second surface 36B may be located closer to the upper surface 42A of the holder 270 than the first surface 36A. In an example, a distance between the upper surface 42A of the holder 270 and the second surface 36B may be shorter than a distance between the upper surface 42A of the holder 270 and the first surface 36A.

The holder 270 may include a third surface 36C interconnecting the first surface 36A and the second surface 36B. In an example, the first surface 36A and the second surface 36B may be parallel to each other, and the third surface 36C may be perpendicular to the first surface 36A and/or the second surface 36B, but the disclosure is not limited thereto. In another embodiment, the included angle between the third surface 36C and the first surface 36A (or the second surface 36B) may be an acute angle or an obtuse angle. In an example, the first surface 36A and the second surface 36B may be located on the edge of the lower surface 42B of the holder 270.

The holder 270 may accommodate or support the second coil 230. The holder 270 may support the second coil 230 such that the second coil 230 is spaced apart from the first board unit 255.

The holder 270 may include a bore 70 formed therein so as to correspond to one region of the first board unit 255. In an example, the bore 70 in the holder 270 may be a through-hole formed through the holder 270 in the optical-axis direction. In an example, the bore 70 in the holder 270 may correspond to, face, or overlap the image sensor 810 in the optical-axis direction.

The shape of the bore 70 in the holder 270 viewed from above may be a polygonal shape such as a quadrangular shape, a circular shape, or an elliptical shape, but the disclosure is not limited thereto. The bore may be formed in any of various shapes.

In an example, the bore 70 in the holder 270 may have a shape or a size suitable for exposing the image sensor 810, a portion of the upper surface of the first circuit board 250, a portion of the upper surface of the second circuit board 260, and elements. In an example, the area of the bore 70 in the holder 270 may be larger than the area of the image sensor 810, and may be smaller than the area of the first surface of the first circuit board 250. In an example, the bore 70 may be formed in the second surface 36B of the lower surface 42B of the holder 270.

The holder 270 may have holes 41A, 41B, and 41C formed therein so as to correspond to the second position sensor 240. In an example, the holder 270 may have holes 41A, 41B, and 41C formed therein at positions corresponding to first to third sensors 240A, 240B, and 240C of the second position sensor 240.

In an example, the holes 41A, 41B, and 41C may be disposed adjacent to the corners of the holder 270. The holder 270 may have a dummy hole 41D formed therein at a position that does not correspond to the second position sensor 240 and is adjacent to the corner of the holder 270 that does not correspond to the second position sensor 240. The dummy hole 41D may be formed in order to enable weight balancing of the OIS moving unit during OIS operation. In another embodiment, the dummy hole 41D may not be formed.

The holes 41A, 41B, and 41C may be through-holes formed through the holder 270 in the optical-axis direction. In an example, the holes 41A, 41B, and 41C may be formed in the second surface 36B of the lower surface 42B of the holder 270, but the disclosure is not limited thereto. In another embodiment, the holes may be formed in the first surface of the lower surface of the holder 270. In still another embodiment, the holes 41A, 41B, and 41C in the holder 270 may be omitted.

The holder 270 may be provided on the upper surface 42A thereof with at least one coupling protrusion 51 for coupling to the second coil 230. The coupling protrusion 51 may protrude from the upper surface 42A of the holder 270 toward the AF moving unit. In an example, the coupling protrusion 51 may be formed adjacent to each of the holes 41A to 41D in the holder 270.

In an example, two coupling protrusions 51A and 51B may be disposed or arranged so as to correspond to respective holes 41A, 41B, 41C, and 41D in the holder 270. In an example, each of the holes 41A, 41B, 41C, and 41D in the holder 270 may be located between the two coupling protrusions 51A and 51B.

The first board unit 255 may include a first circuit board 250 and a second circuit board 260, which are conductively connected to each other. The second circuit board 260 may alternatively be referred to as a "sensor board".

The first board unit 255 may be disposed on the lower surface 42B of the holder 270. In an example, the first board unit 255 may be disposed on the second surface 36B of the lower surface 42B of the holder 270. In an example, the first circuit board 250 may be disposed on the second surface 36B of the lower surface 42B of the holder 270. In an example, the first surface 60A (refer to FIG. 12) of the first circuit board 250 may be coupled or attached to the second surface 36B of the lower surface 42B of the holder 270 by means of an adhesive member.

In this case, the first surface 60A of the first circuit board 250 may be a surface that faces the AF moving unit and on which the second position sensor 240 is disposed. In addition, the second surface 60B of the first circuit board 250 may be a surface formed opposite the first surface 60A of the first circuit board 250.

The first circuit board 250 may alternatively be referred to as a sensor board, a main board, a main circuit board, a sensor circuit board, or a moving circuit board. In all of the embodiments, the first circuit board 250 may alternatively be referred to as a “second board” or a “second circuit board”, and the second circuit board 260 may alternatively be referred to as a “first board” or a “first circuit board”.

The position sensors 240A, 240B, and 240C may be disposed on the first circuit board 250. In addition, a controller 830 and/or a circuit element (e.g., a capacitor) may be disposed on the first circuit board 250. The image sensor 810 may be disposed on the second circuit board 260.

The first circuit board 250 may include first terminals E1 to E8 to be conductively connected to the second coil 230. Here, the first terminals E1 to E8 may alternatively be referred to as “first pads” or “first bonding parts”. The first terminals E1 to E8 of the first circuit board 250 may be disposed or arranged on the first surface 60A of the first circuit board 250. For example, the first circuit board 250 may be a printed circuit board or a flexible printed circuit board (FPCB).

The first circuit board 250 may include a bore 250A formed therein so as to correspond to or face the lens module 400 and the bore in the bobbin 110. In an example, the bore 250A in the first circuit board 250 may be a through-hole formed through the first circuit board 250 in the optical-axis direction, and may be formed in the center of the first circuit board 250.

When viewed from above, the shape of the first circuit board 250, e.g., the outer circumferential shape thereof, may be a shape coinciding with or corresponding to the shape of the holder 270, for example, a quadrangular shape. In addition, when viewed from above, the shape of the bore 250A in the first circuit board 250 may be a polygonal shape such as a quadrangular shape, a circular shape, or an elliptical shape.

In addition, the first circuit board 250 may include at least one second terminal 251 to be conductively connected to the second circuit board 260. Here, the second terminal 251 may alternatively be referred to as a “second pad” or a “second bonding part”. The second terminal 251 of the first circuit board 250 may be disposed or arranged on the second surface 60B of the first circuit board 250.

In an example, the at least one second terminal 251 may be provided in plural, and the plurality of second terminals 251 may be disposed or arranged in a region between the bore 250A in the first circuit board 250 and any one side of the first circuit board 250 in a direction parallel to the side of the first circuit board 250. In an example, the plurality of second terminals 251 may be arranged around the bore 250A.

The second circuit board 260 may be disposed under the first circuit board 250.

When viewed from above, the shape of the second circuit board 260 may be a polygonal shape (e.g., a quadrangular shape, a square shape, or a rectangular shape), but the disclosure is not limited thereto. In another embodiment, the shape of the second circuit board may be a circular shape or an elliptical shape.

In an example, when the shape of the second circuit board 260 is a quadrangular shape, the area of the front surface of the second circuit board 260 may be larger than the area of the bore 250A in the first circuit board 250. In an example, the lower side of the bore 250A in the first circuit board 250 may be shielded or blocked by the second circuit board 260.

In an example, when viewed from above or below, the outer side surface (or the side) of the second circuit board 260 may be located between the outer side surface (or the side) of the first circuit board 250 and the bore 250A in the first circuit board 250.

The image sensor 810 may be disposed on or coupled to a first surface 260A (e.g., the upper surface) of the second circuit board 260. Referring to FIGS. 12 and 13, the second circuit board 260 may include at least one terminal 261 conductively connected to the at least one second terminal 251 of the first circuit board 250. In an example, the terminal 261 of the second circuit board 260 may be provided in a plural number.

In an example, the at least one terminal 261 of the second circuit board 260 may be formed on the side surface or the outer side surface of the second circuit board 260 that connects the first surface 260A of the second circuit board 260 to a second surface 260B thereof. The first surface 260A may be a surface facing the first circuit board 250, and the second surface 260B may be a surface formed opposite the first surface 260A. In an example, the terminal 261 may take the form of a recess depressed into the side surface of the second circuit board 260.

Alternatively, in an example, the terminal 261 may take the form of a semicircular-shaped or a semi-elliptical-shaped via formed in the side surface of the second circuit board 260. In another embodiment, the at least one terminal of the second circuit board 260 that is conductively connected to the second terminal 251 of the first circuit board 250 may be formed on the first surface 260A of the second circuit board 260.

In an example, the terminal 261 of the second circuit board 260 may be coupled to the terminal 251 of the first circuit board 250 by means of solder or a conductive adhesive member. The first and second circuit boards 250 and 260 may be printed circuit boards or FPCBs.

The second coil 230 may be disposed on the holder 270. The second coil 230 may be disposed on the upper surface 42A of the holder 270. The second coil 230 may be disposed under the first magnet 130.

The second coil 230 may be coupled to the holder 270. In an example, the second coil 230 may be coupled to the upper surface 42A of the holder 270. In an example, the second coil 230 may be coupled to the coupling protrusion 51 of the holder 270.

In an example, the second coil 230 may correspond to, face, or overlap the first magnet 130 disposed on the fixed unit in the direction of the optical axis OA. In another embodiment, the fixed unit may include an OIS-dedicated magnet, which is provided separately from the magnet of the AF moving unit, and the second coil may correspond to, face, or overlap the OIS-dedicated magnet. In this case, the number of OIS-dedicated magnets may be identical to the number of coil units included in the second coil 230.

In an example, the second coil 230 may include a plurality of coil units 230-1 to 230-4. In an example, the second coil 230 may include four coil units 230-1 to 230-4 disposed on the four corners of the holder 270.

Each of the coil units 230-1 to 230-4 may take the form of a coil block having a closed curve shape or a ring shape. In an example, each coil unit may have a cavity or a hole formed therein. In an example, the coil units may be embodied as fine pattern (FP) coils.

In another embodiment, the second coil 230 may be disposed on the first circuit board 250, or may be coupled to the first circuit board 250.

The second coil 230 may be conductively connected to the first circuit board 250. In an example, the first coil unit 230-1 may be conductively connected to the two first terminals E1 and E2 of the first circuit board 250, the second coil unit 230-2 may be conductively connected to two other first terminals E3 and E4 of the first circuit board 250, the third coil unit 230-3 may be conductively connected to two other first terminals E5 and E6 of the first circuit board 250, and the fourth coil unit 230-4 may be conductively connected to two other first terminals E7 and E8 of the first circuit board 250.

Power or a driving signal may be supplied to the first to fourth coil units 230-1 to 230-4 through the first circuit board 250. The power or the driving signal supplied to the second coil 230 may be a DC signal, an AC signal, or a signal containing both DC and AC components, and may be of a current type or a voltage type.

In an example, currents may be independently applied to at least three coil units among the four coil units 230-1 to 230-4.

The second position sensor 240 may be disposed on, coupled to, or mounted on the first surface 60A (e.g., the upper surface) of the first circuit board 250. The second position sensor 240 may detect displacement of the OIS moving unit in a direction perpendicular to the optical axis OA, for example, shift or movement of the OIS moving unit in a direction perpendicular to the optical axis. In addition, the second position sensor 240 may detect rotation, rolling, or tilting of the OIS moving unit within a predetermined range with respect to the optical axis or about the optical axis. The first position sensor 170 may alternatively be referred to as an "AF position sensor", and the second position sensor 240 may alternatively be referred to as an "OIS position sensor".

In an example, the second position sensor 240 may be disposed below the second coil 230.

In an example, the second position sensor 240 may not overlap the second coil 230 in a direction perpendicular to the optical axis. In an example, the sensing element of the second position sensor 240 may not overlap the second coil 230 in a direction perpendicular to the optical axis. The sensing element may be a part that detects a magnetic field.

In an example, the center of the second position sensor 240 may not overlap the second coil 230 in a direction perpendicular to the optical axis. In an example, the center of the second position sensor 240 may be a spatial center in the x-axis direction and the y-axis direction in an xy-coordinate plane perpendicular to the optical axis. Alternatively, the center of the second position sensor 240 may be a spatial center in the x-axis, y-axis, and z-axis directions.

In another embodiment, at least a portion of the second position sensor 240 may overlap the second coil 230 in a direction perpendicular to the optical axis.

In an example, the second position sensor 240 may overlap the holes 41A to 41C in the holder 270 in the optical-axis direction. In addition, in an example, the second position sensor 240 may overlap the cavity in the second coil 230 in the optical-axis direction. In addition, in an example, at least some of the holes 41A to 41C in the holder 270 may overlap the cavity in the second coil 230 in the optical-axis direction.

In an example, the second position sensor 240 may include a first sensor 240A, a second sensor 240B, and a third sensor 240C, which are spaced apart from each other.

For example, each of the first to third sensors 240A to 240C may be a Hall sensor. In another embodiment, each of the first to third sensors 240A to 240C may be a driver IC including a Hall sensor and a driver. The description of the first position sensor 170 may be equally or similarly applied to the first to third sensors 240A to 240C.

In still another embodiment, each of the first and second sensors 240A and 240B may be a Hall sensor or a driver IC including a Hall sensor, and the third sensor 240C may be a sensor that is different from or is of a different type from the first sensor 240A and/or the second sensor 240B. For example, each of the first sensor 240A and the second sensor 240B may be a displacement detection sensor, and the third sensor 240C may be an angle sensor configured to detect rotation, tilting, or rolling. For example, the third sensor 240C may be a rotation (rolling) detection sensor configured to detect rotation, tilting, or rolling of the OIS moving unit about the optical axis. For example, the third sensor 240C may be a magnetic angle sensor. For example, the third sensor 240C may be a tunnel magnetoresistance (TMR) sensor. For example, the TMR sensor may be a TMR magnetic angle sensor.

In another embodiment, each of the first to third sensors 240A to 240C may be a magnetic sensor. For example, each of the first to third sensors 240A to 240C may be a tunnel magnetoresistance (TMR) sensor.

Each of the first to third sensors 240A, 240B, and 240C may be conductively connected to the first circuit board 250.

In an example, each of the first to third sensors 240A, 240B, and 240C may be disposed below the cavity in a corresponding one of the coil units 230-1 to 230-3. In an example, each of the first to third sensors 240A, 240B, and 240C may be disposed in a corresponding one of the holes 41A to 41C in the holder 270.

In an example, each of the first to third sensors 240A, 240B, and 240C may not overlap a corresponding one of the coil units 230-1 to 230-3 in a direction perpendicular to the optical axis. The first to third sensors 240A, 240B, and 240C may overlap the holder 270 in a direction perpendicular to the optical axis.

Since the first to third sensors 240A, 240B, and 240C are disposed so as not to overlap the OIS coil 230 in a direction perpendicular to the optical axis, the influence of the magnetic field of the OIS coil 230 on the output of the OIS position sensor 240 may be reduced, and accordingly, it is possible to accurately perform OIS feedback operation and to ensure the reliability of OIS operation.

The OIS position sensor 240 may face, correspond to, or overlap the first magnet 130 in the optical-axis direction.

In an example, at least a portion of the first sensor 240A may overlap at least one of the first magnet unit 130-1 of the first magnet 130 or the yoke 410 in the optical-axis direction, and the first sensor 240A may output a first output signal (e.g., first output voltage) corresponding to the result of detection of the magnetic field of the first magnet unit 130-1.

In an example, at least a portion of the second sensor 240B may overlap at least one of the second magnet unit 130-2 of the first magnet 130 or the yoke 410 in the optical-axis direction, and the second sensor 240B may output a second output signal (e.g., second output voltage) corresponding to the result of detection of the magnetic field of the second magnet unit 130-2.

In addition, in an example, at least a portion of the third sensor 240C may overlap at least one of the third magnet unit 130-3 of the first magnet 130 or the yoke 410 in the optical-axis direction, and the third sensor 240C may output a third output signal (e.g., third output voltage) corresponding to the result of detection of the magnetic field of the third magnet unit 130-3.

In an example, at the initial position of the OIS moving unit, the center of the first sensor 240A may correspond to, face, or overlap the center of the first magnet unit 130-1 in the optical-axis direction, the center of the second sensor 240B may correspond to, face, or overlap the center of the second magnet unit 130-2 in the optical-axis direction, and the center of the third sensor 240C may correspond to, face, or overlap the center of the third magnet unit 130-3 in the optical-axis direction.

In an example, the center of each of the first to third sensors 240A to 240C may be the center of the magnetic detection area of each of the first to third sensors 240A to 240C.

Alternatively, in an example, the center of each of the first to third magnet units 130-1 to 130-3 may be the center of the boundary area between the N pole and the S pole. In another embodiment, the center of the third sensor 240C may not overlap the center of the third magnet unit 130-3 in the optical-axis direction.

The base 210 may be disposed under the first board unit 255. The base 210 may have a polygonal shape, for example, a quadrangular shape, which coincides with or corresponds to the shape of the cover member 300 or the first board unit 255.

In an example, the base 210 may include a lower plate 21A and a side plate 21B protruding from the edge of the lower plate 21A. The lower plate 21A may correspond to or face a first region 801 of the second board unit 800, and the side plate 21B may protrude or extend from the lower plate 21A toward the side plate 302 of the cover member 300. In an example, the base 210 may include a bore 210A formed in the lower plate 21A thereof. The bore 210A in the base 210 may be a through-hole formed through the base 210 in the optical-axis direction. In another embodiment, the base may not have a bore.

In an example, the side plate 21B of the base 210 may be coupled to the side plate 302 of the cover member 300. The base 210 may include a stair 211 (refer to FIG. 18A), to which an adhesive is applied in order to be bonded to the side plate 302 of the cover member 300. In this case, the stair 211 may guide the side plate 302 of the cover member 300 to be coupled to the upper side thereof. The stair 211 of the base 210 and the lower end of the side plate 302 of the cover member 300 may be bonded and fixed to each other by means of an adhesive or the like.

The base 210 may include at least one protruding portion 216A to 216D, which protrudes from the lower plate 21A. In an example, the at least one protruding portion 216A to 216D may protrude from the side plate 21B of the base 210.

In an example, the side plate 21B of the base 210 may include four side plates, and each of the protruding portions 216A to 216D may be formed on a respective one of the four side plates. In an example, each of the protruding portions 216A to 216D may be disposed or located on the center of a respective one of the four side plates.

The second board unit 800 may be disposed under the base 210. In an example, the second board unit 800 may be disposed under the lower plate 21A of the base 210. The second board unit 800 may be coupled to the base 210. In an example, the second board unit 800 may be coupled to the lower plate 21A of the base 210. In an example, the second board unit 800 may be coupled to the lower surface of the lower plate 21A of the base 210.

The second board unit 800 may serve to supply a signal from the outside to the image sensor unit 350 or to output a signal from the image sensor unit 350 to the outside.

The second board unit 800 may include a first region (or a first board) 801 corresponding to the AF moving unit 100 or the image sensor 810, a second region (or a second board) 802 in which the connector 804 is disposed, and a third region (or a third board) 803 interconnecting the first region 801 and the second region 802. The connector 804 may be provided with ports in order to be conductively connected to the second region 802 of the second board unit 800 and to be conductively connected to an external device (e.g., the optical instrument 200A). The bore 210A in the base 210 may be closed or blocked by the first region 801 of the second board unit 800.

Each of the first region 801 and the second region 802 of the second board unit 800 may include a rigid substrate, and the third region 803 may include a flexible substrate. In addition, each of the first region 801 and the second region 802 may further include a flexible substrate.

In another embodiment, at least one of the first to third regions 801 to 803 of the second board unit 800 may include at least one of a rigid substrate or a flexible substrate.

The second board unit 800 may be disposed behind the first board unit 255. In an example, the first board unit 255 may be disposed between the AF moving unit 100 and the second board unit 800.

When viewed from above, the first region 801 of the second board unit 800 may have a polygonal shape (e.g., a quadrangular shape, a square shape, or a rectangular shape), but the disclosure is not limited thereto. In another embodiment, the first region of the second board unit may have a circular shape.

The second board unit 800 may include a plurality of pads 800B corresponding to the terminals 311 of the support board 220. Here, the pad 800B may alternatively be referred to as a "terminal".

Referring to FIG. 10A, the plurality of pads 800B may be formed in the first region 801 of the second board unit 800. In an example, the second board unit 800 may include first pads, which are disposed or arranged on one side of the first region 801 so as to be spaced apart from each other in the third direction (e.g., the y-axis direction), and second pads, which are disposed or arranged on the opposite side of the first region 801 so as to be spaced apart from each other in the third direction (e.g., the y-axis direction).

In an example, the plurality of pads 800B may be formed on a first surface of the second board unit 800 (e.g., the first region 801), which faces the first board unit 255.

The second board unit 800 may include at least one coupling hole 800C formed therein for coupling to a coupling protrusion 45B of the base 210. The coupling hole 800C may be a through-hole formed through the second board unit 800 in the optical-axis direction. In another embodiment, the coupling hole may take the form of a recess.

In an example, the coupling protrusion 45B may protrude from the lower surface of the base 210, and may be formed on each of the corners of the lower surface of the base 210, which face each other in an oblique direction. In addition, the coupling hole 800C may be formed in each of the corners of the second board unit 800, which face each other in an oblique direction.

In another embodiment, the coupling hole in the second board unit 800 may be disposed adjacent to at least one of the sides or the corners of the first region 801.

The support board 310 may conductively connect the first board unit 255 to the second board unit 800. The support board 310 may alternatively be referred to as a "support member", a "connection board", or a "connection part".

The support board 310 may include a flexible substrate, or may be embodied as a flexible substrate. In an example, the support board 310 may include a flexible printed circuit board (FPCB). At least a portion of the support board 310 may be flexible. The first circuit board 250 and the support board 310 may be connected to each other.

In an example, the support board 310 may include a connection portion 320, which is connected to the first circuit board 250. In an example, the first circuit board 250 and the support board 310 may be integrally formed with each other. In another embodiment, the first circuit board 250 and the support board 310 may be provided separately from each other, rather than being integrated, and may be connected to each other via the connection portion 320 and may be conductively connected to each other.

In addition, the support board 310 may be conductively connected to the first circuit board 250. The support board 310 may be conductively connected to the second board unit 800.

The support board 310 may guide movement of the OIS moving unit. The support board 310 may guide the OIS moving unit to move in a direction perpendicular to the optical-axis direction. The support board 310 may guide the OIS moving unit to rotate about the optical axis. The support board 310 may restrict movement of the OIS moving unit in the optical-axis direction.

A portion of the support board 310 may be connected to the first circuit board 250, which is the OIS moving unit, and another portion of the support board 310 may be coupled to the base 210, which is the fixed unit. In an example, the connection portion 320 of the support board 310 may be coupled to the first circuit board 250. In addition, bodies 86 and 87 of the support board 310 may be coupled to protruding portions of the base 210, and terminal units 7A, 7B, 8A, and 8B of the support board 310 may be coupled to the second board unit 800.

Referring to FIGS. 15 to 18B, the support board 310 may include an elastic unit 310A and a circuit member 310B. The elastic unit 310A serves to elastically support the OIS moving unit, and may be embodied as an elastic body, for example, a spring. The elastic unit 310A may include metal, or may be made of an elastic material.

FIGS. 16(*a*)-16(*d*) illustrate embodiments of the elastic unit 310A.

The elastic unit 310A1 shown in FIG. 16(*a*) may include a planar portion 371A and an uneven portion 371B. The planar portion 371A may be provided in plural, and the uneven portion 371B may be formed between two planar portions. In an example, the uneven portion 371B may include at least one of a first bump 371B1 and a second bump 371B2. In an example, the first bump 371B1 and the second bump 371B2 may be formed to be symmetrical with each other in the vertical direction.

The elastic unit 310A2 shown in FIG. 16(*b*) may include a planar portion 372A and an uneven portion 372B. The planar portion 372A may be provided in plural, and the uneven portion 372B may be formed between two planar portions 372A. For example, the uneven portion 372B may take the form of a sinusoidal curve, sawteeth, or zigzag.

The elastic unit 310A3 shown in FIG. 16(*c*) may include a first planar portion 373A and a second planar portion 373B. The length of the first planar portion 373A in the first direction (or the optical-axis direction) may be different from the length of the second planar portion 373B in the first direction (or the optical-axis direction). In an example, the former may be longer than the latter. The first planar portion 373A may be provided in plural, and the second planar portion 373B may be provided in plural. In an example, the first planar portion 373A and the second planar portion 373B may be formed to be uneven.

The elastic unit 310A4 shown in FIG. 16(*d*) may include a first planar portion 373A, a second planar portion 373B, and a protruding portion (or an extension portion) protruding or extending from the first planar portion 373A.

In another embodiment, only corner portions of each of the elastic units shown in FIGS. 16(*a*) to 16(*d*) may be included.

The elastic unit 310A may include at least one of the elastic units 310A1 to 310A4 shown in FIGS. 16(*a*) to 16(*d*).

The circuit member 310B serves to conductively connect the first circuit board 250 to the second board unit 800, and may be embodied as a flexible substrate or may include at least one of a flexible substrate or a rigid substrate. The circuit member 310B may be, for example, an FPCB.

The elastic unit 310A may be coupled to the circuit member 310B, and may serve to increase the strength of the circuit member 310B. Referring to FIGS. 15 and 17, the elastic unit 310A may be disposed outside the circuit member 3101B, and the outer side surface of the circuit member 310B may be coupled to the inner side surface of the elastic unit 310A. In another embodiment, the circuit member may be disposed outside the elastic unit.

The support board 310 may be connected to the first board unit 255 (e.g., the first circuit board 250), and may include one or more connection portions 320A and 320B, which are conductively connected to the first board unit 255 (e.g., the first circuit board 250). In addition, the support board 310 may be connected to the second board unit 800, and may include one or more terminal units 7A, 7B, 8A, and 8B, which are conductively connected to the second board unit 800. Each of the terminals 7A, 7B, 8A, and 8B may include a plurality of terminals 311.

Referring to FIGS. 15 and 17, the support board 310 may include a first support board 310-1 and a second support board 310-2, which are spaced apart from each other. The first support board 310-1 and the second support board 310-2 may be formed to be bilaterally symmetrical with each other. In another embodiment, the first support board 310-1 and the second support board 310-2 may be integrated into a single board.

As shown in FIG. 17, the first and second support boards 310-1 and 310-2 may be disposed on respective sides of the first circuit board 250. In an example, the first support board 310-1 may include a first body 86 and at least one terminal unit 7A and 7B extending from the first body 86. The at least one terminal unit 7A and 7B of the first support board 310-1 may include a plurality of terminals 311.

The second support board 310-2 may include a second body 87 and at least one terminal unit 8A and 8B extending from the second body 87. The at least one terminal unit 8A and 8B of the second support board 310-2 may include a plurality of terminals 311.

The first circuit board 250 may include a first side portion 33A and a second side portion 33B, which are located opposite each other, and may include a third side portion 33C and a fourth side portion 33D, which are located between the first side portion 33A and the second side portion 33B and are located opposite each other.

The first body 86 may include a first portion 6A, which corresponds to or faces the first side portion 33A of the first circuit board 250, a second portion 6B, which corresponds to a portion (or one side) of the third side portion 33C of the first circuit board 250, and a third portion 6C, which corresponds to a portion (or one side) of the fourth side portion 33D of the first circuit board 250. In addition, the first body 86 may include a first bent portion 6D, which interconnects the first portion 6A and the second portion 6B and is bent from one end of the first portion 6A, and a second bent portion 6E, which interconnects the first portion 6A and the third portion 6C and is bent from the other end of the first portion 6A.

The first support board 310-1 may include a first terminal unit 7A, which extends or protrudes from the second portion 6B of the first body 86 toward the second board unit 800, and a second terminal unit 7B, which extends or protrudes from the third portion 6C of the first body 86 toward the second board unit 800. The second terminal unit 7B may be located opposite the first terminal unit 7A.

The first support board 310-1 may include a first connection portion 320A, which interconnects the first portion 6A of the first body 86 and the first side portion 33A of the first circuit board 250. The first connection portion 320A may include a bent portion.

The second body 87 may include a first portion 9A, which corresponds to or faces the second side portion 33B of the first circuit board 250, a second portion 9B, which corresponds to another portion (or opposite side) of the third side portion 33C of the first circuit board 250, and a third portion 9C, which corresponds to another portion (or opposite side) of the fourth side portion 33D of the first circuit board 250. In addition, the second body 87 may include a first bent portion 9D, which interconnects the first portion 9A and the second portion 9B and is bent from one end of the first portion 9A, and a second bent portion 9E, which interconnects the first portion 9A and the third portion 9C and is bent from the other end of the first portion 9A.

The second support board 310-2 may include a third terminal unit 8A, which extends or protrudes from the second portion 9B of the second body 87 toward the second board unit 800, and a fourth terminal unit 8B, which extends or protrudes from the third portion 9C of the second body 87 toward the second board unit 800. The fourth terminal unit 8B may be located opposite the third terminal unit 8A.

The second support board 310-2 may include a second connection portion 320B, which interconnects the first portion 9A of the second body 87 and the second side portion 33B of the first circuit board 250. The second connection portion 320B may include a bent portion.

In addition, the first support board 310-1 may include a first flexible board 31A, which conductively connects the first board unit 255 (e.g., the first circuit board 250) to the second board unit 800, and a first elastic member 30A, which is coupled to the first flexible board 31A.

The second support board 310-2 may include a second flexible board 31B, which conductively connects the first board unit 255 (e.g., the first circuit board 250) to the second board unit 800, and a second elastic member 30B, which is coupled to the second flexible board 31B.

The terminal unit (e.g., 8B) of the support board 310 may be provided with terminals P1 to P4 in order to be conductively connected to the terminals B1 to B4 of the terminal unit 95 of the circuit board 190 of the AF moving unit 100. The terminals B1 to B4 of the terminal unit 95 of the circuit board 190 and the terminals P1 to P4 of the terminal unit 8B of the support board 310 may be conductively connected to each other by means of solder or a conductive adhesive. That is, the circuit board 190 of the AF moving unit 100 may be conductively connected to the second board unit 800 via the support board 310.

Referring to FIG. 17, the circuit member 310B of the support board 310 may include a first insulating layer 29A, a second insulating layer 29B, and a conductive layer 29C formed between the first insulating layer 29A and the second insulating layer 29B. The conductive layer 29C may be a wiring layer for transmitting an electrical signal. In an example, the second layer 29B may be located outside the first layer 29A.

Each of the first and second insulating layers 29A and 29B may be formed of an insulative material, such as polyimide, and the conductive layer 29C may be formed of a conductive material, such as copper, gold, or aluminum, or may be formed of an alloy including copper, gold, or aluminum.

The elastic unit 310A may be disposed on the second layer 29B. The elastic unit 310A may include at least one of copper, titanium, or nickel, or may be formed of an alloy including at least one of copper, titanium, or nickel in order to serve as a spring. In an example, the elastic unit 310A may be formed of an alloy of copper and titanium or an alloy of copper and nickel.

The elastic unit 310A may be conductively connected to the ground of the first board unit 255 or the ground of the second board unit 800. The elastic unit 310A may be used for impedance matching of transmission lines (or wires) of the board units 255, 310, and 800, and may reduce loss of transmission signals through impedance matching to reduce the influence of noise.

The support board 310 may further include a protective material or an insulative material enveloping or covering the elastic unit 310A.

In an example, the thickness T11 of the conductive layer 29C between the first layer 29A and the second layer 29C may be 7 micrometers to 50 micrometers. In another embodiment, the thickness T11 may be 15 micrometers to 30 micrometers.

In addition, in an example, the thickness T12 of the elastic unit 310A may be 20 micrometers to 150 micrometers. In another embodiment, the thickness T12 may be 30 micrometers to 100 micrometers. In an example, the thickness T12 of the elastic unit 310A may be larger than the thickness T11 of the conductive layer 29C. In another embodiment, T12 may be equal to or smaller than T11.

Referring to FIGS. 14B, 15, 17, 18A, and 18B, the holder 270 may include first to fourth side portions corresponding to the first to fourth side portions 33A to 33D of the first circuit board 250. The at least one connection portion 320A and 320B of the support board 310 may be coupled to at least one of the first to fourth side portions of the holder 270 by means of an adhesive. In an example, the first connection portion 320A may be coupled to the first side portion of the holder 270 by means of an adhesive, and the second connection portion 320B may be coupled to the second side portion of the holder 270 by means of an adhesive.

The first to fourth side portions of the holder 270 may be provided with protruding portions 4A to 4D. In an example, the first connection portion 320A and the first protruding portion 4A formed on the first side portion of the holder 270 may form a first coupling region (38A in FIG. 18A), in which the first connection portion 320A and the first protruding portion 4A are coupled to each other. The second connection portion 320B and the second protruding portion 4B formed on the second side portion of the holder 270 may form a second coupling region (38B in FIG. 18A), in which the second connection portion 320B and the second protruding portion 4B are coupled to each other.

In addition, the base 210 may include first to fourth side portions corresponding to the first to fourth side portions 33A to 33D of the first circuit board 250. In an example, the side plate 21B of the base 210 may include the first to fourth side portions of the base 210. The first to fourth side portions of the base 210 may be provided with protruding portions 216A to 216D.

At least a portion of the support board 310 may be coupled to the base 210. In an example, the bodies 86 and 87 of the support board 310 may be coupled to the base 210 by means of an adhesive. In an example, a portion of each of the bodies 86 and 87 of the support board 310, which are connected to the terminal units 7A, 7B, 8A, and 8B, may be coupled to the base 210.

In an example, the first terminal unit 7A and/or the second portion 6B of the first support board 310-1 may be coupled to one region of the third side portion (or the third protruding portion 216C) of the base 210, and the second terminal unit 7B and/or the third portion 6C of the first support board 310-1 may be coupled to one region of the fourth side portion (or the fourth protruding portion 216D) of the base 210.

In an example, the third terminal unit 8A and the second portion 9B of the second support board 310-2 may be coupled to another region of the third side portion (or the third protruding portion 216C) of the base 210, and the fourth terminal unit 8B and the third portion 9C of the second support board 310-2 may be coupled to another region of the fourth side portion (or the fourth protruding portion 216D) of the base 210.

A third coupling region (39A in FIG. 18A) may be formed between the first and third terminal units 7A and 8A of the support board 310 and the third side portion (or the third protruding portion 216C) of the base 210, and a fourth coupling region (39B in FIG. 18A) may be formed between the second and fourth terminal units 7B and 8B and the fourth side portion (or the fourth protruding portion 216D) of the base 210. The OIS moving unit may be elastically supported with respect to the fixed unit by the support board 310 and the first to fourth coupling regions 38A, 38B, 39A, and 39B. The terminals 311 of the support board 310 may be coupled and conductively connected to the terminals of the second board unit 800 by means of solder or a conductive adhesive.

In another embodiment, the support member may be an elastic member including no substrate, for example, a spring, a wire, a shape memory alloy, or a ball member.

The elastic member 315 may elastically support the first board unit 255 with respect to the base 210. In an example, one end of the elastic member 315 may be coupled to the first board unit 255, and the other end of the elastic member 315 may be coupled to the base 210.

Referring to FIGS. 18A, 18B, and 19, the elastic member 315 may include a first coupling portion 315A, which is coupled to the first circuit board 250 of the first board unit 255, a second coupling portion 315B, which is coupled to the base 210, and a connection portion 315C, which interconnects the first coupling portion 315A and the second coupling portion 315B.

In an example, the first coupling portion 315A may be coupled to at least a portion of the lower surface of the first circuit board 250. Alternatively, the first coupling portion 315A may be coupled to at least a portion of the lower surface of the holder 270. In an example, the first coupling portion 315A may be coupled to at least one of the lower surface of the first circuit board 250 or the lower surface of the holder 270 by means of an adhesive.

In an example, the second coupling portion 315B may be coupled to at least a portion of the upper surface of the base 210. In an example, the base 210 may be provided on the upper surface thereof with at least one protrusion 210-1, and the second coupling portion 315B may have a hole 315-1 formed therein for coupling to the at least one protrusion 210-1 of the base 210. The protrusion 210-1 may be formed on a corner of the upper surface of the base 210, and the hole 315-1 may be formed in a corner of the second coupling portion 315B.

In an example, when viewed in the first direction or from below, each of the first coupling portion 315A and the second coupling portion 315B may have a polygonal shape, such as a quadrangular shape, and may take the form of a closed curve. In an example, when viewed in the first direction or from below, the shape of the first coupling portion 315A may be a quadrangular ring shape.

In an example, when viewed in the first direction or from below, the first coupling portion 315A may be disposed inside the second coupling portion 315B. Each of the first coupling portion 315A and the second coupling portion 315B may take the form of a plate.

The connection portion 315C may include at least one of at least one linear portion or at least one bent portion. In an example, the connection portion 315C may take the form of a wire. In another embodiment, the connection portion 315C may take the form of a plate.

The connection portion 316C may include a plurality of connection portions or connection lines, which are spaced apart from each other. Each of the plurality of connection portions (or connection lines) may include at least one of at least one linear portion or at least one bent portion. In an example, the connection portion 316C may extend in a direction perpendicular to the optical axis.

The image sensor unit 350 may include at least one of a motion sensor 820, a controller 830, a memory 512, or a capacitor 514.

The motion sensor 820, the controller 830, and the memory 512 may be disposed on any one of the first board unit 255 and the second board unit 800. The capacitor 514 may be disposed on at least one of the first board unit 255 or the second board unit 800.

In an example, the motion sensor 820 and the memory 512 may be disposed on the second board unit 800 (e.g., the first region 801). In an example, the controller 830 may be disposed or mounted on the first circuit board 250 of the first board unit 255.

In another embodiment, the controller 830 may be disposed on the second board unit 800. Because the heat generated from the image sensor 810 may cause malfunction or errors of the controller 830, it may be preferable for the controller 830 to be located far away from the image sensor 810.

The motion sensor 820 may be conductively connected to the controller 830 via wirings or circuit patterns formed on the first board unit 255 and the second board unit 800. The motion sensor 820 may output rotational angular speed information regarding the movement of the camera device 10. The motion sensor 820 may be embodied as a two-axis or three-axis gyro sensor or an angular speed sensor. In an example, the motion sensor 820 may output information about the movement amount in the X-axis direction, the movement amount in the y-axis direction, and the rotation amount in response to movement of the camera device 10.

In another embodiment, the motion sensor 820 may be omitted from the camera device 10, or may be disposed in another region of the second board unit 800. In the case in which the motion sensor 820 is omitted from the camera module, the camera device 10 may receive position information from a motion sensor provided in the optical instrument 200A in response to movement of the camera device 10.

The memory 512 may store a first data value (or a code value) corresponding to the output from the second position sensor 240 according to displacement (or stroke) of the OIS moving unit in the second direction (e.g., the X-axis direction) perpendicular to the optical axis in order to implement OIS feedback operation.

In addition, the memory 512 may store a second data value (or a code value) corresponding to the output from the first position sensor 170 according to displacement (or stroke) of the bobbin 110 in the first direction (e.g., the optical-axis direction or the Z-axis direction) in order to implement AF feedback operation.

In an example, each of the first and second data values may be stored in the memory 512 in the form of a look-up table. Alternatively, each of the first and second data values may be stored in the memory 512 in the form of an equation or an algorithm. In addition, the memory 512 may store an equation, an algorithm, or a program for operation of the controller 830. In an example, the memory 512 may be a non-volatile memory, for example, an electrically erasable programmable read-only memory (EEPROM).

The controller 830 may be conductively connected to the first position sensor 170 and the second position sensor 240.

The controller 830 may control a driving signal that is supplied to the second coil 230 using the output signal received from the second position sensor 240 and the first data value stored in the memory 512, and may perform feedback OIS operation.

In addition, the controller 830 may control a driving signal that is supplied to the first coil 120 using the output signal from the first position sensor 170 and the second data value stored in the memory 512, and may perform feedback autofocus operation.

The controller 830 may be embodied as a driver IC, but the disclosure is not limited thereto. In an example, the controller 830 may be conductively connected to the terminals 251 of the first circuit board 250 of the first board unit 255.

The image sensor unit 350 may further include a filter 610. In addition, the image sensor unit 350 may further include a filter holder 600, in which the filter 610 is disposed, seated, or accommodated. The filter holder 600 may alternatively be referred to as a "sensor base".

The filter 610 may serve to block or allow introduction of light within a specific wavelength range, among the light that has passed through the lens barrel 400, into the image sensor 810.

The filter 610 may be, for example, an infrared cut filter. In an example, the filter 610 may be disposed parallel to the xy-plane, which is perpendicular to the optical axis OA. The filter 610 may be disposed below the lens module 400.

The filter holder 600 may be disposed below the AF moving unit 100. In an example, the filter holder 600 may be disposed on the first board unit 255. In an example, the filter holder 600 may be disposed on the first surface 260A of the second circuit board 260 of the first board unit 255.

The filter holder 600 may be coupled to one region of the second circuit board 260 around the image sensor 810 by means of an adhesive, and may be exposed through the bore 250A in the first circuit board 250. In an example, the filter holder 600 may be visible through the bore 250A in the first circuit board 250 of the first board unit 255. In an example, the bore 250A in the first circuit board 250 may expose the filter holder 600 disposed on the second circuit board 260 and the filter 610 disposed on the filter holder 600. In another embodiment, the filter holder may be coupled to the holder 270 or to the AF moving unit 100.

The filter holder 600 may have a bore 61A formed in a portion thereof, on which the filter 610 is mounted or disposed, in order to allow the light passing through the filter 610 to be introduced into the image sensor 810. The bore 61A in the filter holder 600 may be a through-hole formed through the filter holder 600 in the optical-axis direction. In an example, the bore 61A in the filter holder 600 may be formed through the center of the filter holder 600, and may be disposed so as to correspond to or face the image sensor 810.

The filter holder 600 may include a seating portion 500, which is depressed in the upper surface thereof to allow the filter 610 to be seated therein. The filter 610 may be disposed, seated, or mounted in the seating portion 500. The seating portion 500 may be formed so as to surround the bore 61A. In another embodiment, the seating portion of the filter holder may take the form of a protruding portion protruding from the upper surface of the filter.

The image sensor unit 350 may further include an adhesive disposed between the filter 610 and the seating portion 500, and the filter 610 may be coupled or attached to the filter holder 600 by means of the adhesive.

The cover member 300 may take the form of a box that has an open lower portion and includes an upper plate 301 and side plates 302. The lower portions of the side plates 302 of the cover member 300 may be coupled to the base 210. The shape of the upper plate 301 of the cover member 300 may be a polygonal shape, for example, a quadrangular shape or an octagonal shape. The cover member 300 may have a bore 303 formed in the upper plate 301 thereof to expose the lens of the lens module 400 coupled to the bobbin 110 to external light.

Referring to FIGS. 1 and 3, any one of the side plates 302 of the cover member 300 may have a recess portion 304 formed therein to expose the terminal 95 of the circuit board 190 and the terminal 800B of the second board unit corresponding thereto.

The cover member 300 may include a protruding portion 305 extending from the upper plate 301 toward the groove 119 in the bobbin 110. The protruding portion 305 may alternatively be referred to as an "extension portion". In an example, the cover member 300 may include at least one protruding portion 305 extending from one region adjacent to the bore 303 formed in the upper plate 301 toward the upper surface of the bobbin 110. The protruding portion 305 may be integrally formed with the upper plate 301 and the side plates 302, and may be made of the same material as the upper plate 301 and the side plates 302.

In an example, the cover member 300 may include four protruding portions corresponding to the four corners of the upper plate 301. In another embodiment, the number of protruding portions 305 may be one or two or more.

In an example, the protruding portion 305 may take the form of a polygonal-shaped plate, for example, a quadrangular-shaped plate. In an example, at least part of the protruding portion 305 may include a curved portion.

At least part of the protruding portion 305 of the cover member 300 may be disposed in or inserted into the groove 119 in the bobbin 110. In an example, one end or a distal end of the protruding portion 305 may be disposed in the groove 119 in the bobbin 110. In an example, at the initial position of the bobbin 110, the protruding portion 305 and the bottom surface of the groove 119 in the bobbin 110 may be spaced apart from each other.

When the bobbin 110 is moved in the optical-axis direction during AF operation, the protruding portion 305 of the cover member 300 may come into contact with the bottom surface of the groove 119 in the bobbin 110. Accordingly, the protruding portion 305 may serve as a stopper restricting movement of the bobbin 110 in the upward direction within a predetermined range. In addition, since at least part of the protruding portion 305 is disposed in the groove 119 in the bobbin 110, the protruding portion 305 may suppress or inhibit the bobbin 110 from rotating beyond a predetermined range about the optical axis due to impact.

In an example, the cover member 300 may be formed of an injection-molded material, for example, plastic or resin. In addition, the cover member 300 may be made of an insulative material or a material capable of blocking electromagnetic waves.

The cover member 300 and the base 210 may accommodate the AF moving unit 100 and the image sensor unit 350, may protect the AF moving unit 100 and the image sensor unit 350 from external impact, and may inhibit introduction of external foreign substances thereinto.

The OIS moving unit is movable relative to the fixed unit in a direction perpendicular to the optical axis OA. The OIS moving unit is spaced apart from the fixed unit by a predetermined distance. That is, the OIS moving unit may be suspended (flown) from the fixed unit by the support board 310. The OIS moving unit may be moved relative to the fixed unit by first electromagnetic force generated by the first magnet 130 and the second coil 230.

In an example, at the initial position of the OIS moving unit, the outer surface of the holder 270 may be spaced apart from the inner surface of the base 210 by a predetermined distance. In addition, in an example, at the initial position of the OIS moving unit, the lower surfaces of the holder 270 and the first board unit 255 may be spaced apart from the base 210 by a predetermined distance.

The initial position of the OIS moving unit may be the original position of the OIS moving unit in the state in which no power is applied to the second coil 230 or a position at which the OIS moving unit is located as the result of the support board being elastically deformed due only to the weight of the OIS moving unit.

In addition, the initial position of the OIS moving unit may be a position at which the OIS moving unit is located when gravity acts in the direction from the first board unit 255 toward the second board unit 800 or when gravity acts in the opposite direction.

In an example, the first to fourth coil units 230-1 to 230-4 of the second coil 230 may controlled by four channels. In this case, the four coil units 230-1 to 230-4 may be controlled in the state of being conductively separated from each other. In an example, any one of a forward direction current and a reverse direction current may be selectively applied to each of the coil units 230-1 to 230-4. In this case, four pairs of lead wires, i.e., a total of eight lead wires, may be led out from the second coil 230.

In another embodiment, the first to fourth coil units 230-1 to 230-4 of the second coil 230 may be controlled by three channels in order to implement OIS operation. In an example, the first to third coil units 230-1 to 230-3 may be conductively separated from each other, and the fourth coil unit 230-4 may be conductively connected in series to any one of the first to third coil units. In this case, three pairs of lead wires, i.e., a total of six lead wires, may be led out from the second coil 230.

In an example, the second coil unit 230-2 and the fourth coil unit 230-4 may be connected in series to each other. The magnetization direction of the second magnet unit 130-2, which corresponds to or faces the second coil unit 230-2, and the magnetization direction of the fourth magnet unit 120-4, which corresponds to or faces the fourth coil unit 230-4, may be the same as each other. In an example, the magnetization direction of the first magnet unit 130-1 and the magnetization direction of the third magnet unit 130-3 may be the same as each other. In addition, in an example, the magnetization direction of the second magnet unit 130-2 may be different from the magnetization direction of the first magnet unit 130-1. In an example, the magnetization direction of the second magnet unit 130-2 may be perpendicular to the magnetization direction of the first magnet unit 130-1.

The controller 830 may supply at least one driving signal to at least one of the first to fourth coil units 230-1 to 230-4, and may control the at least one driving signal to move the OIS moving unit in the X-axis direction and/or the Y-axis direction or rotate the OIS moving unit within a predetermined angular range about the optical axis.

Figure 20A:
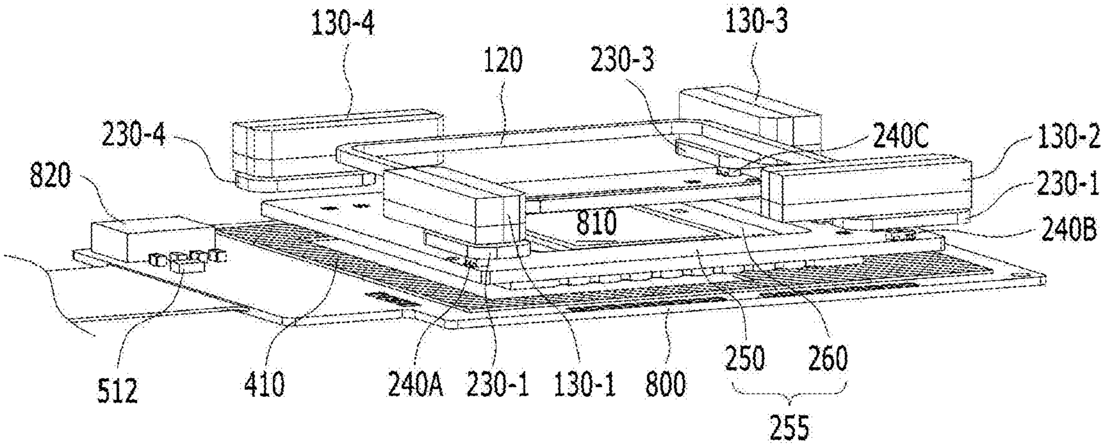
FIG. 20A is a perspective view of the first coil, the first magnet, the second coil, the yoke, and the first and second board units.
Figure 20B:
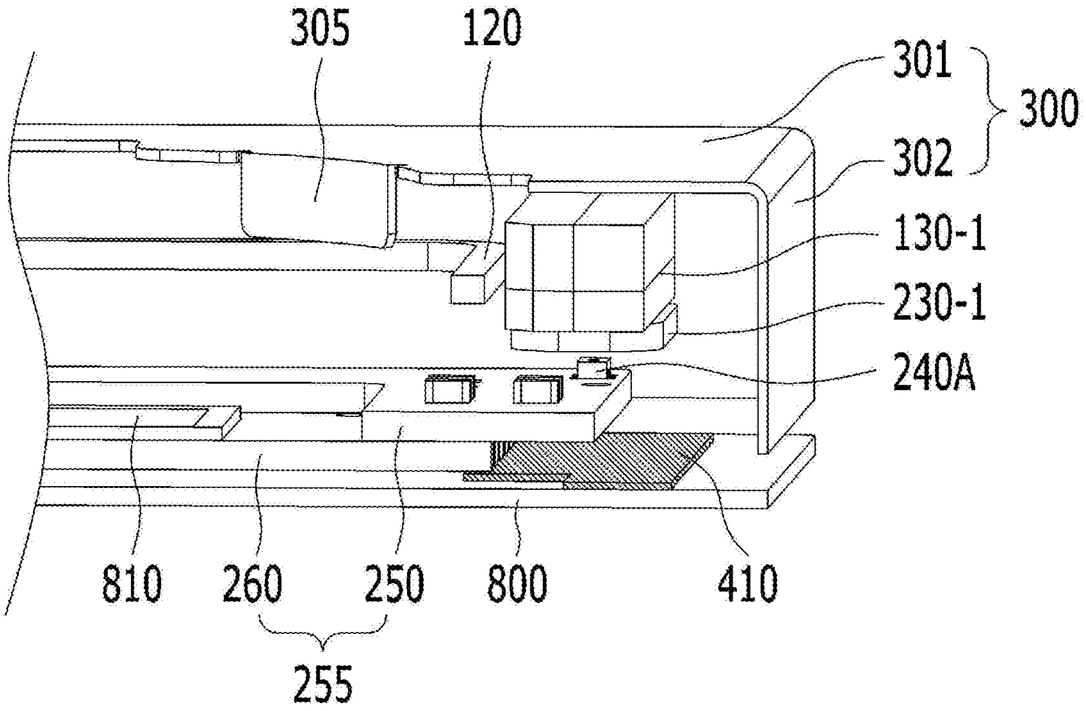
FIG. 20B is an enlarged view of a part of the camera device.
Figure 20C:
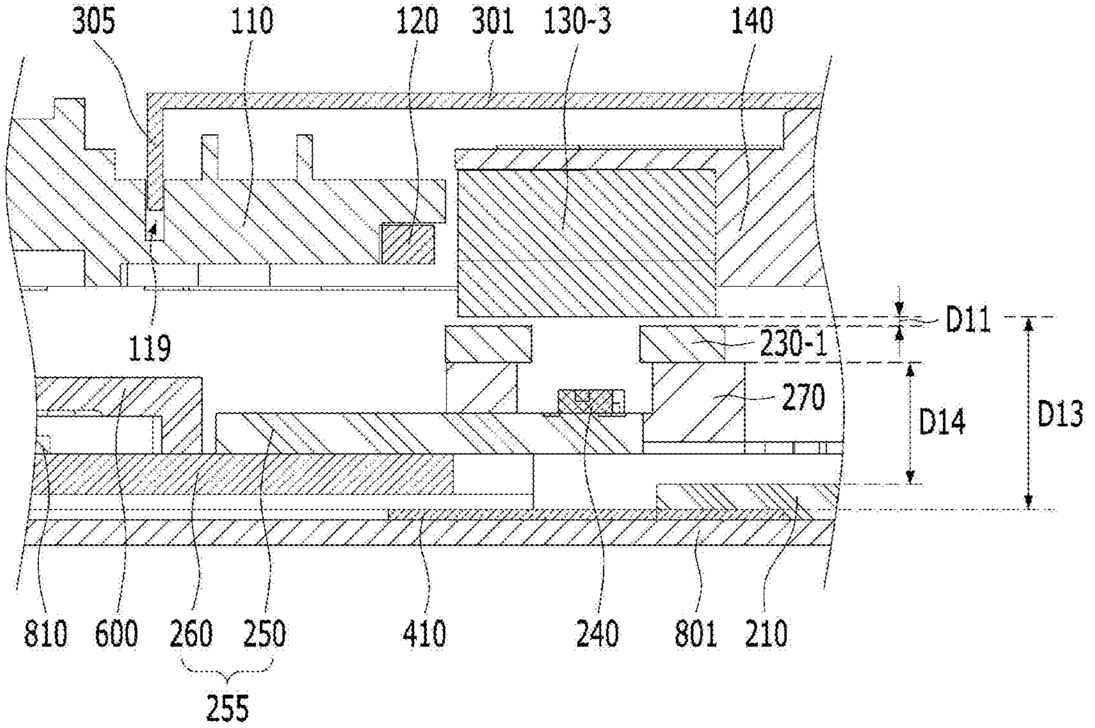
FIG. 20C illustrates a distance between the first magnet and the first coil, a distance between the first magnet and the yoke, and a distance between the second coil and the yoke.

FIG. 20A is a perspective view of the first coil 120, the first magnet 130, the second coil 230, the yoke 410, and the first and second board units 255 and 800, FIG. 20B is an enlarged view of a part of the camera device 10, and FIG. 20C illustrates a distance D11 between the first magnet 130 and the first coil 230, a distance D13 between the first magnet 130 and the yoke 410, and a distance D14 between the second coil 230 and the yoke 410.

Referring to FIGS. 10A, 10B, and 20A to 20C, the first magnet 130 may be disposed on the first board unit 255 (e.g., the first circuit board 250). The first magnet 130 may most influence electromagnetic force for AF operation and electromagnetic force for OIS operation.

In the embodiment, the electromagnetic force for movement of the OIS moving unit may be electromagnetic force caused by interaction between the second coil 230 and the first magnet 130 disposed on the second coil 230.

The embodiment may include a yoke 410 in order to increase electromagnetic force caused by interaction between the first magnet 130 and the second coil 230.

The yoke 410 may be disposed on the second board unit 800. The yoke 410 may be disposed on the upper surface of the first region 801 of the second board unit 800. In an example, the yoke 410 may be disposed between the second board unit 800 and the second coil 230. In an example, the yoke 410 may be disposed between the second board unit 800 and the first circuit board 250 of the first board unit 255. In another embodiment, the yoke may be disposed under the second board unit 800. In an example, in the other embodiment, the yoke may be disposed on the lower surface of the first region 801.

For example, the yoke 410 may be made of a metal or a magnetic material.

For example, the yoke 410 may include steel use stainless (SUS). For example, the yoke 410 may include iron (Fe). For example, the yoke 410 may be a magnetic member.

In an example, the yoke 410 may face or overlap the first magnet 130 in the first direction (or the optical-axis direction). In an example, the yoke 410 may have a plate shape, may include a cavity formed therein, and may be formed as a single body. In another embodiment, the yoke 410 may include a plurality of yokes corresponding to the magnet units 130-1 to 130-4 of the first magnet 130.

In an example, the yoke 410 may be disposed on the edge of the upper surface of the first region 801 of the second board unit 800. In an example, the yoke 410 may be disposed on the edge of the upper surface of the first region 801 of the second board unit 800 so as to have a predetermined width.

In an example, the yoke 410 may be in contact with the upper surface of the second board unit 800.

The yoke 410 may serve to increase electromagnetic force between the second coil 230 and the first magnet 130. In addition, the yoke 410 may function to dissipate heat from the second board unit 800. In an example, the yoke 410 may suppress increase in the temperature of the image sensor 810 by dissipating heat generated from the image sensor 810.

Figure 21A:
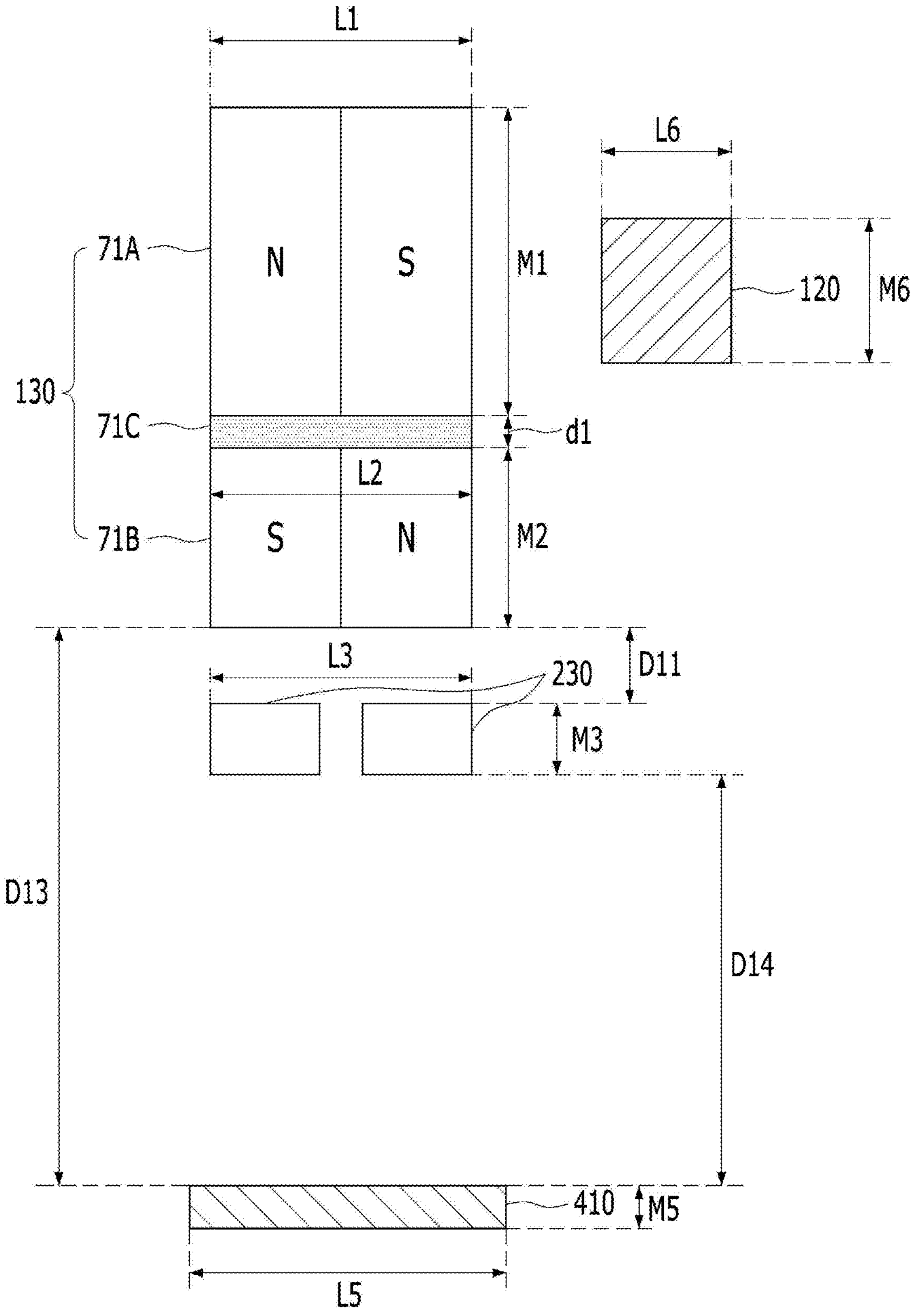
FIG. 21A illustrates an embodiment of the first magnet, the first coil, the second coil, and the yoke.

FIG. 21A illustrates an embodiment of the first magnet 130, the first coil 120, the second coil 230, and the yoke 410. Although one of the magnet units of the first magnet 130 and one of the coil units of the second coil 230 will be described with reference to FIG. 21A, the description given with reference to FIG. 21A may be equally or similarly applied to the remaining magnet units of the first magnet 130 and the remaining coil units of the second coil 230.

Referring to FIG. 21A, the first magnet 130 may include a first magnet part 71A, a second magnet part 71B, and a partition wall 71C disposed between the first magnet part 71A and the second magnet part 71B. In an example, the first magnet part 71A and the second magnet part 71B may be spaced apart from each other in the first direction (or the optical-axis direction).

The first magnet part 71A may include a first N pole and a first S pole. A first interface may be formed between the first N pole and the first S pole. The second magnet part 71B may include a second N pole and a second S pole. A second interface may be formed between the second N pole and the second S pole. In an example, the first N pole and the first S pole may face each other in a direction perpendicular to the first direction, and the second N pole and the second S pole may face each other in a direction perpendicular to the first direction.

Each of the first interface and the second interface may be a portion that has substantially no magnetism and includes a zone having almost no polarity, and may be a portion that is naturally generated in order to form a magnet composed of one N pole and one S pole. In an example, the first N pole may face or overlap the second S pole in the first direction (or the optical-axis direction), and the first S pole may face or overlap the second N pole in the first direction (or the optical-axis direction).

The partition wall 71C may be a portion that separates or isolates the first magnet part 71A and the second magnet part 71B from each other and has substantially no magnetism or almost no polarity. For example, the partition wall 71C may be implemented as a non-magnetic material or air. The partition wall 71C may be referred to as a "neutral zone" or a "neutral section". In an example, the width of the partition wall 71C may be larger than the width of the first interface (or the second interface). The width of the partition wall 71C may be a length of the partition wall in the first direction (or the optical-axis direction), and the width of the first interface (or the second interface) may be a length of the first interface between the first N pole (or the second N pole) and the first S pole (or the second S pole). In the embodiment, since the first magnet 130 is a bipolar-magnetized magnet, AF electromagnetic force and OIS electromagnetic force may be increased.

At the initial position of the AF moving unit, the first coil 120 may face or overlap the first magnet part 71A in a direction perpendicular to the first direction (or the optical-axis direction). Referring to FIG. 21A, the first S pole of the first magnet part 71A may be disposed so as to face the first coil 120, or the first S pole of the first magnet part 71A may be located closer to the first coil 120 than the first N pole. However, in another embodiment, the position of the first S pole and the position of the first N pole may be interchanged.

In an example, at the initial position of the OIS moving unit, at least a portion of the first magnet 130 may overlap at least a portion of the second coil 230 in the first direction (or the optical-axis direction). In an example, at the initial position of the OIS moving unit, at least a portion of the first magnet 130 may overlap at least a portion of the yoke 410 in the first direction (or the optical-axis direction). The first magnet 130 and the yoke 410 may face each other in the first direction (or the optical-axis direction).

When viewed in the first direction or from above, the length L1 of the short side of the first magnet part 71A of the first magnet 130 and the length L2 of the short side of the second magnet part 71B may be equal to each other. When L1 and L2 are equal to each other, the length of the short side of the first magnet 130 is defined as L1.

The length L1 of the short side of the first magnet 130 may be shorter than the length L3 of the short side of the second coil 230. In another embodiment, the length L1 of the short side of the first magnet 130 may be longer than or equal to the length L3 of the short side of the second coil 230.

In an example, when viewed in the first direction or from above, the length L5 of the yoke 410 in the longitudinal direction of the short side of the first magnet 130 may be longer than L1, L3, and L4. In another embodiment, L5 may be shorter than at least one of L1, L3, or L4, or may be equal to at least one of L1, L3, or L4.

In an example, when viewed in the first direction or from above, the length L6 of the first coil 120 in the longitudinal direction of the short side of the first magnet 130 may be shorter than the length L1 of the short side of the first magnet 130.

In an example, the length M1 of the first magnet part 71A in the first direction (or the optical-axis direction) may be longer than the length M2 of the second magnet part 71B in the first direction (or the optical-axis direction) (M1>M2).

In an example, the length d1 of the partition wall 71C in the first direction (or the optical-axis direction) may be shorter than M1 and M2.

In an example, the length d1 of the first coil 120 in the first direction (or the optical-axis direction) may be shorter than the length M1 of the first magnet part 71A in the first direction (or the optical-axis direction).

In a stroke section within which the bobbin 110 moves in the optical-axis direction, the first coil 120 may at least partially overlap the first magnet 130 in a direction perpendicular to the optical-axis direction.

In an example, in a stroke section within which the bobbin 110 moves in the optical-axis direction, at least a portion or an entirety of the first coil 120 may overlap the first magnet part 71A in a direction perpendicular to the optical-axis direction. In an example, at least a portion or an entirety of the first coil 120 may overlap the first magnet part 71A in a direction perpendicular to the optical-axis direction at the maximum stroke position of the bobbin 110 in the upward direction. In addition, in an example, at least a portion or an entirety of the first coil 120 may overlap the first magnet part 71A in a direction perpendicular to the optical-axis direction at the maximum stroke position of the bobbin 110 in the downward direction. Accordingly, the linearity of the correlation between the displacement (or stroke) of the bobbin 110 and the output from the first position sensor 170 may be maintained or improved.

The length M3 of the second coil 230 in the first direction (or the optical-axis direction) may be shorter than the length M2 of the second magnet part 71B in the first direction (or the optical-axis direction). In another embodiment, M3 may be equal to or longer than M2.

Most of the electromagnetic force for AF operation may be generated by electromagnetic force caused by interaction between the first coil 120 and the first magnet 130.

The electromagnetic force for OIS operation may be generated by electromagnetic force caused by interaction between the second coil 230 and the first magnet 130. The electromagnetic force may be increased by the yoke 410 disposed below the second coil 230. In the embodiment, the electromagnetic force for OIS operation may be improved.

As the distance D11 between the first magnet 130 and the second coil in the optical-axis direction decreases, the electromagnetic force between the first magnet 130 and the second coil 230 may be increased. In addition, as the spacing distance D13 between the first magnet 130 and the yoke 410 decreases, electromagnetic force may be increased more effectively. However, a space in which at least one of the second coil 230, the second position sensor 240, or the first board unit 255 is disposed needs to be secured between the first magnet 130 and the yoke 410, and thus D13 may be longer than D11.

For example, D11 may be 0.05 mm to 0.2 mm. Alternatively, for example, D11 may be 0.05 mm to 0.15 mm. Alternatively, for example, D11 may be 0.09 mm to 0.12 mm.

When D11 is shorter than 0.05 mm, a margin for avoiding spatial interference between the first magnet 130 and the second coil 230 is so small that spatial interference may occur between the first magnet 130 and the second coil 230 even due to small impact, making it difficult to perform normal OIS operation. In addition, when D11 exceeds 0.2 mm, the electromagnetic force between the first magnet 130 and the second coil 230 may be reduced, and the size of the camera module in the optical-axis direction may be increased.

In an example, the spacing distance D13 between the first magnet 130 and the yoke 410 in the optical-axis direction may be longer than D11 (D13>D11). In addition, in an example, the spacing distance D14 between the second coil 230 and the yoke 410 in the optical-axis direction may be longer than D11 (D14>D11). In addition, in an example, D13 may be longer than D14 (D13>D14).

For example, D13 may be 1.5 mm to 2.5 mm. Alternatively, for example, D13 may be 1.6 mm to 2 mm. Alternatively, for example, D13 may be 1.5 mm to 1.8 mm.

Alternatively, for example, D14 may be 1.2 mm to 2 mm. Alternatively, for example, D14 may be 1.2 mm to 1.55 mm. Alternatively, for example, D14 may be 1.3 mm to 1.5 mm.

A value obtained by dividing D13 by D11 (D13/D11) may be 7.5 to 50. Alternatively, for example, the divided value (D13/D11) may be 15 to 25. In another embodiment, the divided value (D13/D11) may be 17 to 22.

When the divided value (D13/D11) is less than 7.5, D13 is too small to secure a sufficient space for placement of the second coil 230, the second position sensor 240, and the first board unit 255. In addition, when the divided value (D13/D11) exceeds 50, D13 is too large to obtain an electromagnetic force increase effect by the yoke 410. Therefore, an OIS driving force increase effect may not be obtained, and the size of the camera module in the optical-axis direction may be increased.

In addition, when the divided value (D13/D11) is 15 to 25, a sufficient space for placement of the second position sensor 240 and the first board unit 255 may be secured, and OIS driving force may be increased.

In addition, a value obtained by dividing D14 by D11 (D14/D11) may be 6 to 40. Alternatively, for example, the divided value (D14/D11) may be 10 to 20. Alternatively, for example, the divided value (D14/D11) may be 14 to 18.

When the divided value (D14/D11) is less than 6, D14 is too small to secure a sufficient space for placement of the second coil 230, the second position sensor 240, and the first board unit 255. In addition, when the divided value (D14/D11) exceeds 40, D14 is too large to obtain an electromagnetic force increase effect by the yoke 410. Therefore, an OIS driving force increase effect may not be obtained, and the size of the camera module in the optical-axis direction may be increased.

In addition, when the divided value (D14/D11) is 14 to 18, a sufficient space for placement of the second position sensor 240 and the first board unit 255 may be secured, and OIS driving force may be increased.

The description of D11, D12, D13, D14, and the divided value (D13/D11 or D14/D11) may be equally or similarly applied to FIGS. 21B to 21E, 22A to 22C, and 23A to 23C, which will be described later. In addition, the description of the divided value (D13/D11 or D14/D11) given with reference to FIG. 21A may be equally or similarly applied to FIG. 24.

Figure 21B:
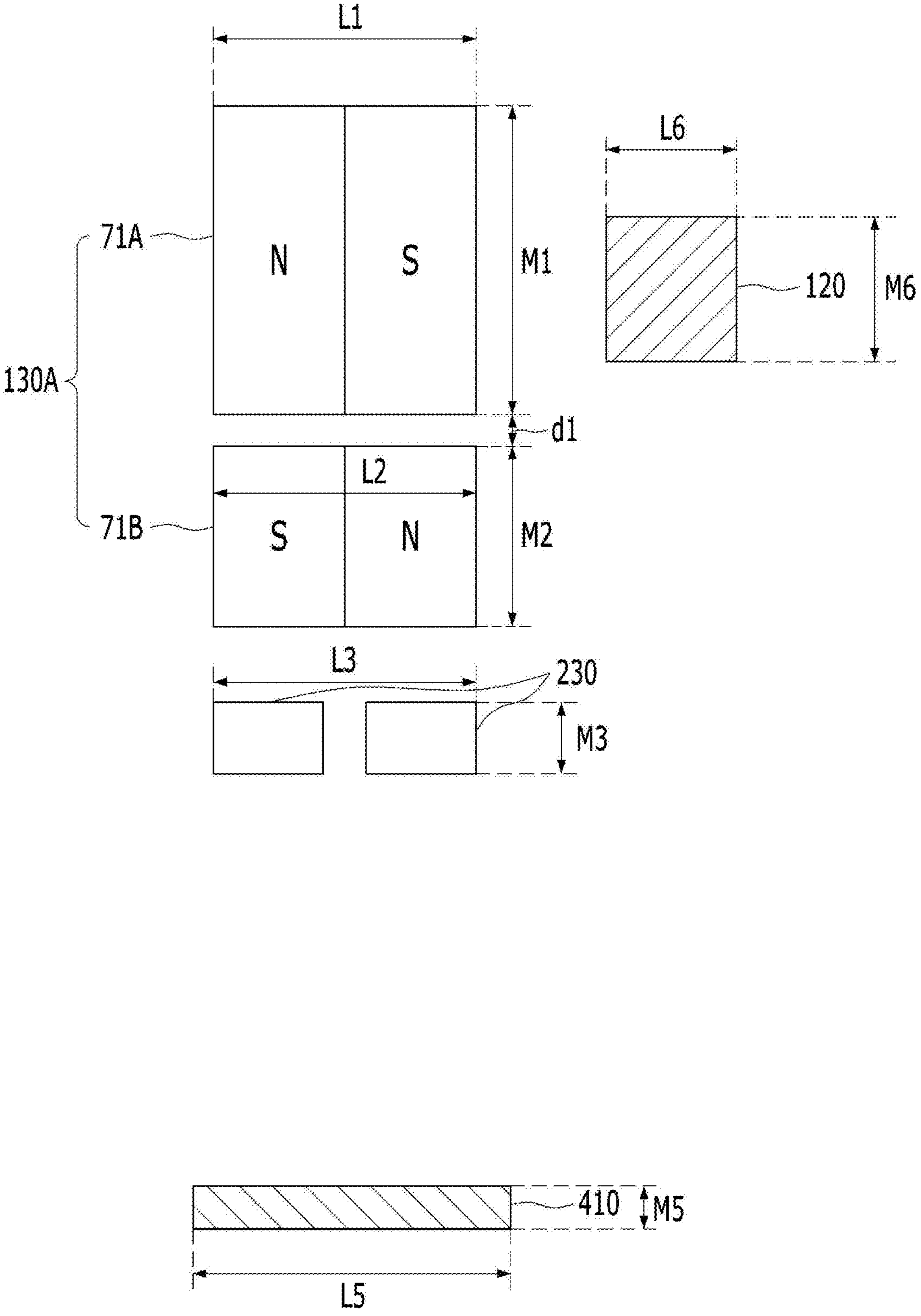
FIG. 21B illustrates another embodiment of the first magnet.

FIG. 21B illustrates another embodiment 130A of the first magnet 130. In FIG. 21B, the same reference numerals as those in FIG. 21A represent the same components, and description of the same components will be omitted.

Referring to FIG. 21B, the first magnet 130A shown in FIG. 21B may be formed such that the partition wall 71C of the first magnet 130 shown in FIG. 21A is eliminated and the first magnet part 71A and the second magnet part 71B are spaced apart from each other. In an example, a portion of the housing 140 may be interposed, disposed, or inserted between the first magnet part 71A and the second magnet part 71B. That is, the first magnet part 71A and the second magnet part 71B may be separated from each other by a portion of the housing 140. In this case, a neutral zone may be formed between the first magnet part 71A and the second magnet part 71B. In another embodiment, a neutral zone may not be formed between the first magnet part 71A and the second magnet part 71B.

Figure 21C:
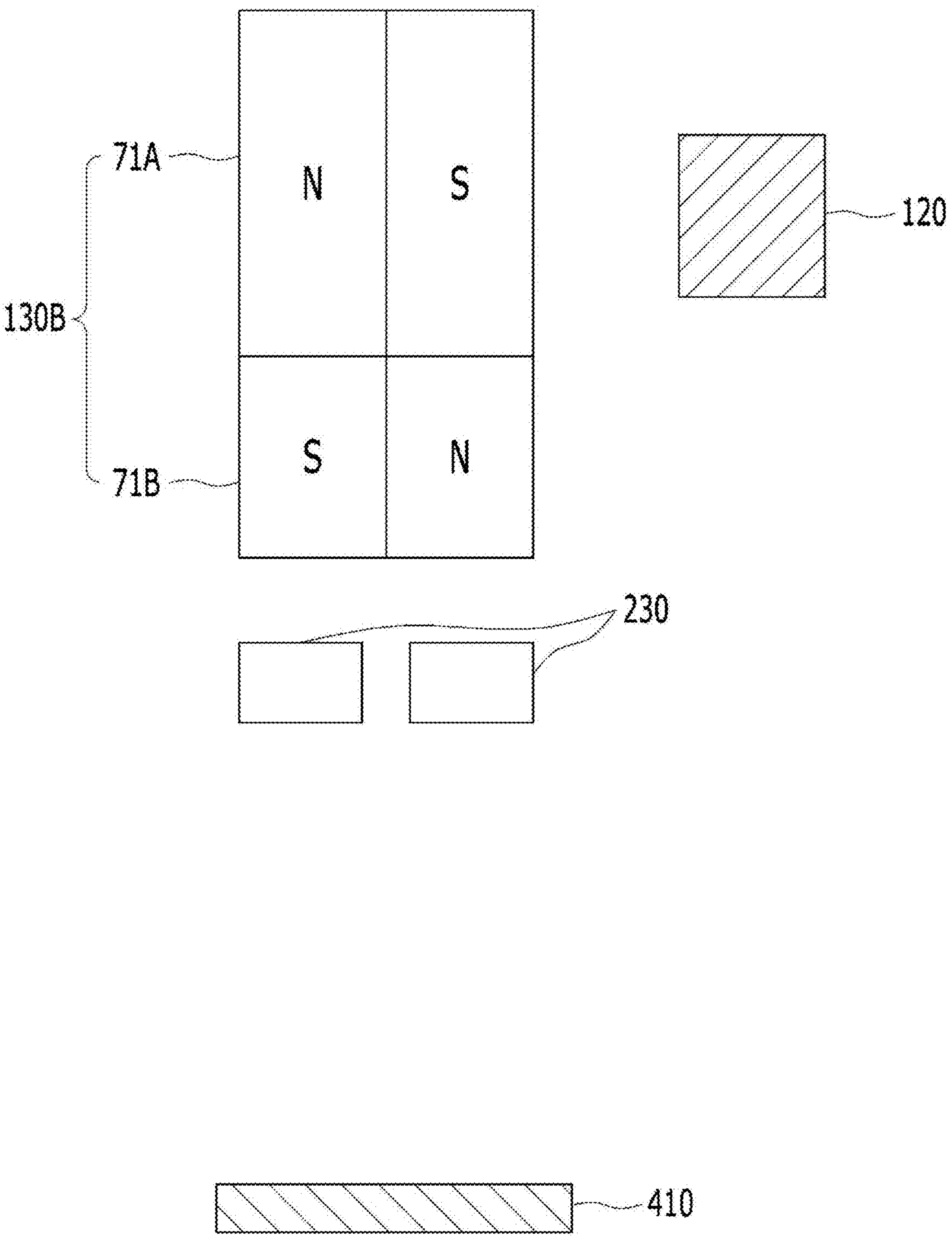
FIG. 21C illustrates still another embodiment of the first magnet.

FIG. 21C illustrates still another embodiment 130B of the first magnet 130.

Referring to FIG. 21C, the first magnet 130B shown in FIG. 21C may be formed such that the partition wall 71C of the first magnet 130 shown in FIG. 21A is eliminated and the first magnet part 71A and the second magnet part 71B are in contact with each other.

In an example, the first N pole of the first magnet part 71A may be in contact with the second S pole of the second magnet part 71B, and the first S pole of the first magnet part 71A may be in contact with the second N pole of the second magnet part 71B.

Figure 21D:
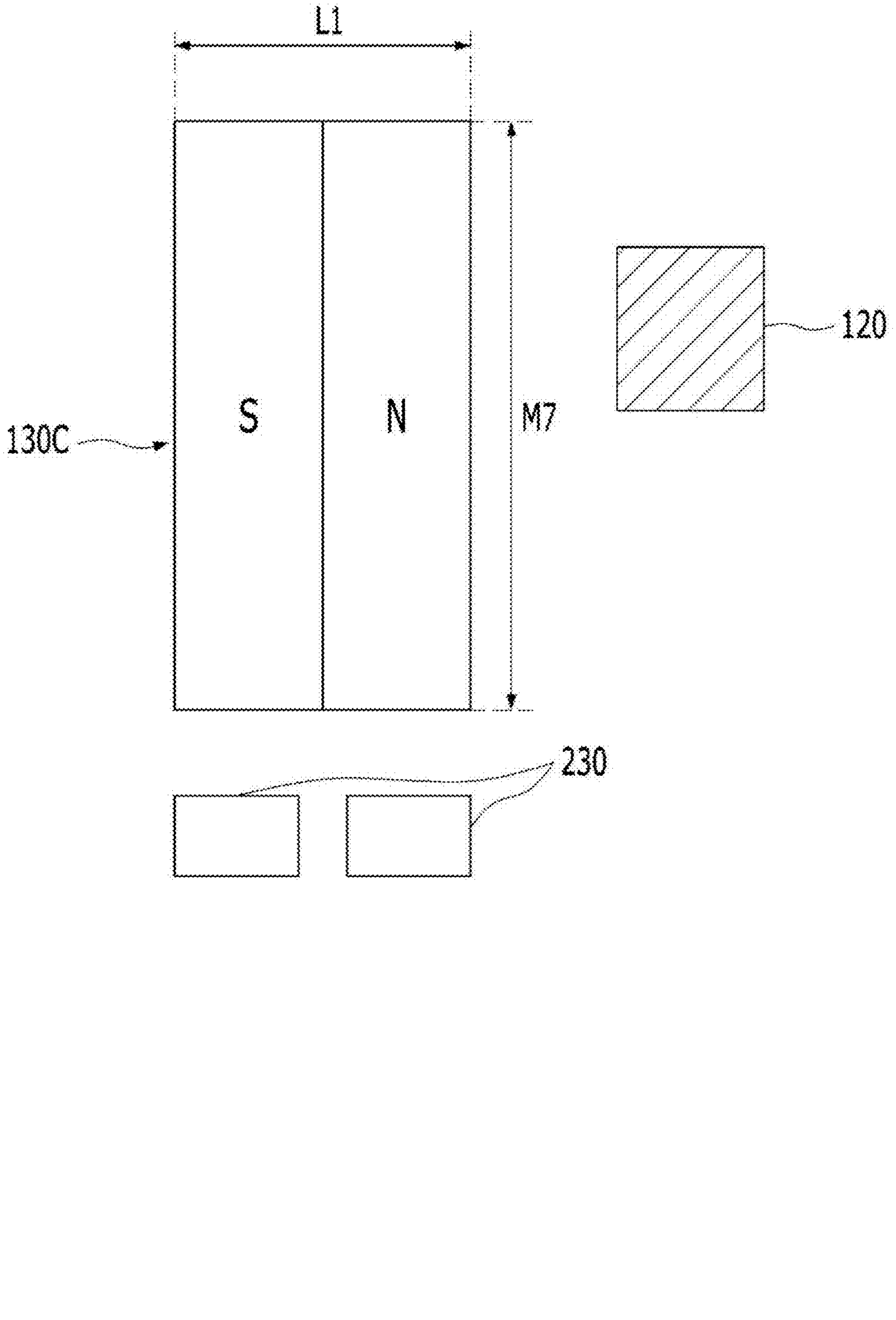
FIG. 21D illustrates still another embodiment of the first magnet.

FIG. 21D illustrates still another embodiment 130C of the first magnet 130.

Referring to FIG. 21D, the first magnet 130 may be a monopolar-magnetized magnet including one N pole and one S pole.

In an example, the length M7 of the first magnet 130 in the first direction (or the optical-axis direction) may be the sum of M1 and M2 in FIG. 21A. Alternatively, in an example, M7 may be the sum of M1, M2, and d1 in FIG. 21A.

Figure 21E:
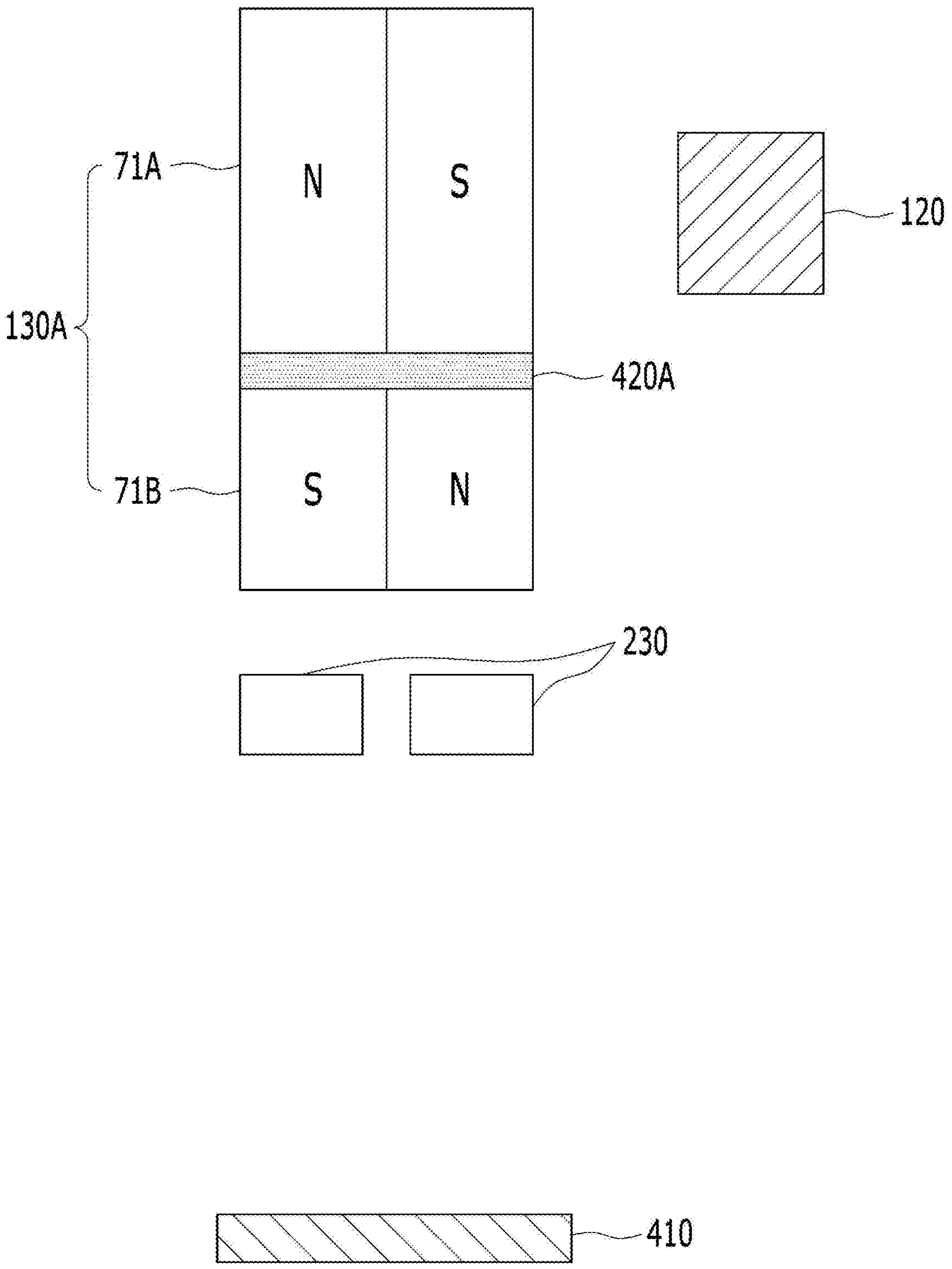
FIG. 21E is a modified example of FIG. 21B.

FIG. 21E is a modified example of FIG. 21B.

Referring to FIG. 21E, a yoke 420A may be disposed between the first magnet part 71A and the second magnet part 71B. The yoke 420A may correspond to, face, or overlap each of the first magnet part 71A and the second magnet part 71B in the first direction (or the optical-axis direction).

The yoke 420A may improve electromagnetic force caused by interaction between the first magnet part 71A and the first coil 120, thereby improving electromagnetic force for AF operation. In addition, the yoke 420A may improve electromagnetic force caused by interaction between the second magnet part 71B and the second coil 230, thereby improving electromagnetic force for OIS operation.

Figure 22A:
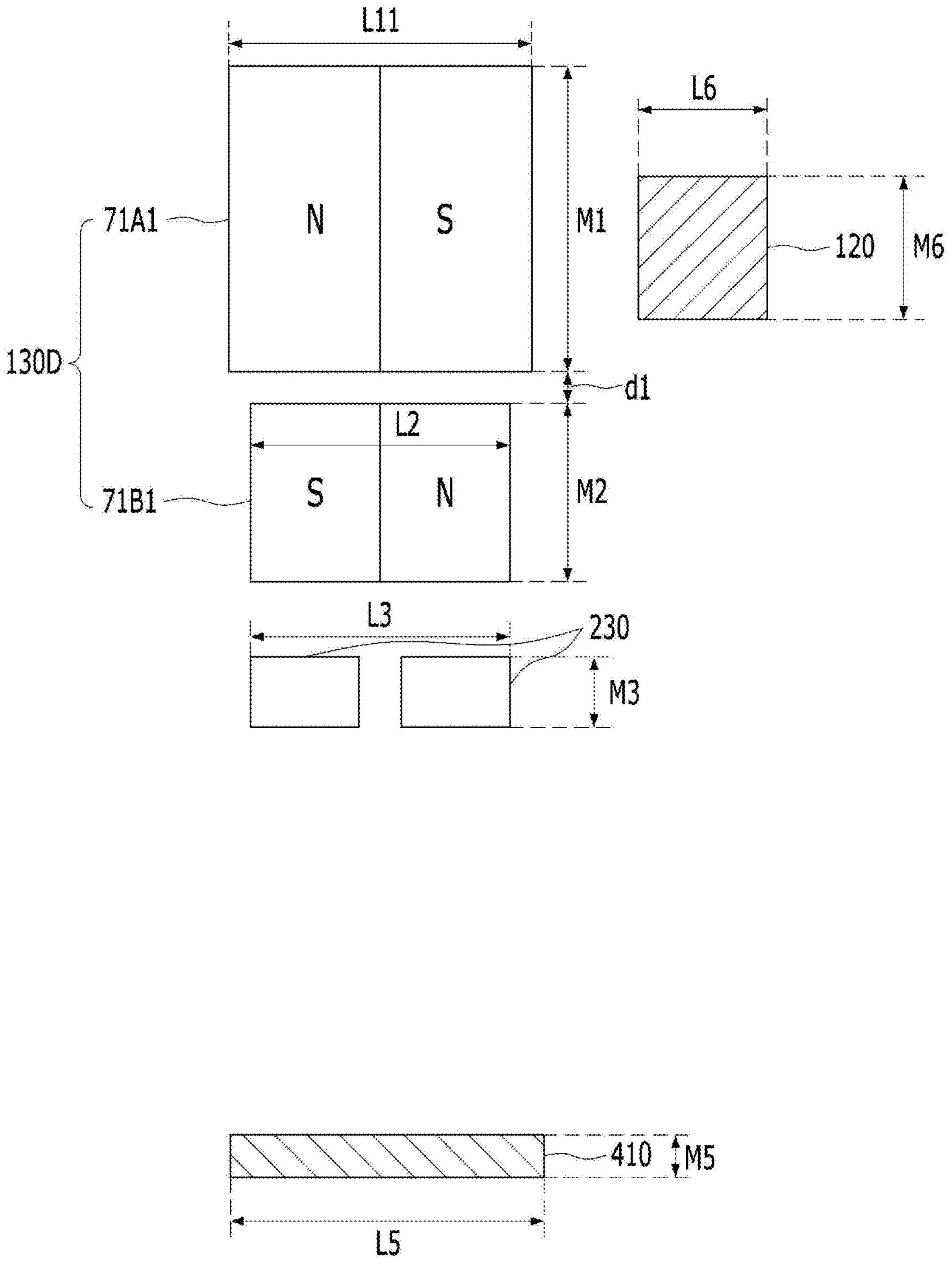
FIG. 22A illustrates still another embodiment of the first magnet.

FIG. 22A illustrates still another embodiment 130D of the first magnet 130. The embodiment shown in FIG. 22A is a modified example of the first magnet shown in FIG. 21B.

In another embodiment, the first magnet 130D shown in FIG. 22A may be equally or similarly applied to FIGS. 21A and 21C to 21E.

Referring to FIG. 22A, the length L11 of the short side of the first magnet part 71A1 may be longer than the length L2 of the short side of the second magnet part 71B1 (L11>L2). The reason for this is to improve AF electromagnetic force caused by interaction with the first coil 120 by increasing the size of the first magnet part 71A1. In another embodiment, in order to improve OIS electromagnetic force, the length of the short side of the second magnet part may be longer than the length of the short side of the first magnet part.

In an example, the length L11 of the short side of the first magnet part 71A1 may be longer than at least one of L3, L4, or L5.

FIGS. 21A to 22A may be cross-sectional views taken in a direction parallel to the short side of the first magnet 130.

Figure 22B:
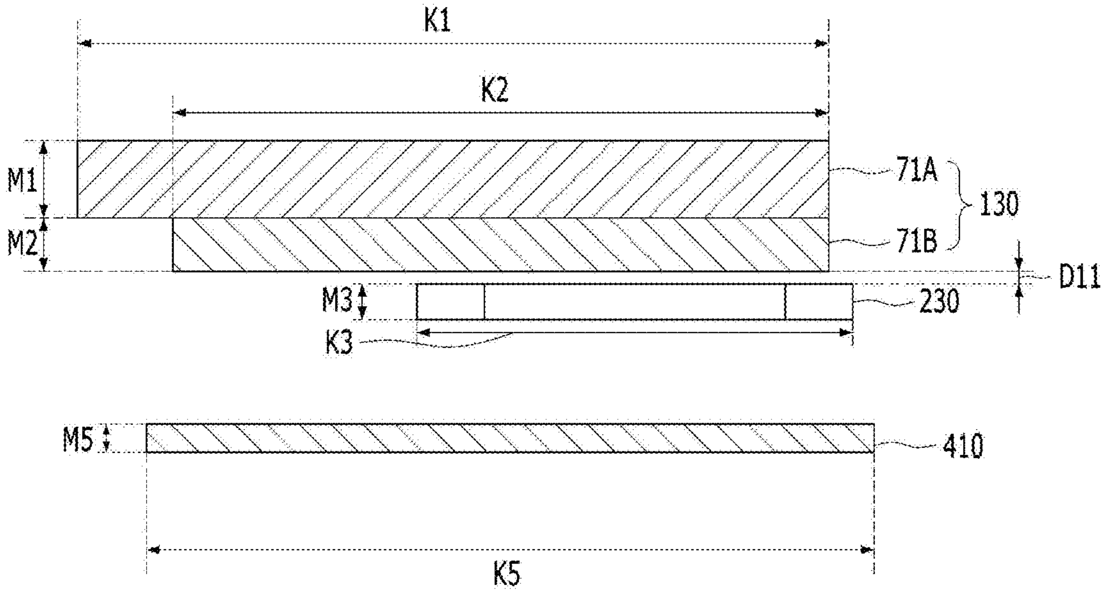
FIG. 22B illustrates an embodiment of the length of the long side of each of the first magnet, the second coil, and the yoke.

FIG. 22B illustrates an embodiment of the length of the long side of each of the first magnet 130, the first coil 120, the second coil 230, and the yoke 410.

Referring to FIG. 22B, when viewed in the first direction or from above, the length K1 of the long side of the first magnet part 71A of the first magnet 130 and the length K2 of the long side of the second magnet part 71B may be different from each other. In an example, the length K1 of the long side of the first magnet part 71A of the first magnet 130 may be longer than the length K2 of the long side of the second magnet part 71B. When K1 is longer than K2, electromagnetic force caused by interaction between the first coil 120 and the first magnet part 71A may be improved, and accordingly, AF driving force may be improved.

The length K2 of the long side of the second magnet part 71B may be different from the length K3 of the long side of the second coil 230. In an example, the length K2 of the long side of the second magnet part 71B may be longer than the length K3 of the long side of the second coil 230. In another embodiment, the length of the long side of the second magnet part 71B may be equal to or shorter than the length of the long side of the second coil 230.

In an example, one end of each of the first magnet part 71A and the second magnet part 71B may be located inside the second coil 230, and the other end of each of the first magnet part 71A and the second magnet part 71B may be located outside the second coil 230. In another embodiment, one end and the other end of each of the first magnet part 71A and the second magnet part 71B may be located outside the second coil 230.

Each of the first magnet part 71A and the second magnet part 71B may include a first portion that overlaps the second coil 230 in the first direction or the optical-axis direction. In addition, each of the first magnet part 71A and the second magnet part 71B may include a second portion that does not overlap the second coil 230 in the first direction or the optical-axis direction.

When viewed in the first direction or from above, the length of the long side of the first magnet 130 may be different from the length K5 of the yoke 410 in the longitudinal direction of the long side of the first magnet 130.

In an example, the length K5 of the yoke in the longitudinal direction of the long side of the first magnet 130 may be longer than the length K2 of the long side of the second magnet part 71B of the first magnet 130 (K5>K2). In another embodiment, the length of the yoke 410 in the longitudinal direction of the long side of the first magnet 130 may be equal to or shorter than the length of the long side of the second magnet part 71B.

Alternatively, in an example, the length K5 of the yoke in the longitudinal direction of the long side of the first magnet 130 may be shorter than the length K1 of the long side of the first magnet part 71A of the first magnet 130 (K5<K1). In another embodiment, the length of the yoke 410 in the longitudinal direction of the long side of the first magnet 130 may be equal to or longer than K1.

In addition, when viewed in the first direction or from above, the length K5 of the yoke 410 in the longitudinal direction of the long side of the first magnet 130 may be different from the length K3 of the long side of the second coil 230. In an example, when viewed in the first direction or from above, the length K5 of the yoke 410 in the longitudinal direction of the long side of the first magnet 130 may be longer than the length K3 of the long side of the second coil 230. In another embodiment, the length of the yoke 410 in the longitudinal direction of the long side of the first magnet 130 may be equal to or shorter than the length of the long side of the second coil 230.

In an example, when viewed in the first direction or from above, one end and the other end of the second magnet part 71B of the first magnet 130 that are located opposite each other in the longitudinal direction of the long side of the first magnet 130 may be located inside the yoke 410. In another embodiment, when viewed in the first direction or from above, at least one of one end and the other end of the second magnet part 71B of the first magnet 130 that are located opposite each other in the longitudinal direction of the long side of the first magnet 130 may be located outside the yoke 410.

Alternatively, in an example, when viewed in the first direction or from above, among one end and the other end of the first magnet part 71A of the first magnet 130 that are located opposite each other in the longitudinal direction of the long side of the first magnet 130, one end of the first magnet part 71A may be located inside the yoke 410, and the other end of the first magnet part 71A may be located outside the yoke 410. In another embodiment, when viewed in the first direction or from above, one end and the other end of the first magnet part 71A of the first magnet 130 that are located opposite each other in the longitudinal direction of the long side of the first magnet 130 may be located inside or outside the yoke 410.

In an example, when viewed in the first direction or from above, the yoke 410 may include a first portion that overlaps the first magnet 130. In addition, when viewed in the first direction or from above, the yoke 410 may include a second portion that does not overlap the first magnet 130.

In an example, when viewed in the first direction or from above, the yoke 410 may include a first portion that overlaps the second coil 230. In addition, when viewed in the first direction or from above, the yoke 410 may include a second portion that does not overlap the second coil 230.

Figure 22C:
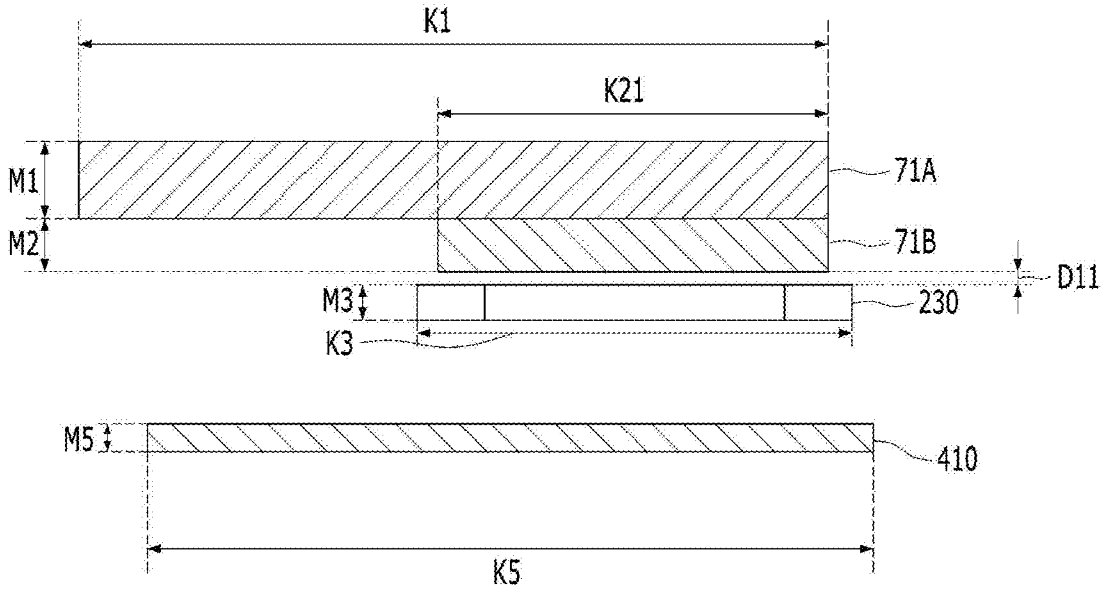
FIG. 22C illustrates another embodiment of the length of the long side of the second magnet part in FIG. 22B.

FIG. 22C illustrates another embodiment of the length of the long side of the second magnet part 71B in FIG. 22B.

Referring to FIG. 22C, the length K21 of the long side of the second magnet part 71B may be shorter than the length K3 of the long side of the second coil 230. In an example, when viewed in the first direction or from above, one end and the other end of the second magnet part 71B may be located inside the second coil 230.

In another embodiment, the length of the long side of the first magnet part 71A may be shorter than the length of the long side of the second coil 230. In addition, when viewed in the first direction or from above, one end and the other end of the first magnet part 71A may be located inside the second coil 230.

FIGS. 22B and 22C may be cross-sectional views taken in a direction parallel to the long side of the first magnet 130. The description given with reference to FIGS. 22B and 22C may be equally or similarly applied to FIGS. 21A to 21E and 22A.

The camera device 10 may further include a yoke that is provided separately from the yoke 410 so as to be disposed on the first magnet 130 in order to increase or improve electromagnetic force for AF operation and electromagnetic force for OIS operation.

Figure 23A:
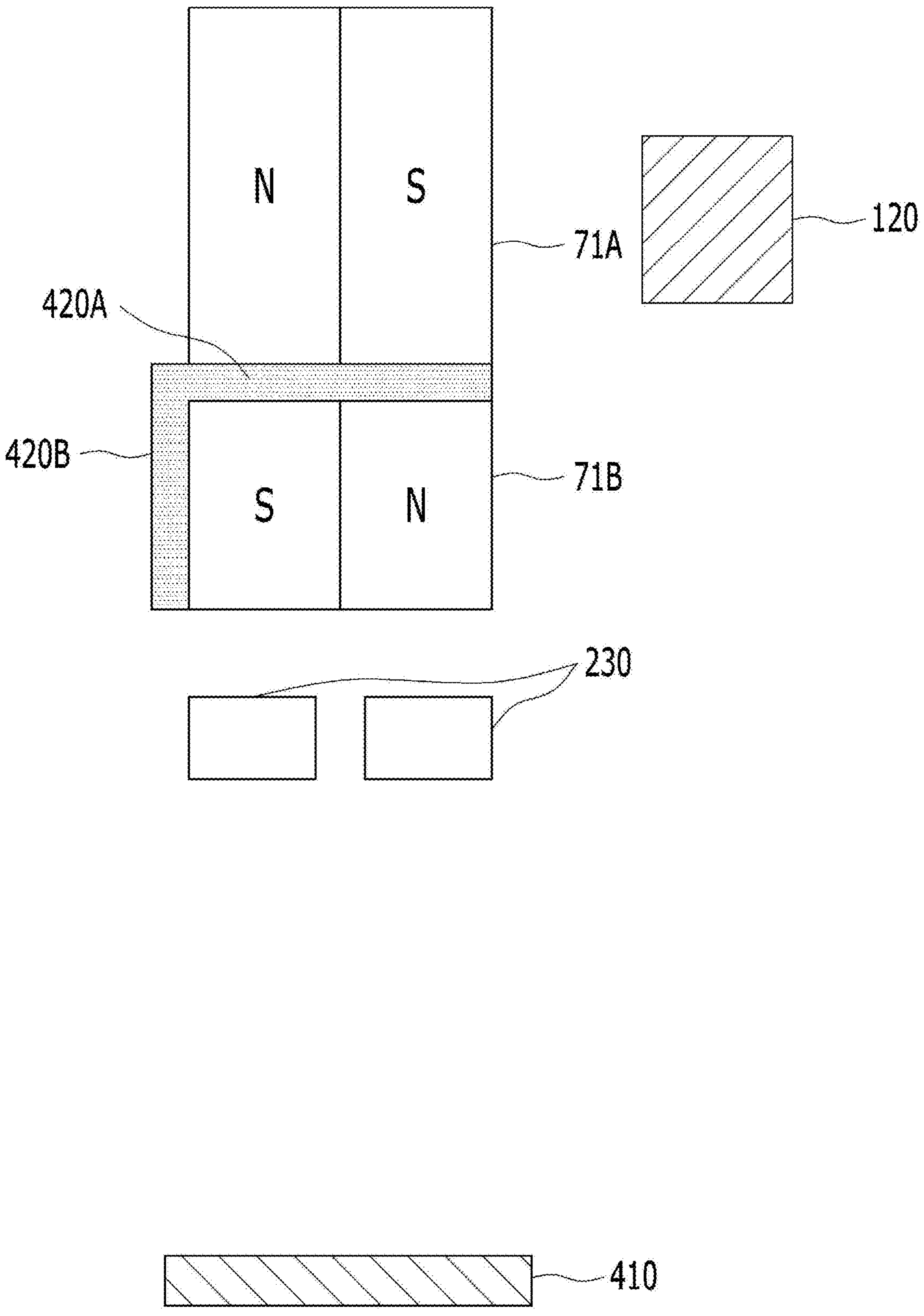
FIG. 23A illustrates another embodiment of FIG. 21E.

FIG. 23A illustrates another embodiment of FIG. 21E.

Referring to FIG. 23A, the camera device 10 may include a yoke 420B disposed on at least one of the side surfaces of the second magnet part 71B.

In an example, the yoke 420B may be disposed on at least one of the long side surface or the short side surface of the second magnet part 71B. In an example, the yoke 420B may be in contact with at least one of the long side surface or the short side surface of the second magnet part 71B.

The yoke 420B may be in contact with the yoke 420A described with reference to FIG. 21E. In another embodiment, the yoke 420B may be spaced apart from the yoke 420A described with reference to FIG. 21E.

In an example, the yoke 420B may be disposed on the long side surface of the second magnet part 71B. In an example, the yoke 420B may be disposed on the second long side surface among the first long side surface and the second long side surface. In this case, the first long side surface may be closer to the first coil 120 than the second long side surface, and the first long side surface and the second long side surface may be located opposite each other.

At the initial position of the bobbin 110, the yoke 420B may not overlap the first coil 120 in a direction perpendicular to the optical-axis direction. Alternatively, in an example, when the bobbin 110 is moved, at least a portion of the yoke 420B may overlap the first coil 120 in a direction perpendicular to the optical-axis direction.

At least one of electromagnetic force caused by interaction between the first magnet 130 and the first coil 120 or electromagnetic force caused by interaction between the first magnet 130 and the second coil 230 may be increased or improved by the yoke 420B.

The yoke 420B shown in FIG. 23A may be equally or similarly applied to the embodiments shown in FIGS. 21A to 21D and 22A to 22C.

Figure 23B:
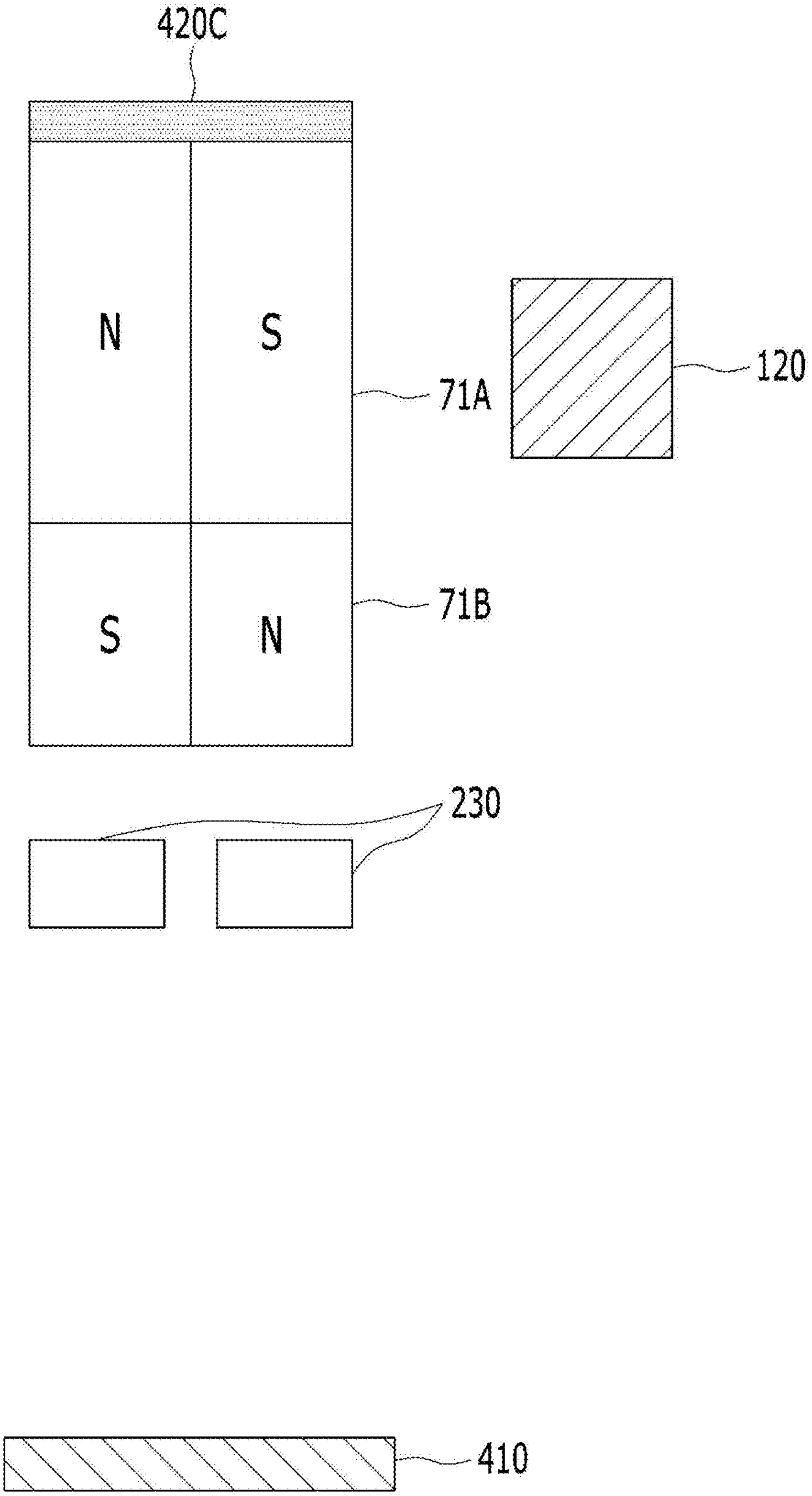
FIG. 23B illustrates another embodiment of FIG. 21C.

FIG. 23B illustrates another embodiment of FIG. 21C.

Referring to FIG. 23B, the camera device 10 may include a yoke 420C disposed on the upper surface of the first magnet part 71A. In an example, the yoke 420C may be disposed on the upper surfaces of the N pole and the S pole of the first magnet part 71A. In an example, the yoke 420C may be in contact with the upper surface of the first magnet part 71A.

At least a portion of the yoke 420C may correspond to, face, or overlap the first magnet 130 and the second coil 230 in the optical-axis direction.

At least one of electromagnetic force caused by interaction between the first magnet 130 and the first coil or electromagnetic force caused by interaction between the first magnet 130 and the second coil 230 may be increased or improved by the yoke 420C.

Figure 23C:
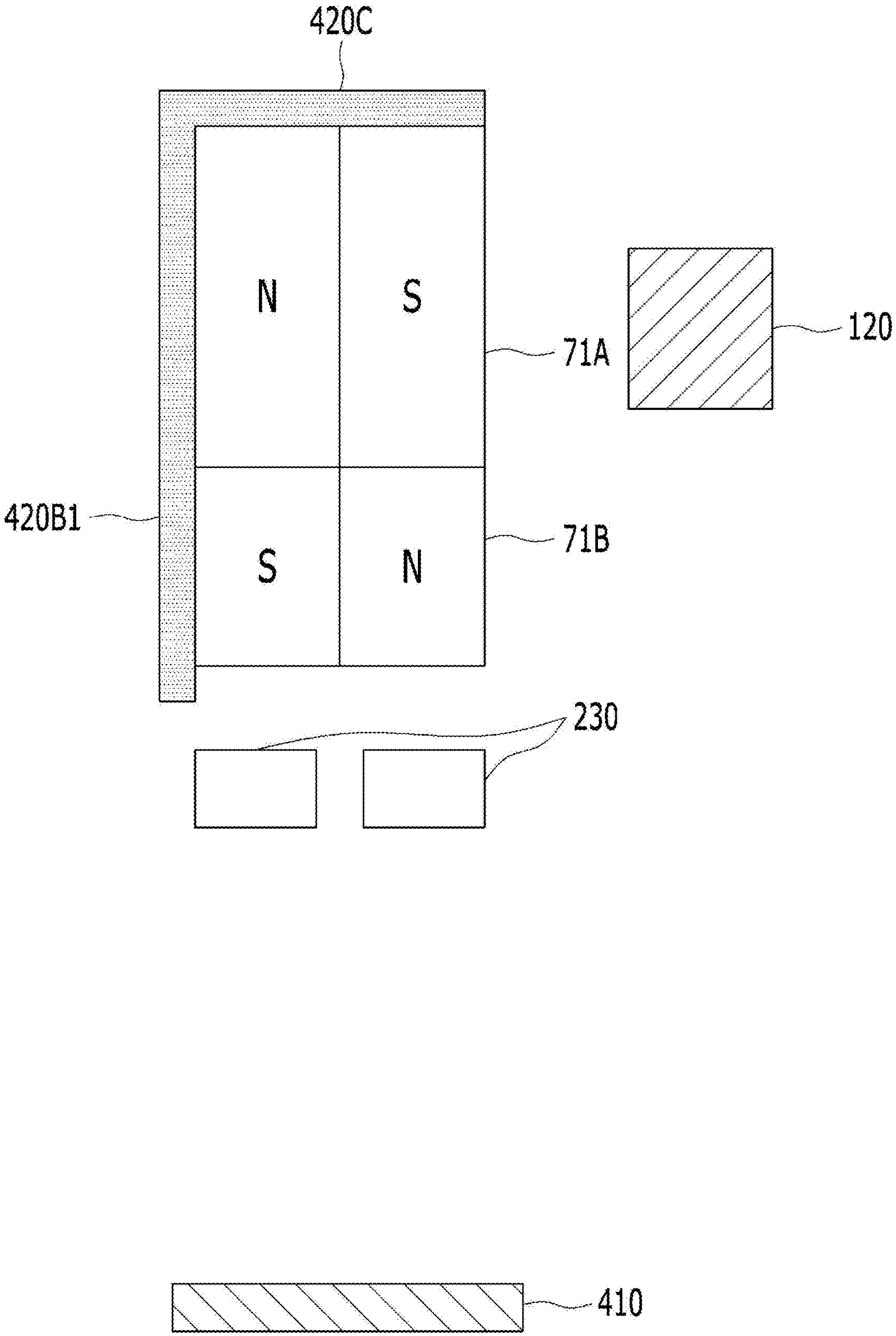
FIG. 23C illustrates another embodiment of FIG. 23B.

FIG. 23C illustrates another embodiment of FIG. 23B.

Referring to FIG. 23C, the camera device 10 may include a yoke 420B1 disposed on the side surface of at least one of the first magnet part 71A or the second magnet part 71B.

At least a portion of the yoke 420B1 may correspond to, face, or overlap the first coil 120 in a direction perpendicular to the optical-axis direction.

In an example, the yoke 420B1 may be disposed on the side surface of the N pole or the S pole of the first magnet part 71A. In addition, the yoke 420B1 may be disposed on the side surface of the N pole or the S pole of the second magnet part 72A.

In an example, the yoke 420B1 may be disposed on at least one of the long side surface or the short side surface of the first magnet part 71A, and may be in contact with at least one of the long side surface or the short side surface of the first magnet part 71A. In addition, in an example, the yoke 420B1 may be disposed on at least one of the long side surface or the short side surface of the second magnet part 71B, and may be in contact with at least one of the long side surface or the short side surface of the second magnet part 71B.

In an example, the yoke 420B1 may be disposed on the long side surface of the first magnet part 71A and the long side surface of the second magnet part 71B. In an example, the yoke 420B1 may be disposed on the second long side surface among the first long side surface and the second long side surface of the first magnet part 71A, and may be disposed on the fourth long side surface among the third long side surface and the fourth long side surface of the second magnet part 71B. In this case, the first long side surface may be closer to the first coil 120 than the second long side surface, and the first long side surface and the second long side surface may be located opposite each other. In addition, the third long side surface may be closer to the first coil 120 than the fourth long side surface, and the third long side surface and the fourth long side surface may be located opposite each other.

At least one of electromagnetic force caused by interaction between the first magnet 130 and the first coil or electromagnetic force caused by interaction between the first magnet 130 and the second coil 230 may be increased or improved by the yoke 420B1.

The yoke 420B1 may be in contact with the yoke 420A described with reference to FIG. 23B. In another embodiment, the yoke 420B1 may be spaced apart from the yoke 420A described with reference to FIG. 23B.

The yokes 420C and 420B1 shown in FIGS. 23B and 23C may be equally or similarly applied to the embodiments shown in FIGS. 21A to 21E, 22A to 22C, and 23A.

A camera device according to another embodiment may further include a second magnet that is disposed on the yoke 410 and corresponds to, faces, or overlaps the second coil 230.

Figure 24:
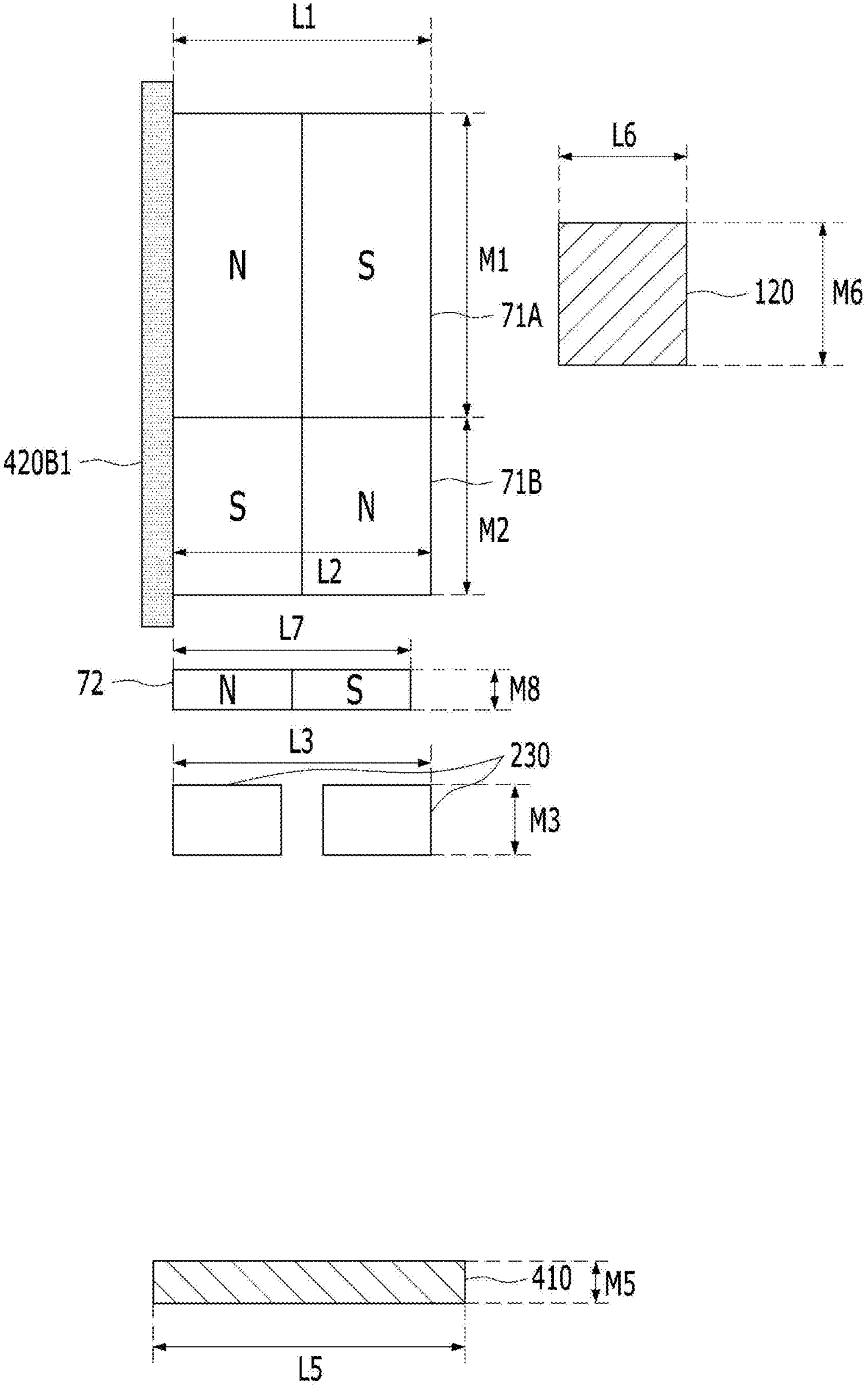
FIG. 24 illustrates placement of a third magnet according to an embodiment.

FIG. 24 illustrates placement of a third magnet 72 according to an embodiment.

Referring to FIG. 24, the camera device 10 may further include a third magnet 72 disposed between the first magnet 130 and the second coil 230 in order to increase OIS driving force.

The third magnet 72 may be disposed on the fixed unit. In an example, the third magnet 72 may be disposed in the housing 140, and may be disposed below the first magnet 130. In an example, the third magnet 72 may be spaced apart from the first magnet.

In another embodiment, the third magnet 72 may be in contact with the first magnet 130.

In an example, the upper surface of the third magnet 72 may be in contact with the lower surface of the first magnet 130.

The third magnet 72 may include magnet units corresponding to the magnet units 130-1 to 130-4 of the first magnet 130. Each of the magnet units of the third magnet 72 may correspond to, face, or overlap a corresponding one of the magnet units 130-1 to 130-4 of the first magnet 130 in the first direction (or the optical-axis direction).

In an example, the third magnet 72 may be a monopolar-magnetized magnet including one N pole and one S pole. In another embodiment, the third magnet 72 may be a bipolar-magnetized magnet including two N poles and two S poles.

The N pole of the third magnet 72 may face the S pole of the first magnet 130 (e.g., the second magnet part 71B) in the first direction (or the optical-axis direction), and the S pole of the third magnet 72 may face the N pole of the first magnet 130 (e.g., the second magnet part 71B) in the first direction (or the optical-axis direction).

When viewed in the first direction or from above, the length L7 of the short side of the third magnet 72 may be shorter than the length L3 of the short side of the second coil 230. In another embodiment, the length L7 of the short side of the third magnet 72 may be longer than or equal to the length L3 of the short side of the second coil 230.

When viewed in the first direction or from above, the length L7 of the short side of the third magnet 72 may be shorter than the length L1 of the short side of the first magnet 130. In another embodiment, the length L7 of the short side of the third magnet 72 may be longer than or equal to the length L1 of the short side of the first magnet 130.

In an example, the length L7 of the short side of the third magnet 72 may be shorter than or equal to the length L1 of the short side of the first magnet 130. In another embodiment, the length L7 of the short side of the third magnet 72 may be longer than the length of the short side of the first magnet 130.

In addition, the length M8 of the third magnet 72 in the first direction (or the optical-axis direction) may be shorter than or equal to the length of the first magnet part 71A of the first magnet 130 in the first direction. In another embodiment, the length M8 of the third magnet 72 in the first direction (or the optical-axis direction) may be longer than the length of the first magnet part 71A of the first magnet 130 in the first direction.

When viewed in the first direction or from above, the length of the long side of the third magnet 72 may be longer than or equal to the length of the long side of the second magnet part 71B of the first magnet 130. In another embodiment, the length of the long side of the third magnet 72 may be shorter than the length of the long side of the second magnet part 71B of the first magnet 130.

When viewed in the first direction or from above, the length of the long side of the third magnet 72 may be shorter than the length of the long side of the first magnet part 71A of the first magnet 130. In another embodiment, the length of the long side of the third magnet 72 may be longer than or equal to the length of the long side of the first magnet part 71A of the first magnet 130.

The third magnet 72 shown in FIG. 24 may be equally or similarly applied to FIGS. 21A to 23C.

In FIG. 24, OIS driving force for moving the OIS moving unit may include electromagnetic force caused by interaction between the second coil 230 and each of the first magnet 130 and the third magnet 72. Therefore, the embodiment shown in FIG. 24 may increase electromagnetic force for OIS operation.

Figure 25:
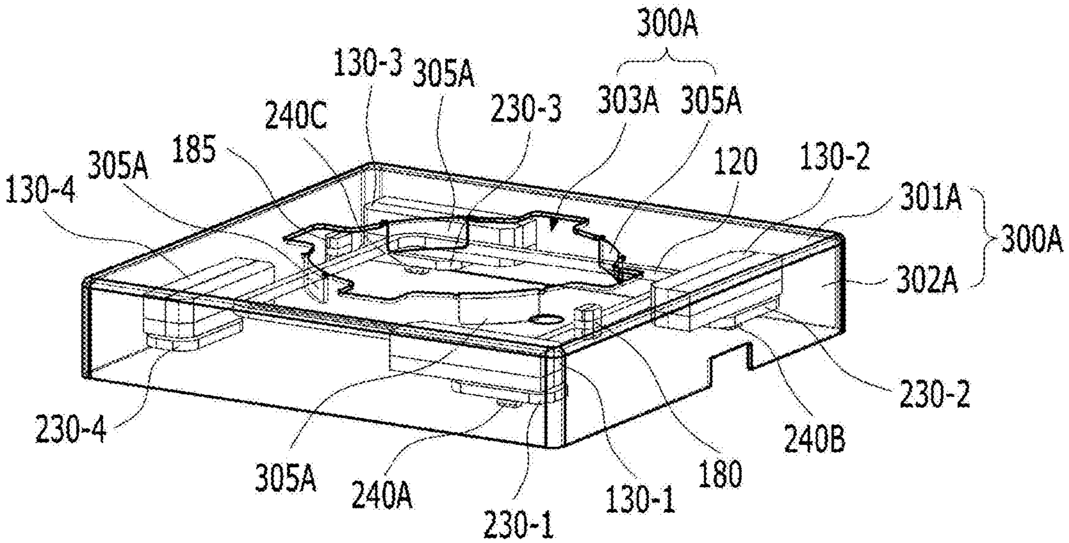
FIG. 25 is a perspective view of the cover member, the first magnet, the first coil, the second coil, and the second position sensor according to an embodiment.

FIG. 25 is a perspective view of the cover member 300, the first magnet 130, the first coil 120, the second coil 230, and the second position sensor 240 according to an embodiment.

Referring to FIG. 25, the cover member 300A may take the form of a box that includes an upper plate 301A and side plates 302A and has an open lower portion, and the lower portions of the side plates 302A of the cover member 300A may be coupled to the base 210. The cover member 300A may have a bore 303 formed in the upper plate 301 thereof to expose at least a portion of the lens module 400. The description of the structure of the cover member 300 shown in FIGS. 1 and 3 may be equally or similarly applied to the cover member 300A shown in FIG. 25.

The cover member 300A may include a protruding portion 305A extending from the upper plate 301A toward the groove 119 in the bobbin 110. The description of the structure of the protruding portion 305 of the cover member 300 shown in FIGS. 1 and 3 and the function thereof as a stopper may be equally or similarly applied to the protruding portion 305A of the cover member 300A shown in FIG. 25.

The cover member 300A shown in FIG. 25 may be formed of a metal. For example, the cover member 300A may be formed of steel use stainless (SUS) (e.g., an SUS-4-based material). In addition, the cover member 300A may be formed of a steel plate cold commercial (SPC). For example, the cover member 300A may be formed of SUS containing iron (Fe) in an amount of 50 percent (%) or more.

In addition, in an example, an oxidation-resistant metal, e.g., nickel, may be plated on the surface of the cover member 300A in order to inhibit oxidation.

In addition, in another embodiment, the cover member 300A may be formed of a magnetic material or a magnetic metal.

The protruding portion 305A may be formed of the same metallic material and/or magnetic material as the cover member 300A, and may serve to focus the magnetic field of the first magnet 130 on the first coil 120. At least part of the protruding portion 305A may overlap the first magnet 130 in a direction perpendicular to the first direction (or the optical-axis direction).

The protruding portion 305A may include a plurality of protruding portions corresponding to the plurality of magnet units 130-1 to 130-4 of the first magnet 130. In an example, at least part of each of the plurality of protruding portions of the cover member 300A may overlap a corresponding one of the plurality of magnet units 130-1 to 130-4 in a direction perpendicular to the first direction (or the optical-axis direction).

In an example, the protruding portion 305A may overlap the first magnet part 71A of the first magnet 130 in a direction perpendicular to the first direction (or the optical-axis direction).

At least a portion of the first magnet part 71A may overlap the protruding portion 305A in a direction perpendicular to the first direction (or the optical-axis direction).

The length of the portion of the first magnet part 71A in the first direction, which overlaps the protruding portion 305A, may be 20 percent to 100 percent of the length M1 of the first magnet part 71A in the first direction. Alternatively, in an example, the length of the portion of the first magnet part 71A in the first direction, which overlaps the protruding portion 305A, may be 50 percent to 100 percent of the length M1 of the first magnet part 71A in the first direction. When the length of the overlapping portion is less than 20 percent of M1, the effect of improvement in electromagnetic force caused by interaction with the first coil 120 due to the yoke function may be low. When the length of the overlapping portion is 100 percent of M1, electromagnetic force caused by interaction with the first coil 120 may be maximally increased.

In another embodiment, the length of the portion of the first magnet 130 in the first direction, which overlaps the protruding portion 305A, may be 20 percent to 100 percent of the length of the first magnet 130 in the first direction. Alternatively, in an example, the length of the portion of the first magnet 130 in the first direction, which overlaps the protruding portion 305A, may be 50 percent to 100 percent of the length of the first magnet 130 in the first direction.

When viewed in the first direction or from above, the protruding portion 305A may be located inside the first coil 120, as shown in FIG. 25. In an example, at least a portion of the first coil 120 may be disposed between the first magnet 130 and the protruding portion 305A. The reason for this is to focus the magnetic field of the first magnet 130 on the first coil 120 by allowing the magnetic field of the first magnet 130 to pass through the first coil 120 in a direction perpendicular to the optical axis. That is, the protruding portion 305A may function as an inner yoke. The protruding portion 305A may alternatively be referred to as an inner yoke or a yoke.

The length of the protruding portion 305A in the first direction (or the optical-axis direction) may be greater than the entire stroke of the bobbin 110. The reason for this is to inhibit the protruding portion 305A from escaping from the groove 119 in the bobbin 110 and to maximize electromagnetic force caused by interaction between the first magnet 130 and the first coil 120.

In an example, at the initial position of the bobbin 110, the length of the protruding portion 305A inserted into the groove 119 in the bobbin 110 may be greater than or equal to the entire stroke of the bobbin 110. In addition, in an example, at the initial position of the bobbin 110, the length of the protruding portion 305A inserted into the groove 119 in the bobbin 110 may be greater than the stroke of the bobbin from the initial position of the bobbin 110 in the downward direction.

Due to the yoke function of the protruding portion 305A, the embodiment may increase electromagnetic force caused by interaction between the first magnet 130 and the first coil 120 by about 20 percent compared to when the protruding portion 305A is not provided.

The yoke 410 may face, correspond to, or overlap the first magnet 130 in the first direction (or the optical-axis direction). In an example, at least a portion of the yoke 410 may overlap the first magnet 130 in the first direction (or the optical-axis direction). In an example, at least a portion of the yoke 410 may overlap the second magnet part 71B of the first magnet 130 in the first direction (or the optical-axis direction).

In an example, when viewed in the first direction or from above, the area of the portion of the first magnet 130, which overlaps the yoke 410, may be 50 percent to 100 percent of the area of the first magnet 130. When the area of the overlapping portion is less than 50 percent, the effect of increase in electromagnetic force due to the yoke function may be low. In addition, when the area of the overlapping portion is 100 percent of the area of the first magnet 130, maximum electromagnetic force may be obtained.

When the area of the overlapping portion is equal to or greater than 50 percent of the entire area of the first magnet 130, it may be possible to obtain electromagnetic force of 90 percent or more of the maximum electromagnetic force obtained when the area of the overlapping portion is 100 percent.

If the cover member is made of a metal in a camera module that performs OIS operation by moving a housing and a lens module coupled to a bobbin disposed in the housing in a direction perpendicular to the optical axis, the cover member may be attached to the housing by a magnet disposed in the housing. Thus, OIS operation may not be performed normally. In contrast, in the embodiment, since the housing 140 belongs to the fixed unit and the first board unit 255 is moved in a direction perpendicular to the optical axis in order to perform OIS operation, OIS operation may be performed normally even when the cover member 300A is formed of a metallic material having a yoke function, and electromagnetic force for AF operation may be improved by the protruding portion 305A of the cover member 300A.

As the sizes of the image sensor and the lens of the lens module increase, greater AF driving force and OIS driving force may be required, whereby power consumption may increase. In order to inhibit increase in power consumption, it is required to improve electromagnetic force for AF operation and OIS operation.

In the embodiment, electromagnetic force caused by interaction between the first magnet 130 and the second coil 230 may be improved using the yoke 410, OIS driving force or electromagnetic force for OIS operation may be improved, and increase in power consumption may be inhibited.

In addition, in the embodiment, electromagnetic force for AF operation may be improved by the metallic cover member 300A having the protruding portion 305A that functions as a yoke, whereby increase in power consumption may be inhibited.

In addition, electromagnetic force for AF operation caused by interaction between the first coil 120 and the first magnet 130 may be improved due to various types of yokes 420A, 420B, 420C, and 420B1 disposed on the first magnet 130, as shown in FIGS. 21E and 23A to 23C. In addition, electromagnetic force for OIS operation caused by interaction between the second coil 120 and the first magnet 130 may be improved due to the yokes 420A, 420B, 420C, and 420B1.

Figure 26:
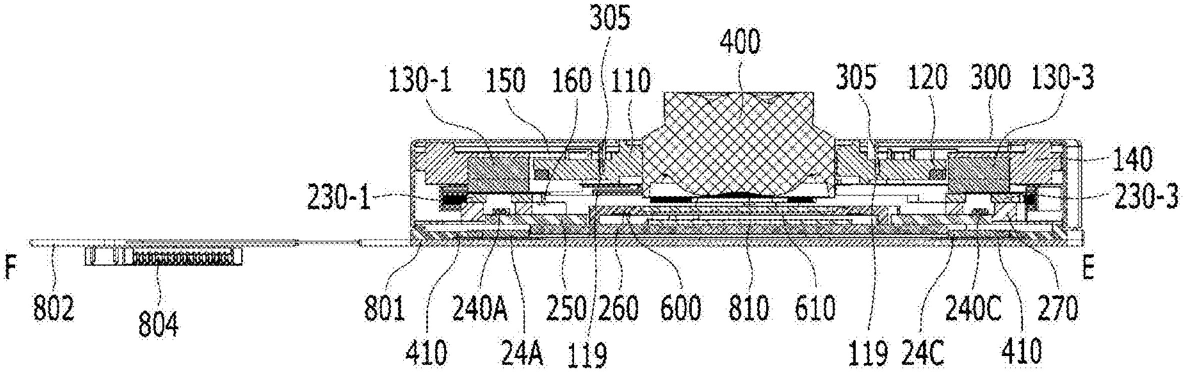
FIG. 26 is a cross-sectional view of a camera device according to another embodiment.
Figure 27A:
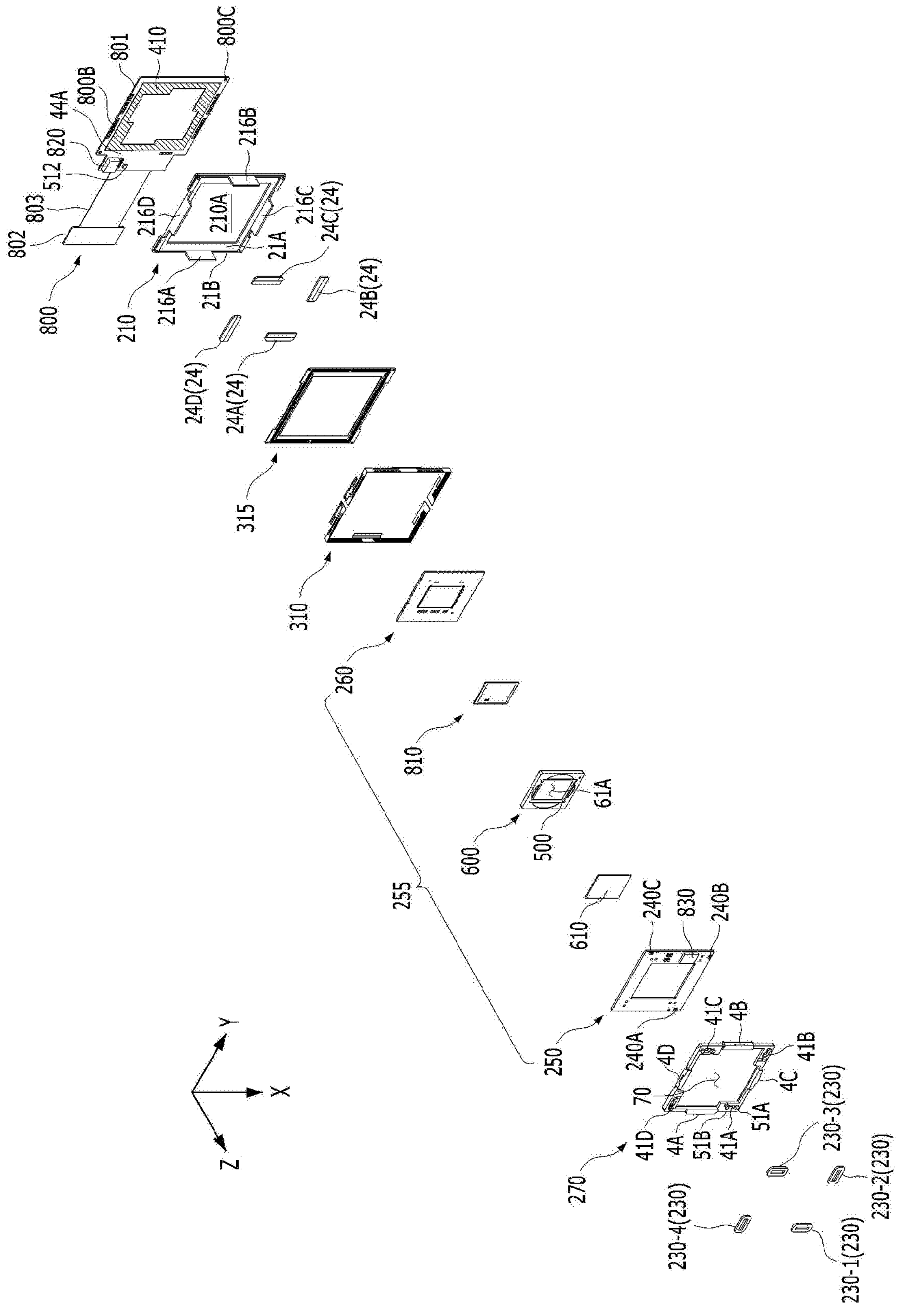
FIG. 27A is a first exploded perspective view of an image sensor unit according to the other embodiment shown in FIG. 26.
Figure 27B:
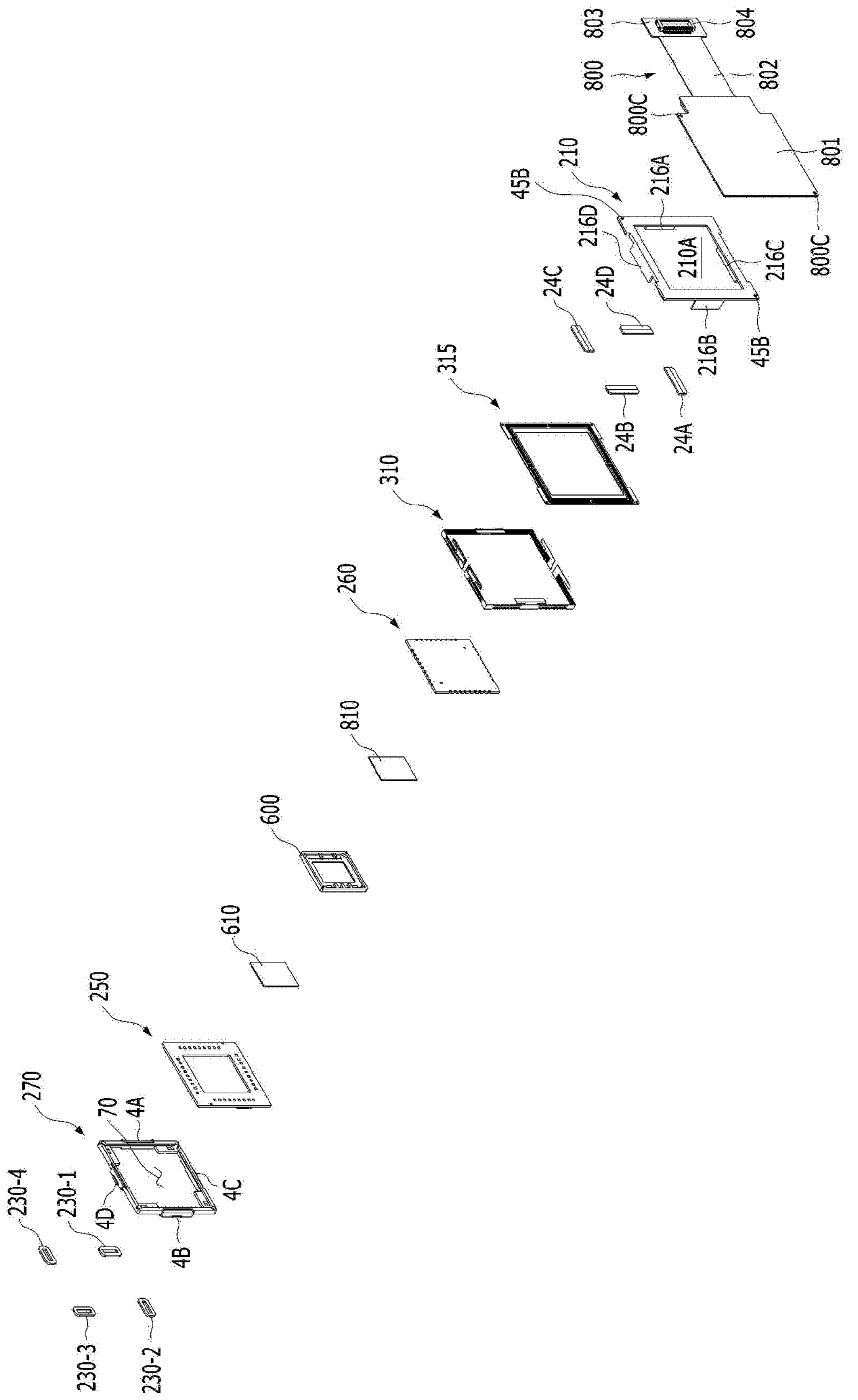
FIG. 27B is a second exploded perspective view of the image sensor unit according to the other embodiment shown in FIG. 26.
Figure 28:
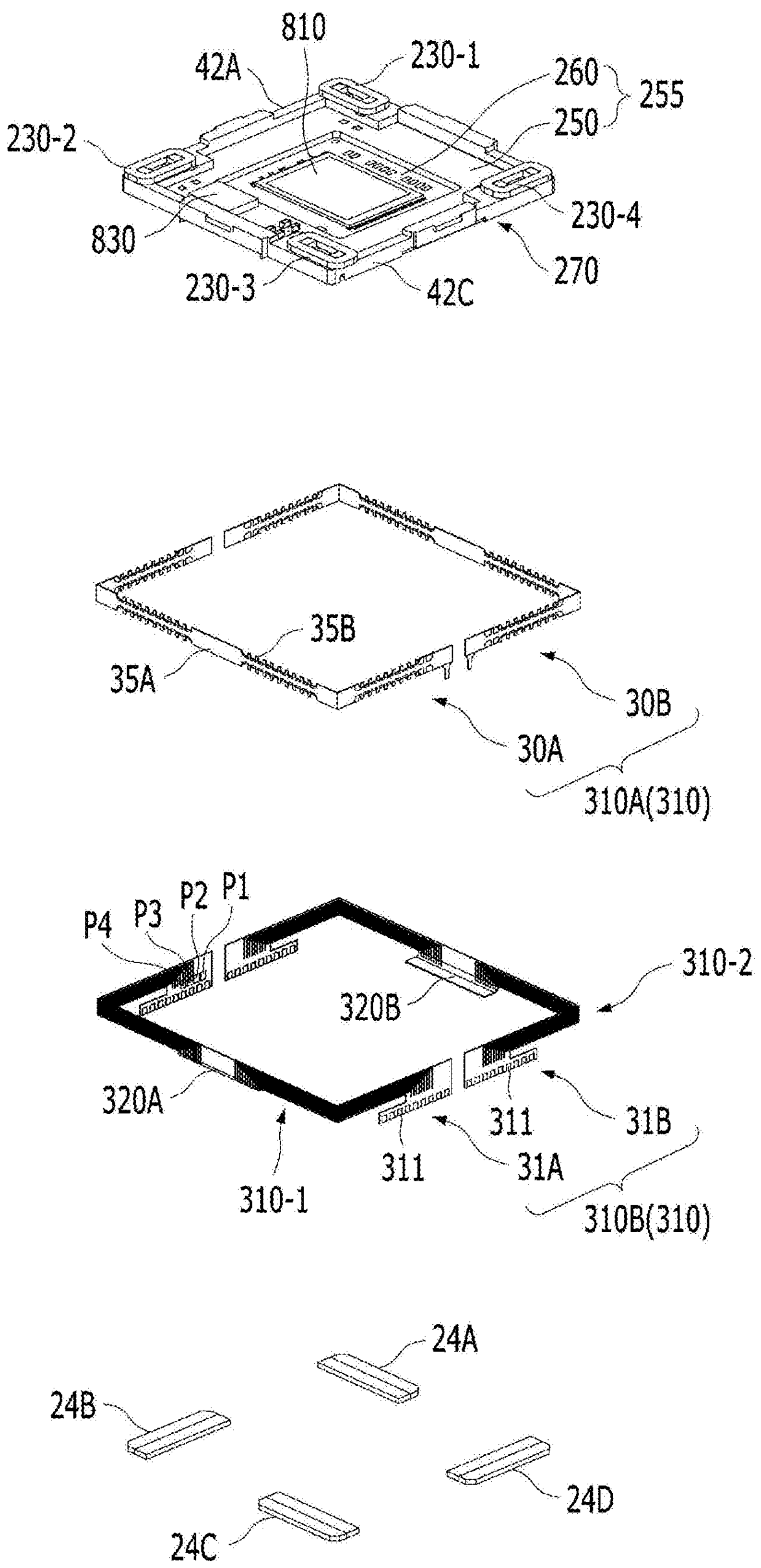
FIG. 28 is a perspective view of a holder, a second coil, a first board unit, an image sensor, a support board, and a magnet according to the other embodiment shown in FIG. 26.
Figure 29A:
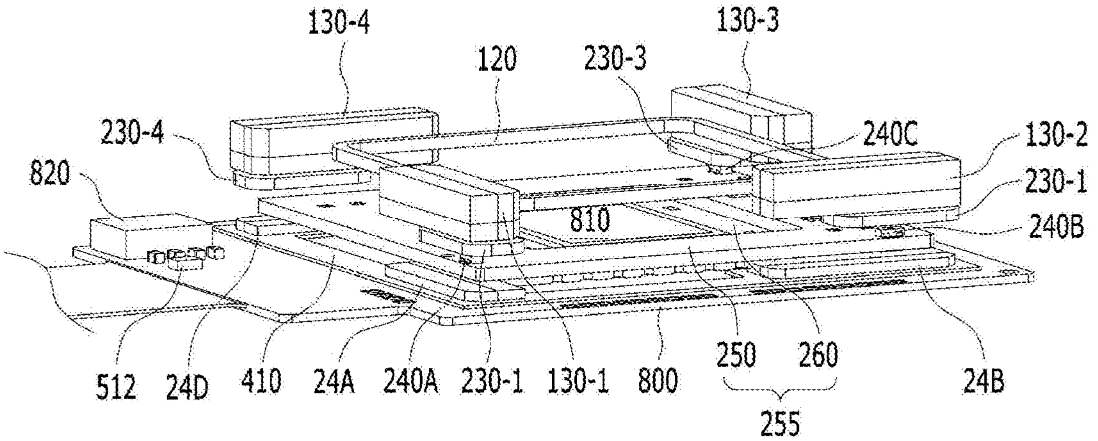
FIG. 29A is a perspective view of a first coil, a magnet, the second coil, the magnet, a yoke, the first board unit, and a second board unit of the camera device according to the other embodiment shown in FIG. 26.
Figure 29B:
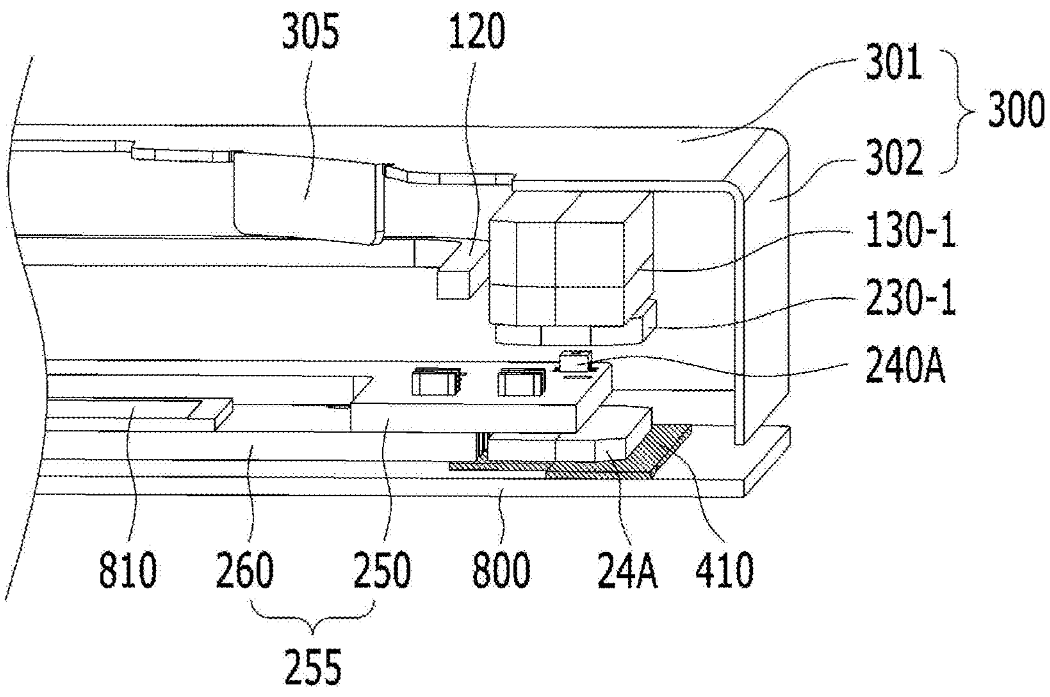
FIG. 29B is an enlarged view of a part of the camera device according to the other embodiment shown in FIG. 26.
Figure 29C:
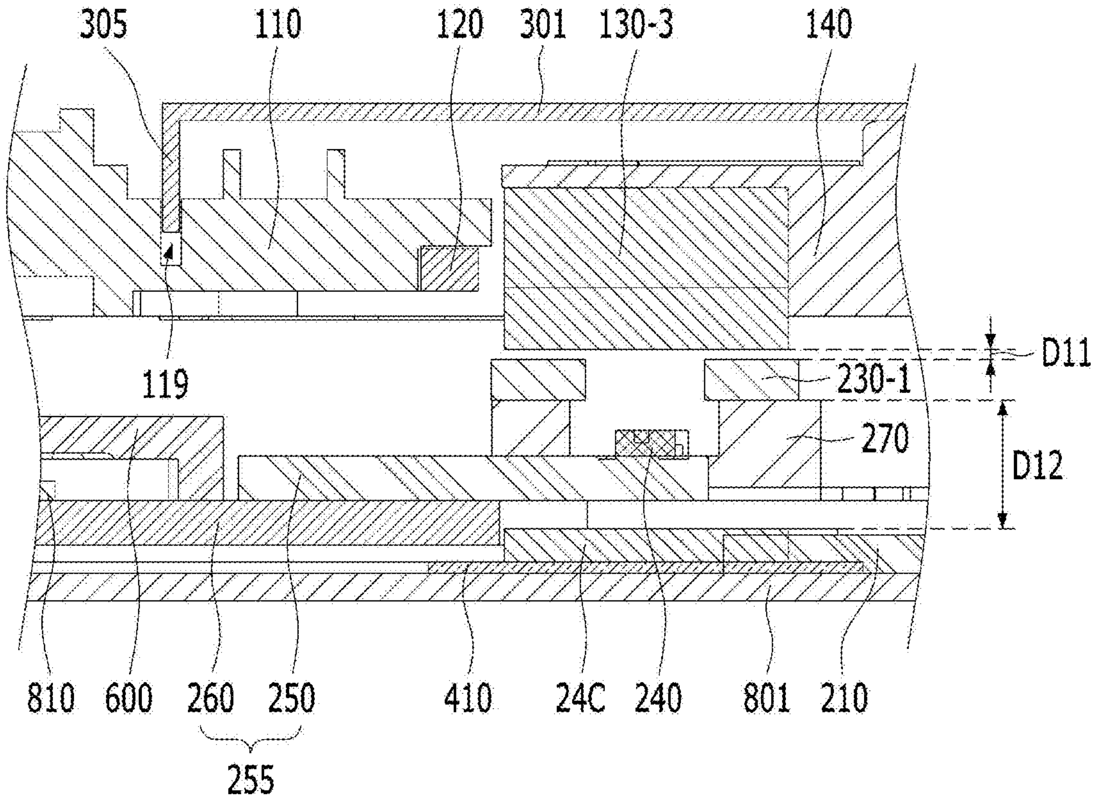
FIG. 29C illustrates a distance between the magnet and the second coil and a distance between the magnet and the second coil in the camera device according to the other embodiment shown in FIG. 26.

FIG. 26 is a cross-sectional view of a camera device 10-1 according to another embodiment, FIG. 27A is a first exploded perspective view of an image sensor unit according to the other embodiment shown in FIG. 26, FIG. 27B is a second exploded perspective view of the image sensor unit according to the other embodiment shown in FIG. 26, FIG. 28 is a perspective view of a holder 270, a second coil 230, a first board unit 255, an image sensor 810, a support board 310, and a magnet 24 according to the other embodiment shown in FIG. 26, FIG. 29A is a perspective view of a first coil 120, a magnet 130, the second coil 230, the magnet 24, a yoke 410, the first board unit 255, and a second board unit 800 of the camera device according to the other embodiment shown in FIG. 26, FIG. 29B is an enlarged view of a part of the camera device according to the other embodiment shown in FIG. 26, and FIG. 29C illustrates a distance between the magnet 130 and the second coil 230 and a distance between the magnet 24 and the second coil 230 in the camera device according to the other embodiment shown in FIG. 26. In FIGS. 26 to 29C, the same reference numerals as those in FIGS. 1 to 25 represent the same components, and the above description may be equally or similarly applied to the same components.

Referring to FIGS. 26 to 29C, the camera device 10-1 may additionally include a magnet 24 compared to the camera device 10 shown in FIG. 1. Therefore, the description given with reference to FIGS. 1 to 25 may be equally or similarly applied to the embodiment shown in FIG. 26.

The fixed unit may include a base 210 that accommodates a second board unit 800 and is coupled to a cover member 300. The fixed unit may include a yoke 410 disposed on the second board unit 800. In addition, the fixed unit may include a magnet 24 disposed on the base 210.

In an example, the magnet 130 may be represented as one of a first magnet and a second magnet, and the magnet 24 may be represented as the other of the first magnet and the second magnet. Hereinafter, for convenience of description, the magnet 130 will be referred to as a "first magnet", and the magnet 24 will be referred to as a "second magnet".

The OIS position sensor 240 may face, correspond to, or overlap the first magnet 130 and the second magnet 24 in the optical-axis direction. In an example, at least a portion of the first sensor 240A may overlap at least one of a first magnet unit 130-1 of the first magnet 130 or a first magnet unit 24A of the second magnet 24 in the optical-axis direction, and the first sensor 240A may output a first output signal (e.g., first output voltage) corresponding to the result of detection of the magnetic fields of the first magnet units 130-1 and 24A.

In an example, at least a portion of the second sensor 240B may overlap at least one of a second magnet unit 130-2 of the first magnet 130 or a second magnet unit 24B of the second magnet 24 in the optical-axis direction, and the second sensor 240B may output a second output signal (e.g., second output voltage) corresponding to the result of detection of the magnetic fields of the second magnet units 130-2 and 24B.

In addition, in an example, at least a portion of the third sensor 240C may overlap at least one of a third magnet unit 130-3 of the first magnet 130 or a third magnet unit 24C of the second magnet 24 in the optical-axis direction, and the third sensor 240C may output a third output signal (e.g., third output voltage) corresponding to the result of detection of the magnetic fields of the third magnet units 130-3 and 24C.

The OIS moving unit may be moved relative to the fixed unit by first electromagnetic force generated by the first magnet 130 and the second coil 230 and second electromagnetic force generated by the second magnet 24 and the second coil 230.

The second magnet 24 may be disposed below the second coil 230, and may correspond to, face, or overlap the second coil 230 in the first direction or the optical-axis direction.

Referring to FIGS. 27A, 27B, and 29A to 29C, the first magnet 130 may be disposed on a first board unit 255 (e.g., a first circuit board 250), and the second magnet 24 may be disposed under the first board unit 255 (e.g., the first circuit board 250). The first magnet 130 may have most influence on electromagnetic force for AF operation and electromagnetic force for OIS operation, and the second magnet 24 may have an additional influence on electromagnetic force for OIS operation.

In an example, the second magnet 24 may include magnet units 24A to 24D corresponding to coil units 230-1 to 230-4 of the second coil 230. Each of the magnet units 24A to 24D may correspond to, face, or overlap a corresponding one of the first to fourth coil units 230-1 to 230-4 in the first direction or the optical-axis direction.

In an example, the second magnet 24 may be disposed on the fixed unit. In an example, the second magnet 24 may be disposed on the second board unit 800. In an example, the second magnet 24 may be disposed on a first region 801 of the second board unit 800. In another embodiment, the second magnet 24 may be disposed on the base 210. In an example, in another embodiment, the second magnet 24 may be disposed on a lower plate 21A of the base 210.

In an example, each of the magnet units 24A to 24D of the second magnet 24 may be disposed on at least one of the side portion or the corner of the second board unit 800 (or the base 210). In an example, at least a portion of the second magnet 24 may be disposed on the side portion or the corner of the second board unit 800 (or the base 210).

In an example, each of the magnet units 24A to 24D of the second magnet 24 may include a first portion disposed on a corresponding corner among the four corners of the first region 801 of the second board unit 800. In addition, each of the magnet units 24A to 24D may include a second portion disposed on the side portion of the first region 801 that is adjacent to the corresponding corner of the first region 801 of the second board unit 800.

The second magnet 24 may be a monopolar-magnetized magnet. In another embodiment, the second magnet 24 may be a bipolar-magnetized magnet or a 4-pole magnet, which includes two N poles and two S poles.

In the embodiment, the electromagnetic force for moving the OIS moving unit may include first electromagnetic force and second electromagnetic force. The first electromagnetic force may be electromagnetic force caused by interaction between the second coil 230 and the first magnet 130 disposed on the second coil 230.

The second electromagnetic force may be electromagnetic force caused by interaction between the second coil 230 and the second magnet 24 disposed below the second coil 230. Therefore, the embodiment may increase or improve the electromagnetic force for moving the OIS moving unit.

In addition, the yoke 410 may serve to increase the second electromagnetic force caused by interaction between the second magnet 24 and the second coil 230. In an example, the yoke 410 may be disposed between the second board unit 800 and the second magnet 24. In an example, the yoke 410 may be disposed on the upper surface of the first region 801 of the second board unit 800. In another embodiment, the yoke may be disposed under the second board unit 800. In an example, in the other embodiment, the yoke may be disposed on the lower surface of the first region 801.

In an example, the yoke 410 may face or overlap the second magnet 24 in the first direction (or the optical-axis direction). In an example, the yoke 410 may have a plate shape, may include a cavity formed therein, and may be formed as a single body. In another embodiment, the yoke 410 may include a plurality of yokes corresponding to the magnet units 24A to 24D of the second magnet 24.

In an example, the yoke 410 may be in contact with the lower surface of the second magnet 24. In an example, the yoke 410 may serve to increase electromagnetic force between the second coil 230 and the second magnet 24.

Figure 30A:
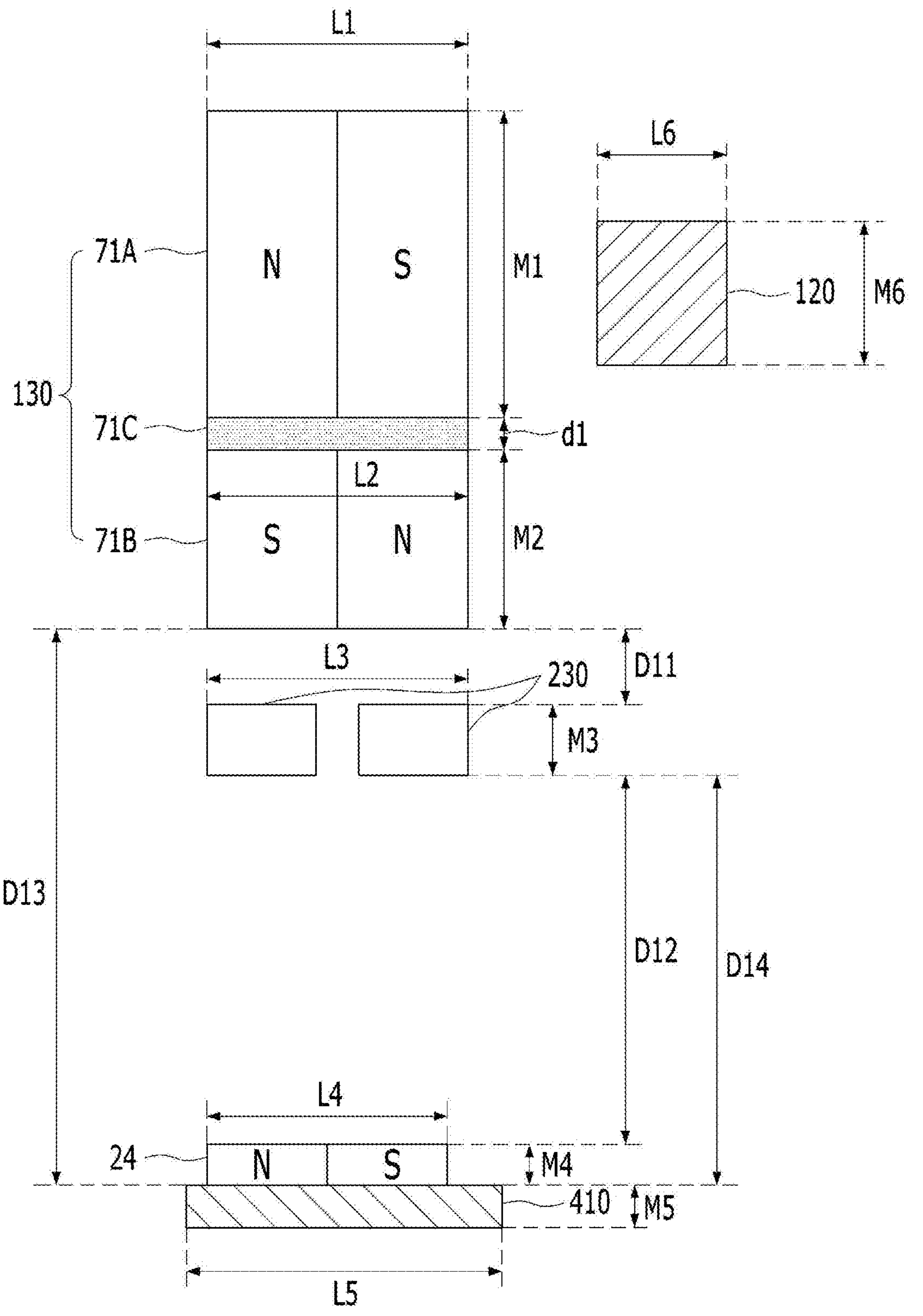
FIG. 30A illustrates the first magnet, the first coil, the second coil, the second magnet, and the yoke according to the embodiment shown in FIG. 26.

FIG. 30A illustrates an embodiment of the first magnet 130, the first coil 120, the second coil 230, the second magnet 24, and the yoke 410 according to the embodiment shown in FIG. 26. Although one of the magnet units of the first magnet 130, one of the coil units of the second coil 230, and one of magnet units of the second magnet 24 will be described with reference to FIG. 30A, the description given with reference to FIG. 30A may be equally or similarly applied to the remaining magnet units of the first magnet 130, the remaining coil units of the second coil 230, and the remaining magnet units of the second magnet 24.

Referring to FIG. 30A, in an example, at the initial position of the OIS moving unit, at least a portion of the first magnet 130 may overlap at least a portion of the second coil 230 in the first direction (or the optical-axis direction). In an example, at the initial position of the OIS moving unit, at least a portion of the second magnet 24 may overlap at least a portion of the second coil 230 in the first direction (or the optical-axis direction). In an example, at least a portion of the first magnet 130 may overlap at least a portion of the second magnet 24 in the first direction (or the optical-axis direction).

In an example, the second magnet 24 may be a monopolar-magnetized magnet including an N pole and an S pole. An interface may be formed between the N pole and the S pole of the second magnet 24. The N pole and the S pole of the second magnet 24 may face each other in a direction perpendicular to the optical axis.

The first magnet 130 and the second magnet 24 may be disposed such that opposite polarities thereof face each other in the first direction (or the optical-axis direction). In an example, the N pole of the second magnet 24 may face the second S pole of the second magnet part 71B of the first magnet 130 in the first direction (or the optical-axis direction), and the S pole of the second magnet 24 may face the second N pole of the second magnet part 71B of the first magnet 130 in the first direction (or the optical-axis direction).

The volume of the first magnet 130 may be larger than the volume of the second magnet 24. This is because the first magnet 130 has a structure that generates electromagnetic force through interaction with the first coil 120 and generates electromagnetic force through interaction with the second coil 230. In addition, in order to maintain the linearity of the output from the first position sensor 170 according to AF operation, the first magnet 130 overlaps the first coil 120 in the stroke section of the first coil 120.

When viewed in the first direction or from above, the length L4 of the short side of the second magnet 24 may be shorter than the length L3 of the short side of the second coil 230. In another embodiment, the length L4 of the short side of the second magnet 24 may be longer than or equal to the length L3 of the short side of the second coil 230.

When viewed in the first direction or from above, the length L4 of the short side of the second magnet 24 may be shorter than the length L1 of the short side of the first magnet 130. In another embodiment, the length L4 of the short side of the second magnet 24 may be longer than or equal to the length L1 of the short side of the first magnet 130.

In an example, the length of the first magnet 130 in the first direction (or the optical-axis direction) may be longer than the length M4 of the second magnet 130 in the first direction (or the optical-axis direction).

The length M4 of the second magnet 24 in the first direction (or the optical-axis direction) may be shorter than M1, M2, and M3. In another embodiment, M4 may be equal to or longer than at least one of M1, M2, or M3. The length M5 of the yoke 410 in the first direction (or the optical-axis direction) may be equal to or longer than the length M4 of the second magnet 24 in the first direction (or the optical-axis direction). In another embodiment, M5 may be shorter than M4.

The length M4 of the second magnet 24 in the first direction (or the optical-axis direction) may be shorter than the length L4 of the short side of the second magnet 24. When M4 is longer than or equal to L4, the height of the camera device 10 in the optical-axis direction may be increased, and thus the size of the camera device may be increased. Accordingly, the thickness of the optical instrument 200A in which the camera device 10 is mounted may be increased.

In another embodiment, the length of the second magnet 24 in the first direction (or the optical-axis direction) may be longer than or equal to the length of the short side of the second magnet 24.

Most of the electromagnetic force for AF operation may be generated by electromagnetic force caused by interaction between the first coil 120 and the first magnet 130.

The electromagnetic force for OIS operation may be generated by the first electromagnetic force caused by interaction between the second coil 230 and the first magnet 130 and the second electromagnetic force caused by interaction between the second coil 230 and the second magnet 24. As such, in the embodiment, since the electromagnetic force for OIS operation is generated by the two magnets 130 and 24 disposed above and below the second coil 230, the electromagnetic force for OIS operation may be improved.

A spacing distance D12 between the second magnet 24 and the second coil 230 in the optical-axis direction may be longer than a spacing distance D11 between the first magnet 130A and the second coil 230 in the optical-axis direction (D12>D11). As D11 decreases, electromagnetic force between the first magnet 130 and the second coil 230 may be increased, and as D12 decreases, electromagnetic force between the second magnet 24 and the second coil 230 may be increased. However, a space in which the second position sensor 240 and the first board unit 255 are disposed needs to be secured between the second magnet 24 and the second coil 230, and thus D12 may be longer than D11.

For example, D12 may be 0.5 mm to 1.5 mm. In another embodiment, D12 may be 0.5 mm to 1.25 mm. Alternatively, in another embodiment, D12 may be 0.7 mm to 1 mm.

When D12 is less than 0.5 mm, a sufficient space for placement of the second position sensor 240 and the first board unit 255 is not secured, and thus spatial interference may occur between the second magnet 24 and each of the first board unit 255 and the second position sensor 240. On the other hand, when D12 exceeds 1.5 mm, electromagnetic force between the second magnet 24 and the second coil 230 may be low, and thus an OIS driving force increase effect may not be obtained, and the size of the camera module in the optical-axis direction may be increased.

A value obtained by dividing D12 by D11 (D12/D11) may be 2.5 to 30. Alternatively, for example, the value obtained by dividing D12 by D11 (D12/D11) may be 5 to 15. Alternatively, for example, the value obtained by dividing D12 by D11 (D12/D11) may be 10 to 15.

When the divided value (D12/D11) is less than 2.5, D12 is too small to secure a sufficient space for placement of the second position sensor 240 and the first board unit 255. In addition, when the divided value (D12/D11) exceeds 30, D12 is so large that electromagnetic force caused by interaction with the second coil 230 is low, and thus an OIS driving force increase effect may not be obtained, and the size of the camera module in the optical-axis direction may be increased.

In addition, when the divided value (D12/D11) is 10 to 15, a sufficient space for placement of the second position sensor 240 and the first board unit 255 may be secured, and OIS driving force may be increased.

In addition, in an example, a spacing distance D13 between the first magnet 130 and the yoke 410 in the optical-axis direction may be longer than D12 (D13>D12). In addition, in an example, a spacing distance D14 between the second coil 230 and the yoke 410 in the optical-axis direction may be longer than D12 (D14>D12).

For example, D13 may be 1.5 mm to 2.5 mm. Alternatively, for example, D13 may be 1.6 mm to 2 mm. Alternatively, for example, D13 may be 1.5 mm to 1.8 mm.

Alternatively, for example, D14 may be 1.2 mm to 2 mm. Alternatively, for example, D14 may be 1.2 mm to 1.55 mm. Alternatively, for example, D14 may be 1.3 mm to 1.5 mm.

The description of D11, D12, D13, D14, and the divided value (D12/D11) may be equally or similarly applied to FIGS. 30B to 30F, 31A to 31C, and 32A to 32C, which will be described later. In addition, the description of the divided value (D12/D11) given with reference to FIG. 30A may be equally or similarly applied to FIG. 33.

Figure 30B:
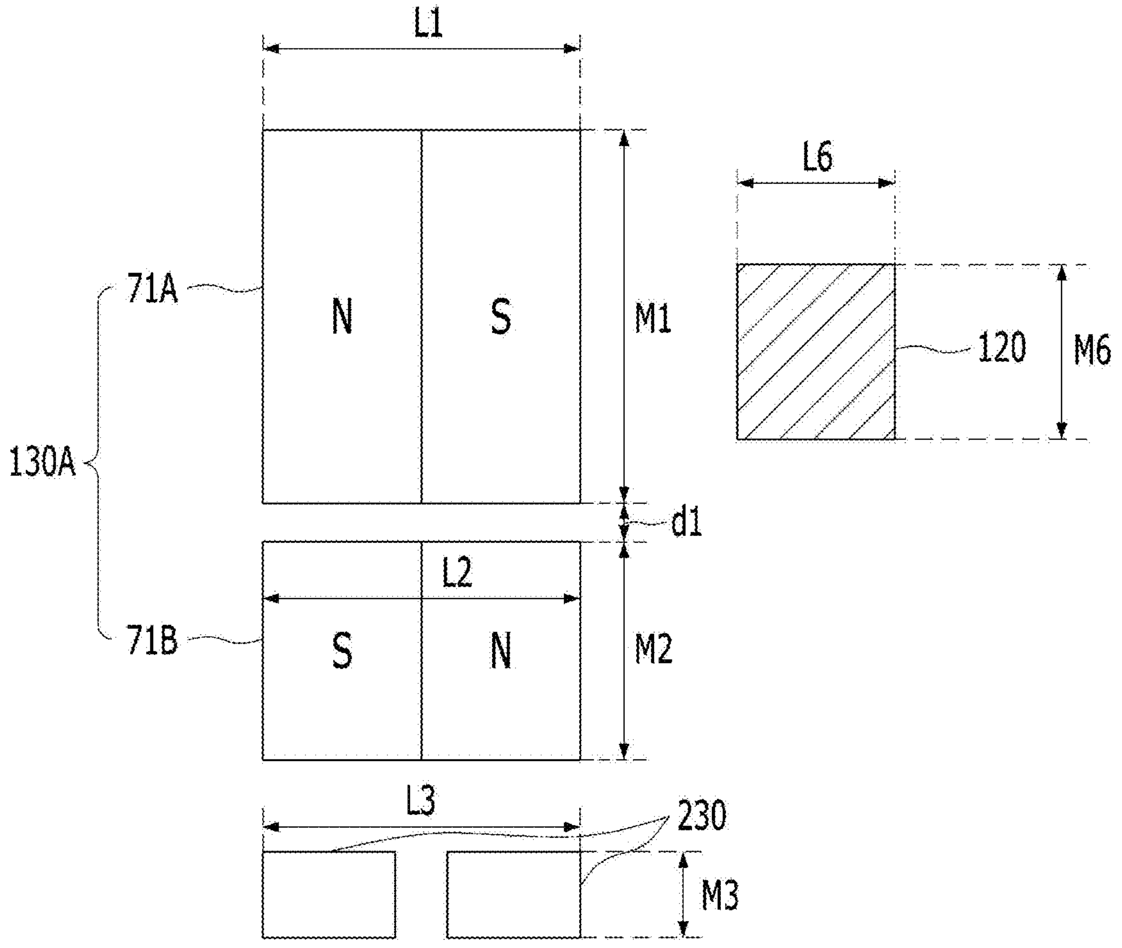
FIG. 30B illustrates another embodiment of the first magnet according to the embodiment shown in FIG. 26.
Figure 30B:
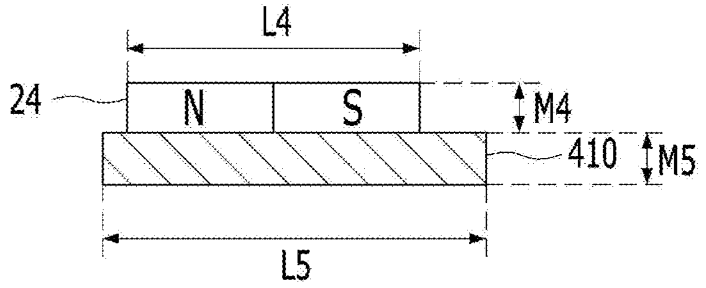

FIG. 30B illustrates another embodiment 130A of the first magnet 130 according to the embodiment shown in FIG. 26. In FIG. 30B, the same reference numerals as those in FIG. 30A represent the same components, and description of the same components will be omitted.

Referring to FIG. 30B, the first magnet 130A shown in FIG. 30B may be formed such that the partition wall 71C of the first magnet 130 shown in FIG. 30A is eliminated and the first magnet part 71A and the second magnet part 71B are spaced apart from each other. In an example, a portion of the housing 140 may be interposed, disposed, or inserted between the first magnet part 71A and the second magnet part 71B. That is, the first magnet part 71A and the second magnet part 71B may be separated from each other by a portion of the housing 140. In this case, a neutral zone may be formed between the first magnet part 71A and the second magnet part 71B. In another embodiment, a neutral zone may not be formed between the first magnet part 71A and the second magnet part 71B.

Figure 30C:
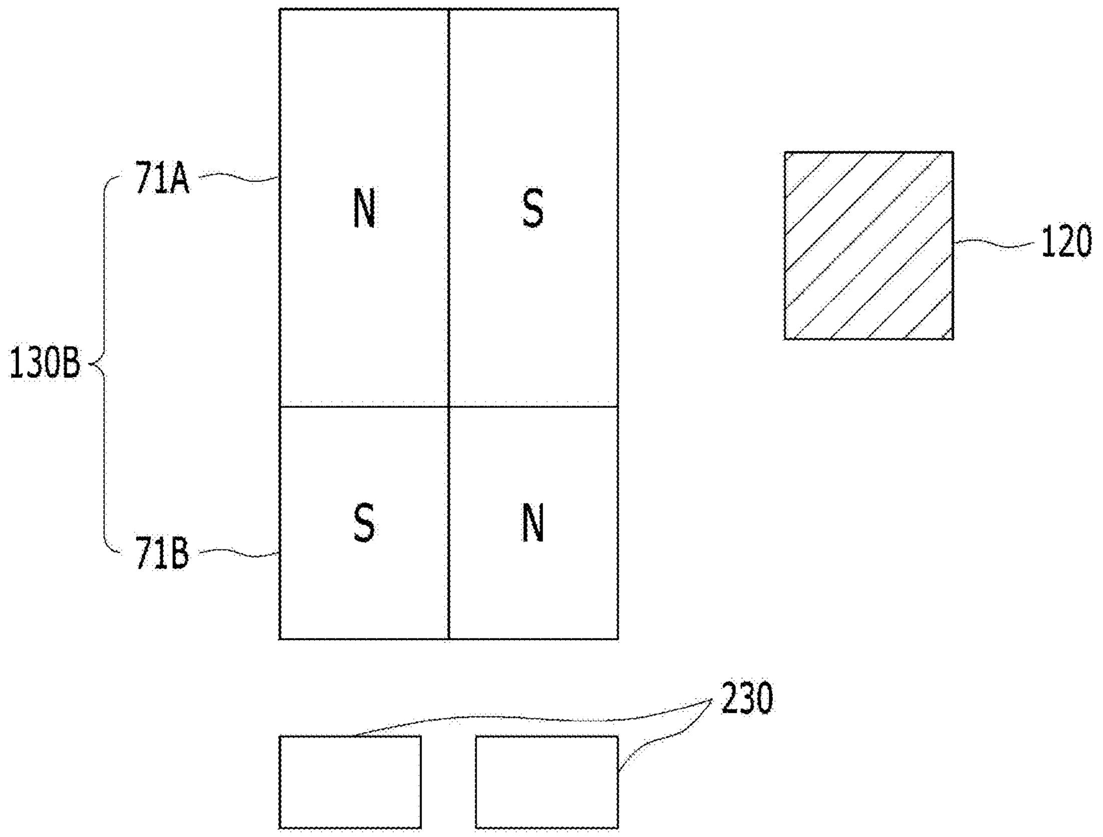
FIG. 30C illustrates still another embodiment of the first magnet according to the embodiment shown in FIG. 26.
Figure 30C:

FIG. 30C illustrates still another embodiment 130B of the first magnet 130 according to the embodiment shown in FIG. 26.

Referring to FIG. 30C, the first magnet 130B shown in FIG. 30C may be formed such that the partition wall 71C of the first magnet 130 shown in FIG. 30A is eliminated and the first magnet part 71A and the second magnet part 71B are in contact with each other.

In an example, the first N pole of the first magnet part 71A may be in contact with the second S pole of the second magnet part 71B, and the first S pole of the first magnet part 71A may be in contact with the second N pole of the second magnet part 71B.

Figure 30D:
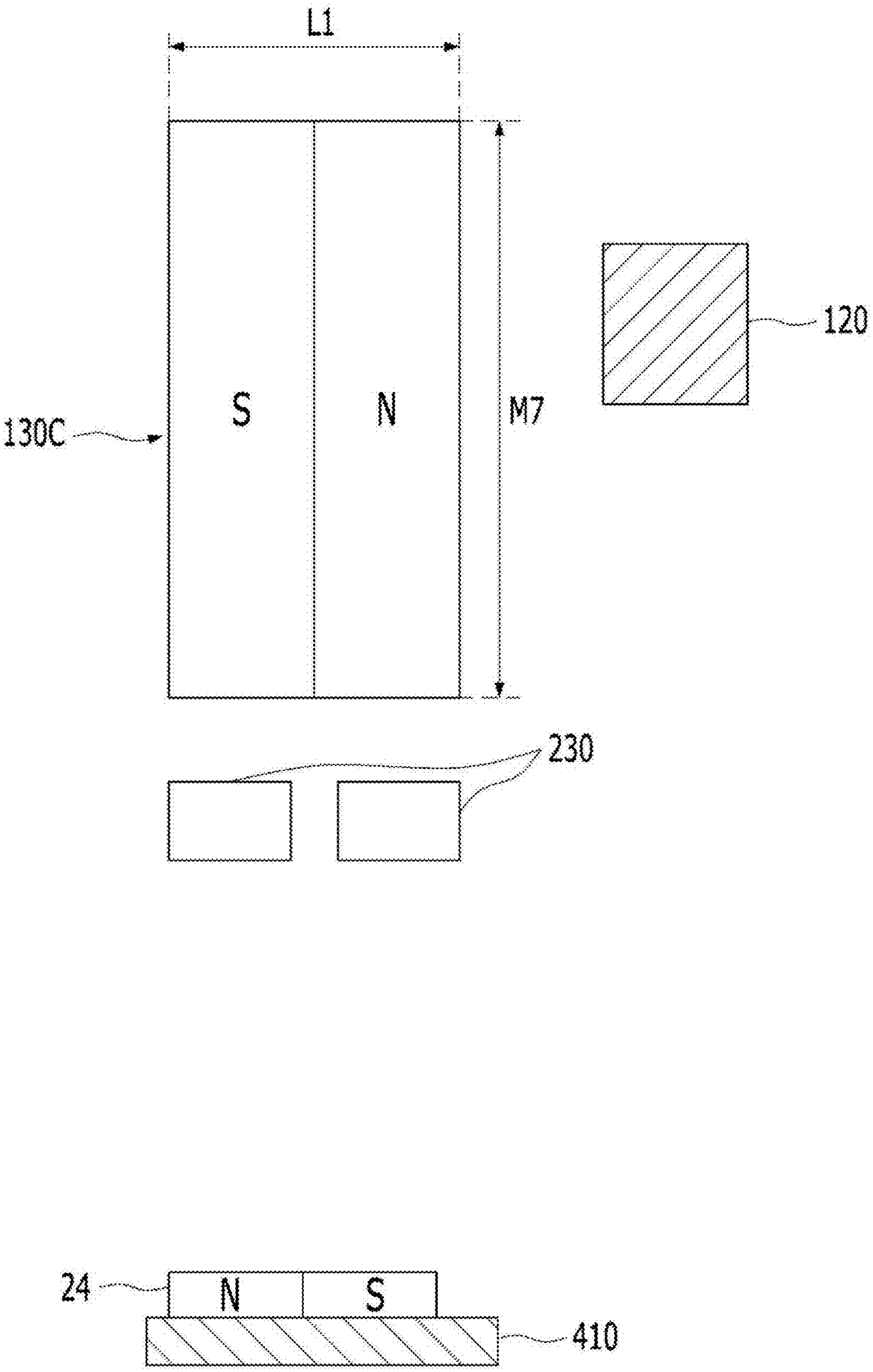
FIG. 30D illustrates still another embodiment of the first magnet according to the embodiment shown in FIG. 26.

FIG. 30D illustrates still another embodiment 130C of the first magnet 130 according to the embodiment shown in FIG. 26.

Referring to FIG. 30D, the first magnet 130 may be a monopolar-magnetized magnet including one N pole and one S pole.

In an example, the length M7 of the first magnet 130 in the first direction (or the optical-axis direction) may be the sum of M1 and M2 in FIG. 30A. Alternatively, in an example, M7 may be the sum of M1, M2, and d1 in FIG. 30A.

Figure 30E:
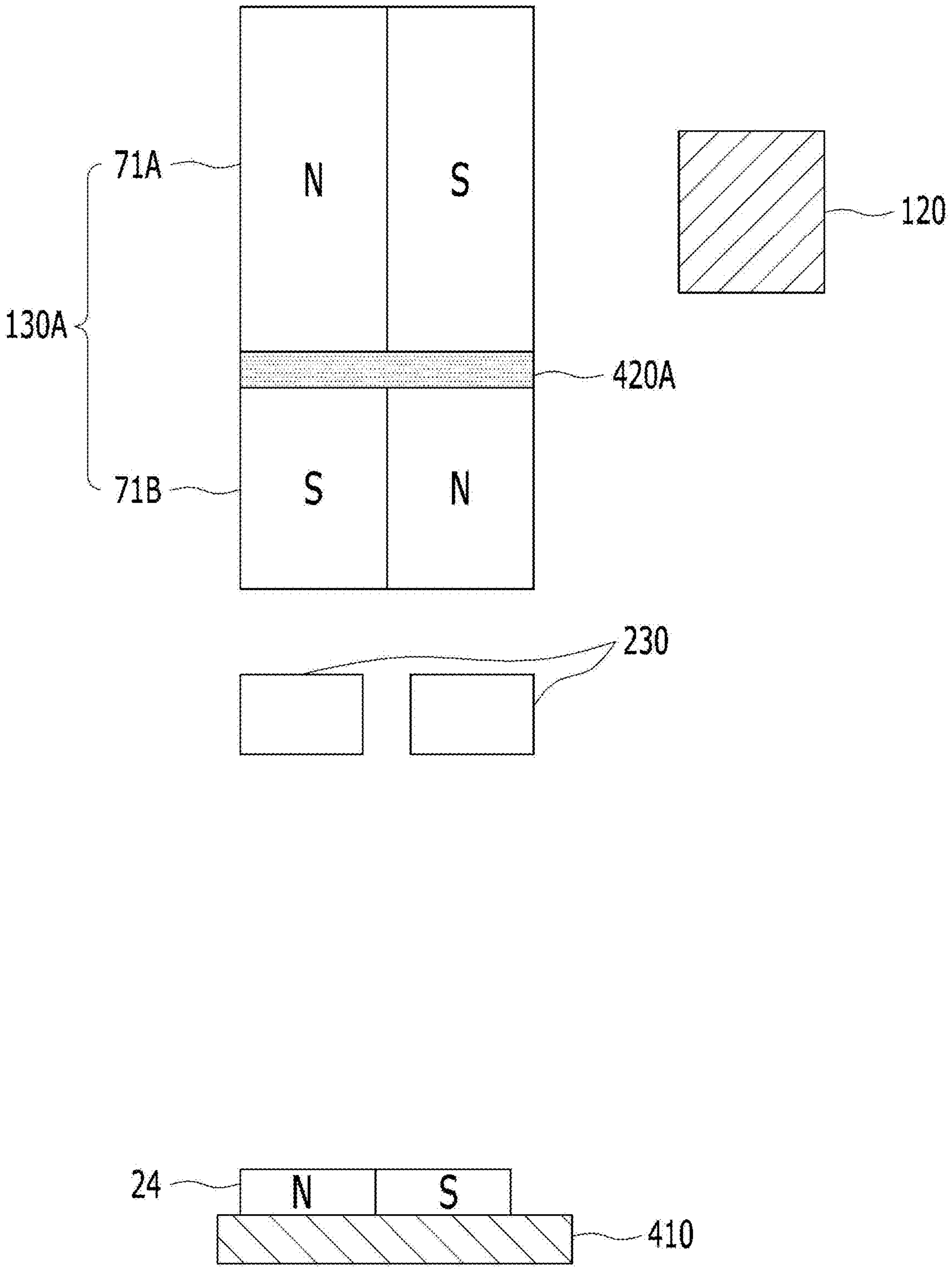
FIG. 30E is a modified example of FIG. 30B.

FIG. 30E is a modified example of FIG. 30B.

Referring to FIG. 30E, a yoke 420A may be disposed between the first magnet part 71A and the second magnet part 71B. The yoke 420A may correspond to, face, or overlap each of the first magnet part 71A and the second magnet part 71B in the first direction (or the optical-axis direction).

The yoke 420A may improve electromagnetic force caused by interaction between the first magnet part 71A and the first coil 120, thereby improving electromagnetic force for AF operation. In addition, the yoke 420A may improve electromagnetic force caused by interaction between the second magnet part 71B and the second coil 230, thereby improving electromagnetic force for OIS operation.

Figure 30F:
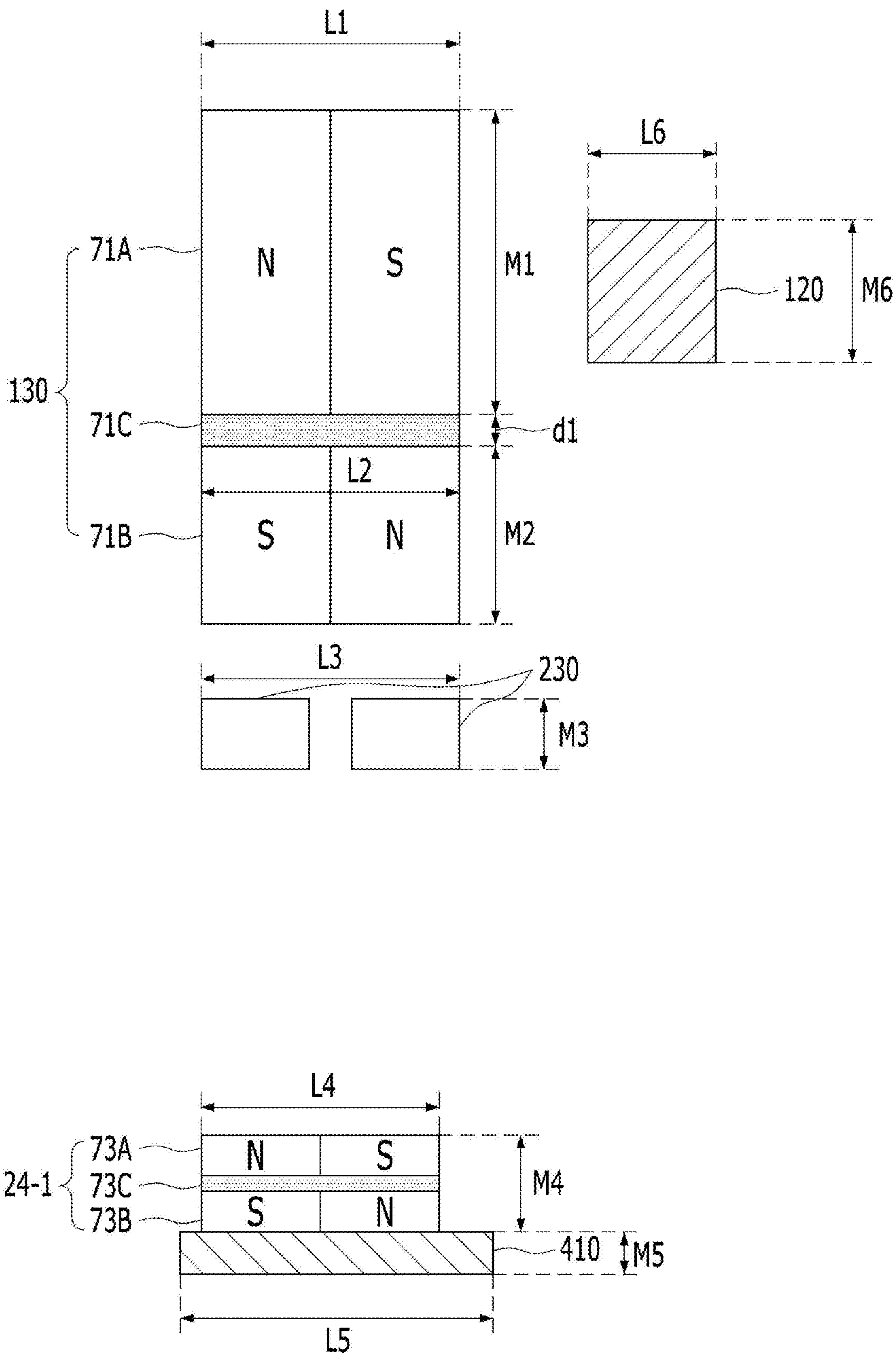
FIG. 30F is another modified example of FIG. 30A.

FIG. 30F is another modified example of FIG. 30A.

Referring to FIG. 30F, the second magnet 24-1 may include a first magnet part 73A including a first N pole and a first S pole and a second magnet part 73B including a second N pole and a second S pole. In addition, a partition wall 73C may be formed between the first magnet part 73A and the second magnet part 73B. In an example, the first magnet part 73A and the second magnet part 73B may be spaced apart from each other in the first direction (or the optical-axis direction). The first magnet 130 and the second magnet 24 may be disposed such that opposite polarities thereof face each other in the first direction (or the optical-axis direction). The description of bipolar magnetization of the first magnet 130 given with reference to FIG. 30A may be equally or similarly applied to the second magnet 24-1 shown in FIG. 30F.

Since the second magnet 24-1 is implemented as a bipolar-magnetized magnet, the embodiment may improve electromagnetic force caused by interaction between the second coil 230 and the second magnet 24-1, thereby increasing electromagnetic force for OIS operation.

Figure 31A:
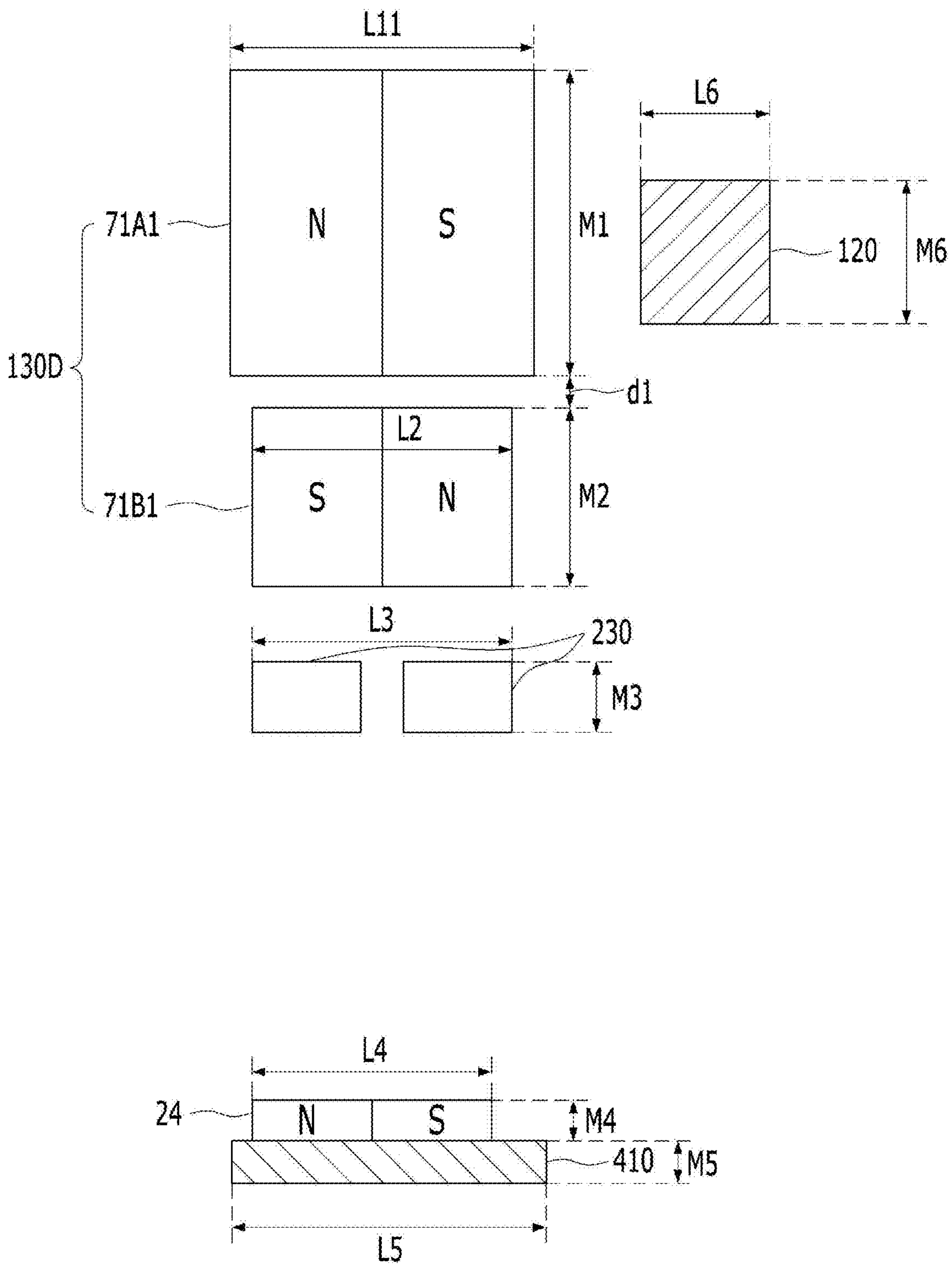
FIG. 31A illustrates still another embodiment of the first magnet shown in FIG. 26.

FIG. 31A illustrates still another embodiment 130D of the first magnet 130 shown in FIG. 26. The embodiment shown in FIG. 31A is a modified example of the first magnet shown in FIG. 30B. In another embodiment, the first magnet 130D shown in FIG. 31A may be equally or similarly applied to FIGS. 30A and 30C to 30F.

Referring to FIG. 31A, the length L11 of the short side of the first magnet part 71A1 may be longer than the length L2 of the short side of the second magnet part 71B1 (L11>L2). The reason for this is to improve AF electromagnetic force caused by interaction with the first coil 120 by increasing the size of the first magnet part 71A1. In another embodiment, in order to improve OIS electromagnetic force, the length of the short side of the second magnet part may be longer than the length of the short side of the first magnet part.

In an example, the length L11 of the short side of the first magnet part 71A1 may be longer than at least one of L3, L4, or L5.

FIGS. 30A to 31A may be cross-sectional views taken in a direction parallel to the short side of the first magnet 130.

Figure 31B:
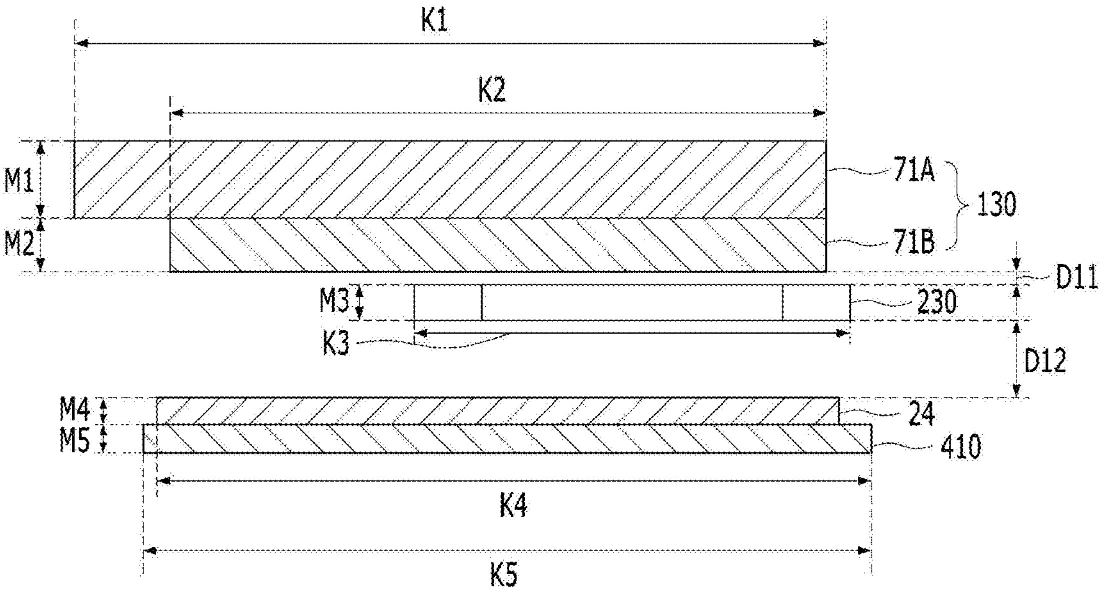
FIG. 31B illustrates an embodiment of the length of the long side of each of the first magnet, the first coil, the second coil, the second magnet, and the yoke according to the embodiment shown in FIG. 26.

FIG. 31B illustrates an embodiment of the length of the long side of each of the first magnet 130, the first coil 120, the second coil 230, the second magnet 24, and the yoke 410 according to the embodiment shown in FIG. 26.

Referring to FIG. 31B, when viewed in the first direction or from above, the length K1 of the long side of the first magnet part 71A of the first magnet 130 and the length K2 of the long side of the second magnet part 71B may be different from each other. In an example, the length K1 of the long side of the first magnet part 71A of the first magnet 130 may be longer than the length K2 of the long side of the second magnet part 71B. When K1 is longer than K2, electromagnetic force caused by interaction between the first coil 120 and the first magnet part 71A may be improved, and accordingly, AF driving force may be improved.

The length K2 of the long side of the second magnet part 71B may be different from the length K3 of the long side of the second coil 230. In an example, the length K2 of the long side of the second magnet part 71B may be longer than the length K3 of the long side of the second coil 230. In another embodiment, the length of the long side of the second magnet part 71B may be equal to or shorter than the length of the long side of the second coil 230.

In an example, one end of each of the first magnet part 71A and the second magnet part 71B may be located inside the second coil 230, and the other end of each of the first magnet part 71A and the second magnet part 71B may be located outside the second coil 230. In another embodiment, one end and the other end of each of the first magnet part 71A and the second magnet part 71B may be located outside the second coil 230.

Each of the first magnet part 71A and the second magnet part 71B may include a first portion that overlaps the second coil 230 in the first direction or the optical-axis direction. In addition, each of the first magnet part 71A and the second magnet part 71B may include a second portion that does not overlap the second coil 230 in the first direction or the optical-axis direction.

When viewed in the first direction or from above, the length K4 of the long side of the second magnet 24 may be different from the length K3 of the long side of the second coil 230. In an example, when viewed in the first direction or from above, the length K4 of the long side of the second magnet 24 may be longer than the length K3 of the long side of the second coil 230. In another embodiment, the length of the long side of the second magnet 24 may be equal to or shorter than the length of the long side of the second coil 230.

In an example, one end of the second magnet 24 may be located inside the second coil 230, and the other end of the second magnet 24 may be located outside the second coil 230. In an example, the second magnet 24 may include a first portion that overlaps the second coil 230 in the first direction or the optical-axis direction. In addition, the second magnet 24 may include a second portion that does not overlap the second coil 230 in the first direction or the optical-axis direction.

In an example, when viewed in the first direction or from above, the length K5 of the yoke 410 in the longitudinal direction of the long side of the second magnet 24 may be longer than the length K4 of the long side of the second magnet 24. In another embodiment, K5 may be equal to or shorter than K4.

Figure 31C:
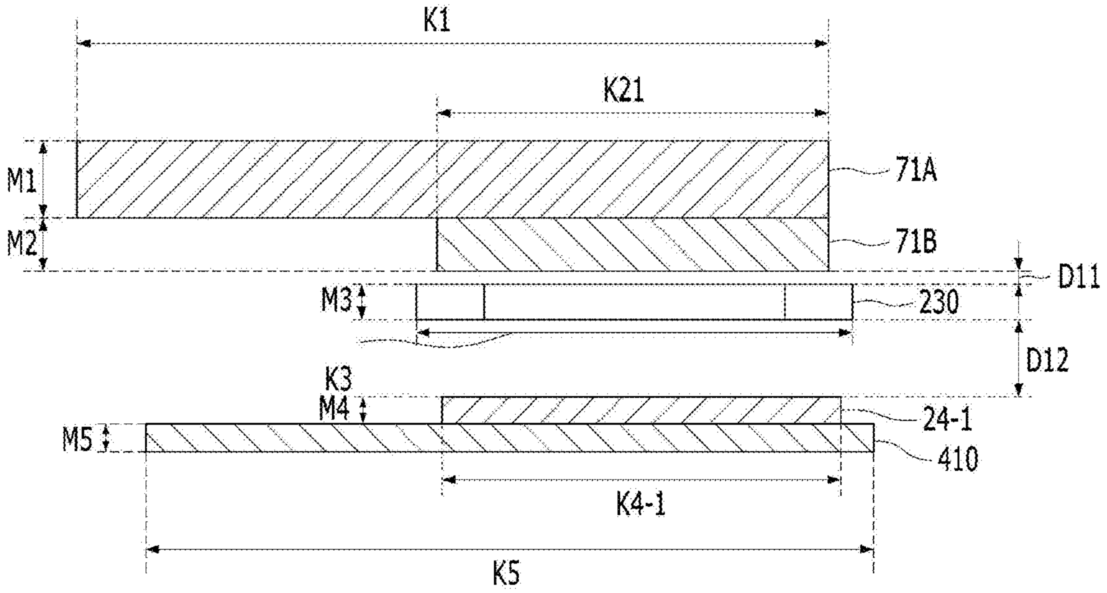
FIG. 31C illustrates another embodiment of the length of the long side of each of the second magnet part and the second magnet shown in FIG. 31B.

FIG. 31C illustrates another embodiment of the length of the long side of each of the second magnet part 71B and the second magnet 24 shown in FIG. 31B.

Referring to FIG. 31C, the length K21 of the long side of the second magnet part 71B may be shorter than the length K3 of the long side of the second coil 230. In an example, when viewed in the first direction or from above, one end and the other end of the second magnet part 71B may be located inside the second coil 230.

In addition, the length K4-1 of the long side of the second magnet 24 may be shorter than the length K3 of the long side of the second coil 230. In an example, when viewed in the first direction or from above, one end and the other end of the second magnet 24 may be located inside the second coil 230.

In another embodiment, the length of the long side of the first magnet part 71A may be shorter than the length of the long side of the second coil 230. In addition, when viewed in the first direction or from above, one end and the other end of the first magnet part 71A may be located inside the second coil 230.

FIGS. 31B and 31C may be cross-sectional views taken in a direction parallel to the long side of the first magnet 130. The description given with reference to FIGS. 31B and 31C may be equally or similarly applied to FIGS. 30A to 30F and 31A.

The camera device 10 may further include a separate yoke in order to increase or improve electromagnetic force for AF operation and electromagnetic force for OIS operation.

Figure 32A:
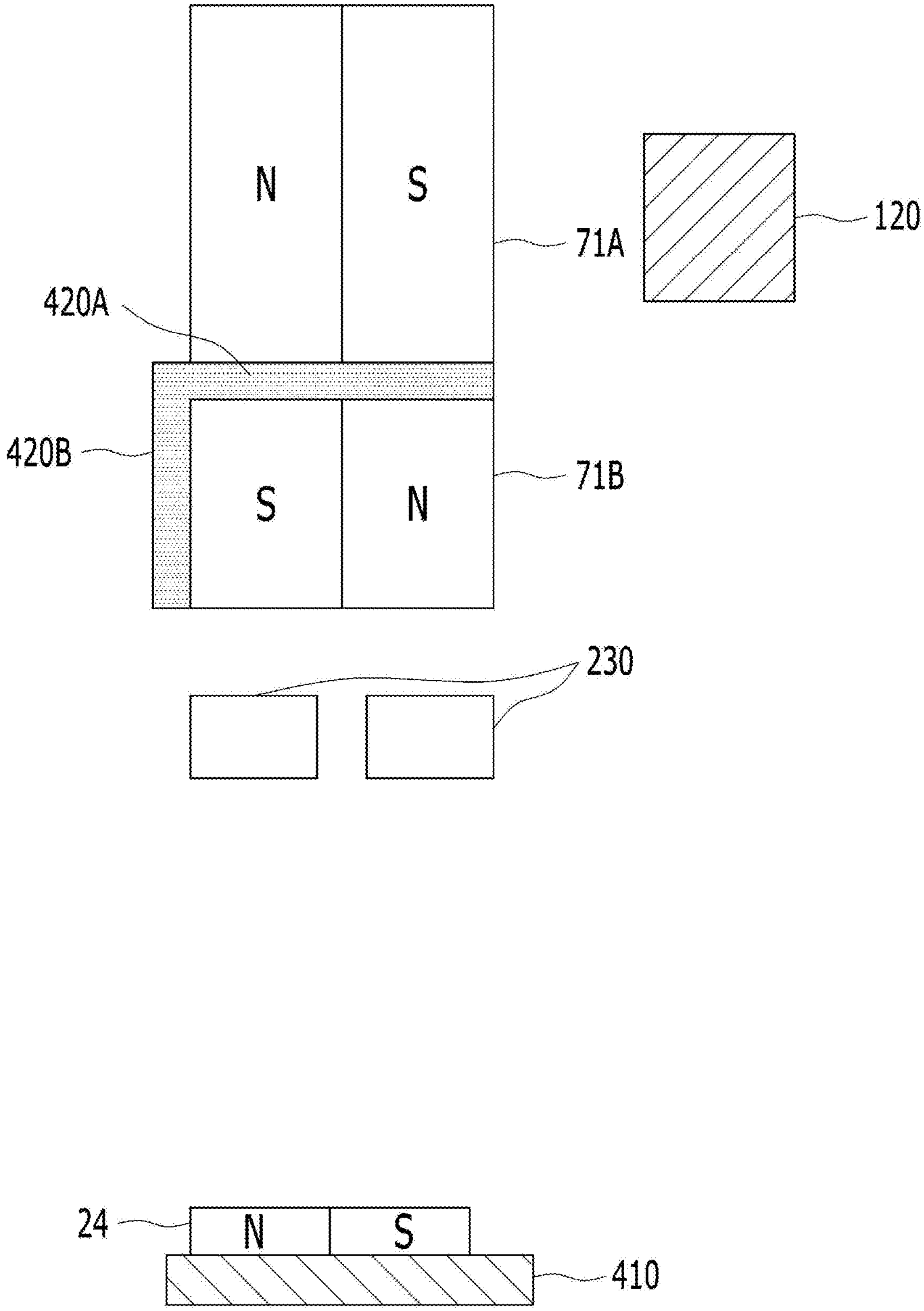
FIG. 32A illustrates another embodiment of FIG. 30E.

FIG. 32A illustrates another embodiment of FIG. 30E.

Referring to FIG. 32A, the camera device 10 may include a yoke 420B disposed on at least one of the side surfaces of the second magnet part 71B.

At the initial position of the bobbin 110, the yoke 420B may not overlap the first coil 120 in a direction perpendicular to the optical-axis direction. Alternatively, in an example, when the bobbin 110 is moved, at least a portion of the yoke 420B may overlap the first coil 120 in a direction perpendicular to the optical-axis direction.

In an example, the yoke 420B may be disposed on at least one of the long side surface or the short side surface of the second magnet part 71B. In an example, the yoke 420B may be in contact with at least one of the long side surface or the short side surface of the second magnet part 71B.

The yoke 420B may be in contact with the yoke 420A described with reference to FIG. 30E. In another embodiment, the yoke 420B may be spaced apart from the yoke 420A described with reference to FIG. 30E.

In an example, the yoke 420B may be disposed on the long side surface of the second magnet part 71B. In an example, the yoke 420B may be disposed on the second long side surface among the first long side surface and the second long side surface. In this case, the first long side surface may be closer to the first coil 120 than the second long side surface, and the first long side surface and the second long side surface may be located opposite each other. At least one of electromagnetic force caused by interaction between the first magnet 130 and the first coil or electromagnetic force caused by interaction between the first magnet 130 and the second coil 230 may be increased or improved by the yoke 420B.

The yoke 420B shown in FIG. 32A may be equally or similarly applied to the embodiments shown in FIGS. 30A to 30D and 31A to 31C.

Figure 32B:
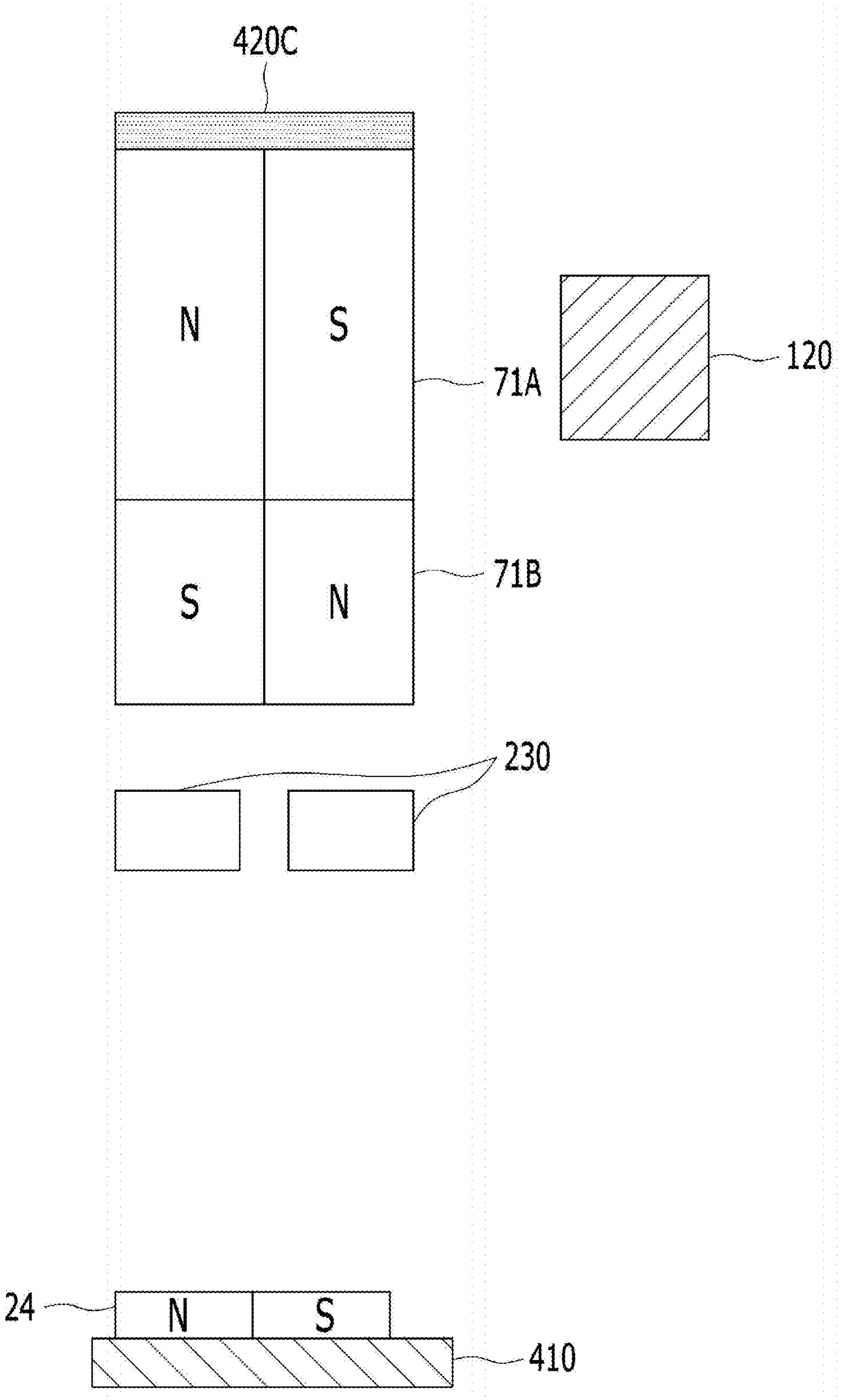
FIG. 32B illustrates another embodiment of FIG. 30C.

FIG. 32B illustrates another embodiment of FIG. 30C.

Referring to FIG. 32B, the camera device 10 may include a yoke 420C disposed on the upper surface of the first magnet part 71A.

At least a portion of the yoke 420C may correspond to, face, or overlap the first magnet 130 and the second coil 230 in the optical-axis direction.

In an example, the yoke 420C may be disposed on the upper surfaces of the N pole and the S pole of the first magnet part 71A. In an example, the yoke 420C may be in contact with the upper surface of the first magnet part 71A. At least one of electromagnetic force caused by interaction between the first magnet 130 and the first coil or electromagnetic force caused by interaction between the first magnet 130 and the second coil 230 may be increased or improved by the yoke 420C.

Figure 32C:
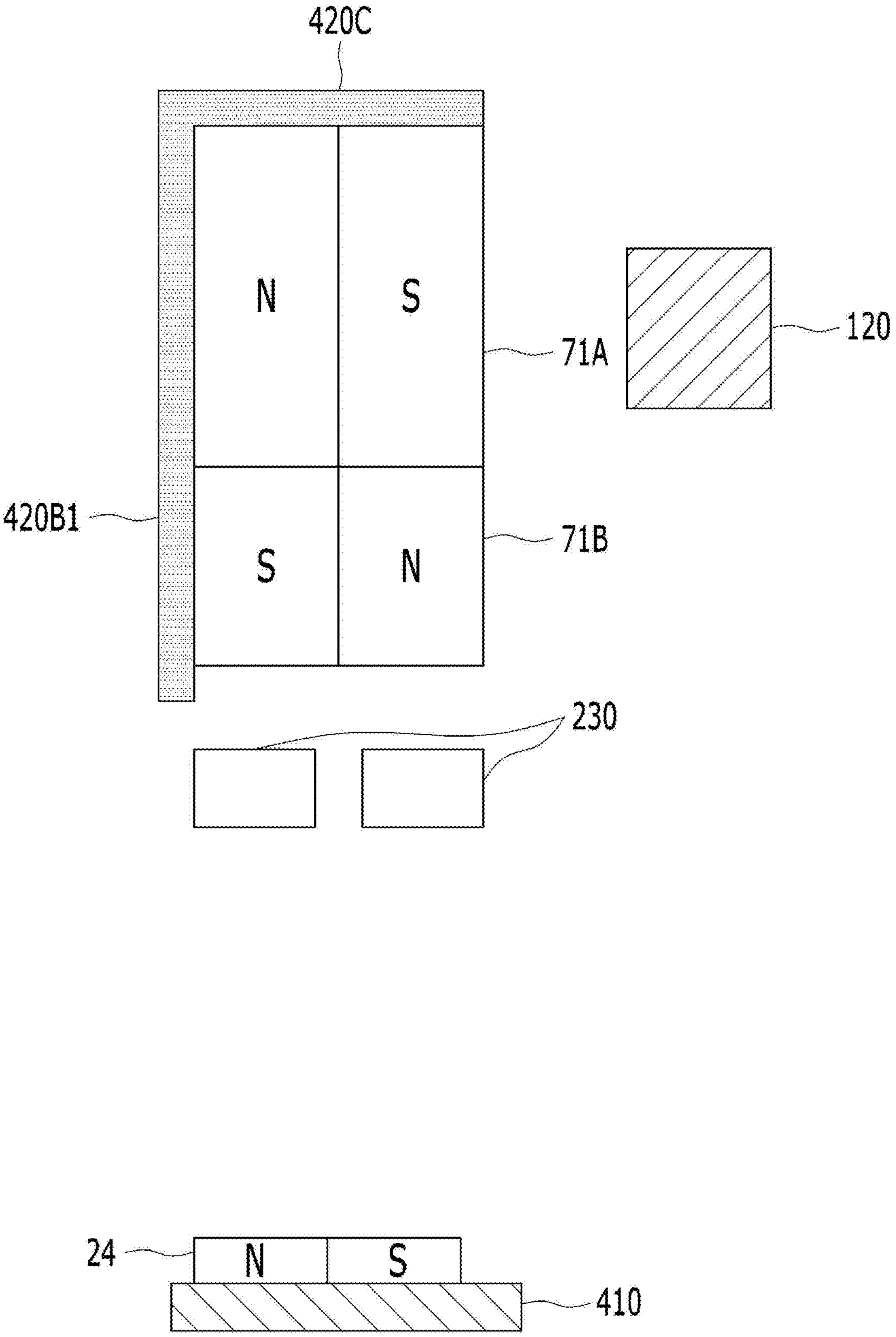
FIG. 32C illustrates another embodiment of FIG. 32B.

FIG. 32C illustrates another embodiment of FIG. 32B.

Referring to FIG. 32C, the camera device 10 may include a yoke 420B1 disposed on the side surface of at least one of the first magnet part 71A or the second magnet part 71B.

At least a portion of the yoke 420B1 may correspond to, face, or overlap the first coil 120 in a direction perpendicular to the optical-axis direction.

In an example, the yoke 420B1 may be disposed on the side surface of the N pole or the S pole of the first magnet part 71A. In addition, the yoke 420B1 may be disposed on the side surface of the N pole or the S pole of the second magnet part 72A.

In an example, the yoke 420B1 may be disposed on at least one of the long side surface or the short side surface of the first magnet part 71A, and may be in contact with at least one of the long side surface or the short side surface of the first magnet part 71A. In addition, in an example, the yoke 420B1 may be disposed on at least one of the long side surface or the short side surface of the second magnet part 71B, and may be in contact with at least one of the long side surface or the short side surface of the second magnet part 71B.

In an example, the yoke 420B1 may be disposed on the long side surface of the first magnet part 71A and the long side surface of the second magnet part 71B. In an example, the yoke 420B1 may be disposed on the second long side surface among the first long side surface and the second long side surface of the first magnet part 71A, and may be disposed on the fourth long side surface among the third long side surface and the fourth long side surface of the second magnet part 71B. In this case, the first long side surface may be closer to the first coil 120 than the second long side surface, and the first long side surface and the second long side surface may be located opposite each other. In addition, the third long side surface may be closer to the first coil 120 than the fourth long side surface, and the third long side surface and the fourth long side surface may be located opposite each other.

At least one of electromagnetic force caused by interaction between the first magnet 130 and the first coil or electromagnetic force caused by interaction between the first magnet 130 and the second coil 230 may be increased or improved by the yoke 420B1.

The yoke 420B1 may be in contact with the yoke 420A described with reference to FIG. 32B. In another embodiment, the yoke 420B1 may be spaced apart from the yoke 420A described with reference to FIG. 32B.

The yokes 420C and 420B1 shown in FIGS. 32B and 32C may be equally or similarly applied to the embodiments shown in FIGS. 30A to 30F, 31A to 31C, and 32A.

Figure 33:
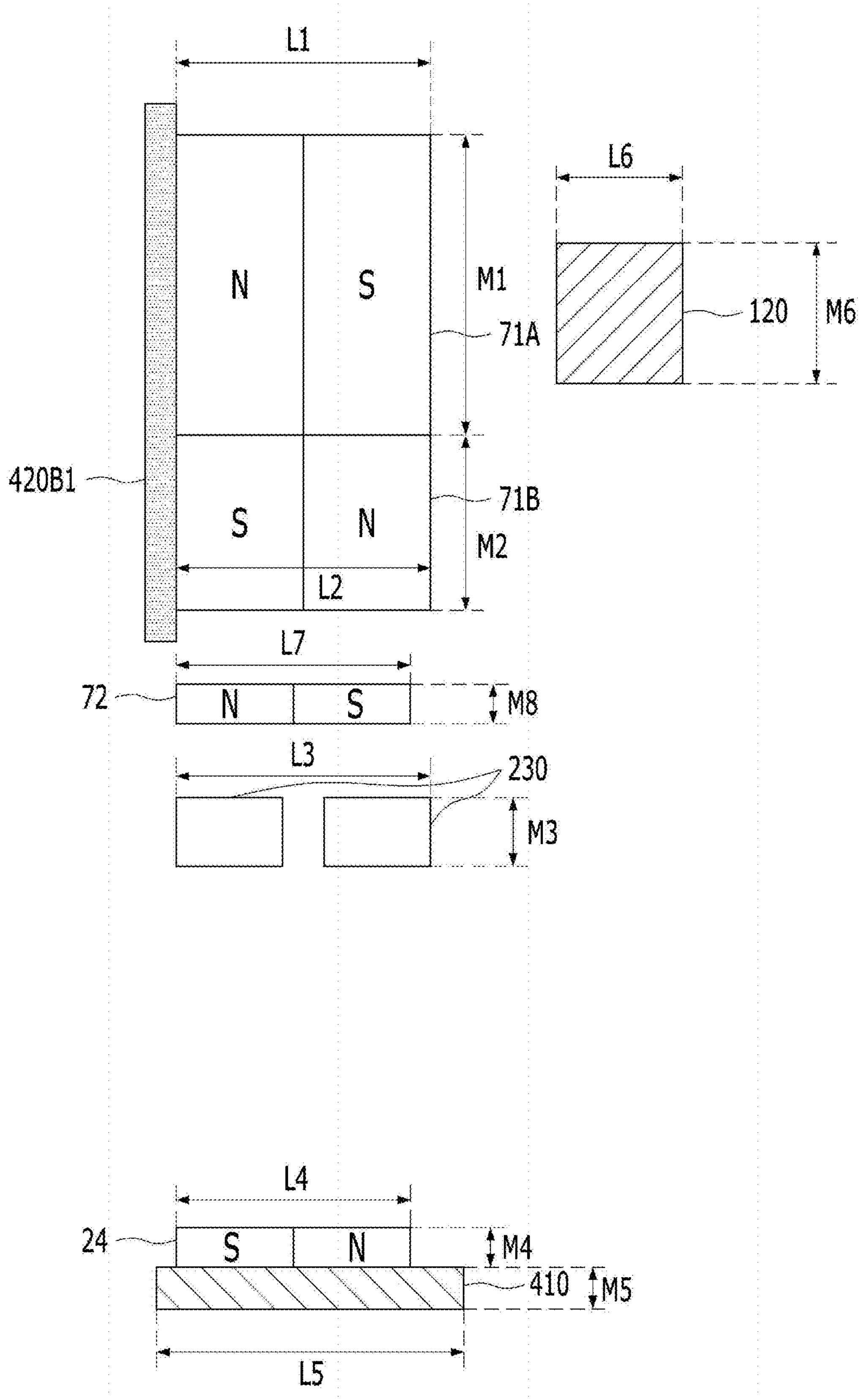
FIG. 33 illustrates placement of a third magnet according to another embodiment of FIG. 26.

FIG. 33 illustrates placement of a third magnet 72 according to another embodiment of FIG. 26.

Referring to FIG. 33, a camera device 10-1 may further include a third magnet 72 disposed between the first magnet 130 and the second coil 230 in order to increase OIS driving force.

The third magnet 72 may be disposed on the fixed unit. In an example, the third magnet 72 may be disposed in the housing 140, and may be disposed below the first magnet 130. In an example, the third magnet 72 may be spaced apart from the first magnet. In another embodiment, the third magnet 72 may be in contact with the first magnet 130. In an example, the upper surface of the third magnet 72 may be in contact with the lower surface of the first magnet 130.

The third magnet 72 may include magnet units corresponding to the magnet units 130-1 to 130-4 of the first magnet 130. Each of the magnet units of the third magnet 72 may correspond to, face, or overlap a corresponding one of the magnet units 130-1 to 130-4 of the first magnet 130 in the first direction (or the optical-axis direction).

In an example, the third magnet 72 may be a monopolar-magnetized magnet including one N pole and one S pole. In another embodiment, the third magnet 72 may be a bipolar-magnetized magnet including two N poles and two S poles.

The N pole of the third magnet 72 may face the S pole of the first magnet 130 (e.g., the second magnet part 71B) in the first direction (or the optical-axis direction), and the S pole of the third magnet 72 may face the N pole of the first magnet 130 (e.g., the second magnet part 71B) in the first direction (or the optical-axis direction).

When viewed in the first direction or from above, the length L7 of the short side of the third magnet 72 may be shorter than the length L3 of the short side of the second coil 230. In another embodiment, the length L7 of the short side of the third magnet 72 may be longer than or equal to the length L3 of the short side of the second coil 230.

When viewed in the first direction or from above, the length L7 of the short side of the third magnet 72 may be shorter than the length L1 of the short side of the first magnet 130. In another embodiment, the length L7 of the short side of the third magnet 72 may be longer than or equal to the length L1 of the short side of the first magnet 130.

In an example, the length L7 of the short side of the third magnet 72 may be equal to the length L4 of the short side of the second magnet 24. In addition, the length M8 of the third magnet 72 in the first direction (or the optical-axis direction) may be equal to the length of the second magnet 24 in the first direction (or the optical-axis direction). The description of the length of the short side of the second magnet 24 and the length thereof in the first direction may be equally or similarly applied to the third magnet 72. In another embodiment, L7 may be longer or shorter than L4.

When viewed in the first direction or from above, the length of the long side of the third magnet 72 may be equal to the length of the long side of the second magnet 24, and the description of the length K4 of the long side of the second magnet 24 shown in FIGS. 31B and 31C may be equally or similarly applied to the third magnet 72.

The third magnet 72 shown in FIG. 33 may be equally or similarly applied to FIGS. 30A to 32C. In addition, in another embodiment, the second magnet 24 may be omitted from FIG. 33.

In FIG. 33, OIS driving force for moving the OIS moving unit may include electromagnetic force caused by interaction between the second coil 230 and each of the first magnet 130, the second magnet 24, and the third magnet 72.

Therefore, the embodiment shown in FIG. 33 may increase electromagnetic force for OIS operation.

In the embodiment, electromagnetic force caused by interaction with the second coil 230 may be improved using the first magnet 130 and the second magnet 24, OIS driving force or electromagnetic force for OIS operation may be improved, and increase in power consumption may be inhibited.

In addition, in the embodiment, electromagnetic force caused by interaction between the second coil 230 and the second magnet 24 and/or electromagnetic force caused by interaction between the second coil 230 and the first magnet 130 may be improved using the yoke 410, and accordingly, increase in power consumption may be inhibited.

In addition, in the embodiment, electromagnetic force for AF operation may be improved by the metallic cover member 300A having the protruding portion 305A that functions as a yoke, whereby increase in power consumption may be inhibited.

In addition, electromagnetic force for AF operation caused by interaction between the first coil 120 and the first magnet 130 may be improved due to various types of yokes 420A, 420B, 420C, and 420B1 disposed on the first magnet 130, as shown in FIGS. 30E and 32A to 32C. In addition, electromagnetic force for OIS operation caused by interaction between the second coil 120 and the first magnet 130 may be improved due to the yokes 420A, 420B, 420C, and 420B1.

In addition, the camera device according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission. For example, the optical instrument according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

Figure 34:
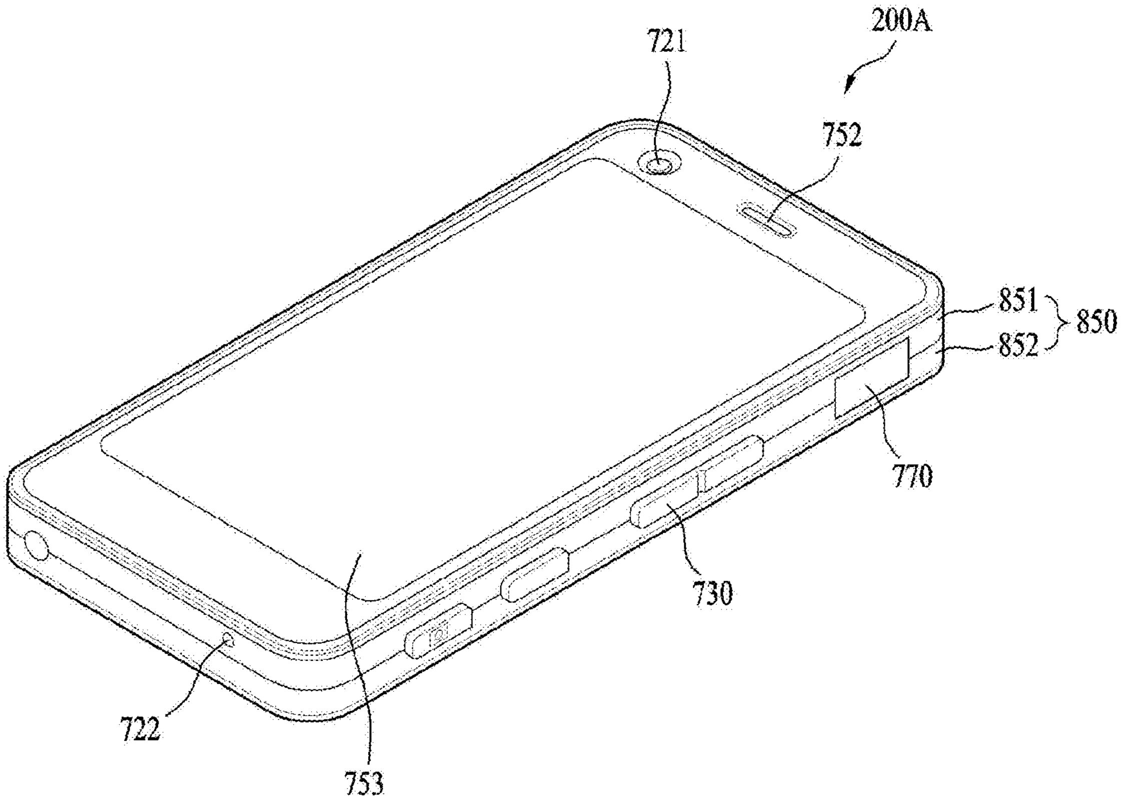
FIG. 34 is a perspective view of an optical instrument according to an embodiment.
Figure 35:
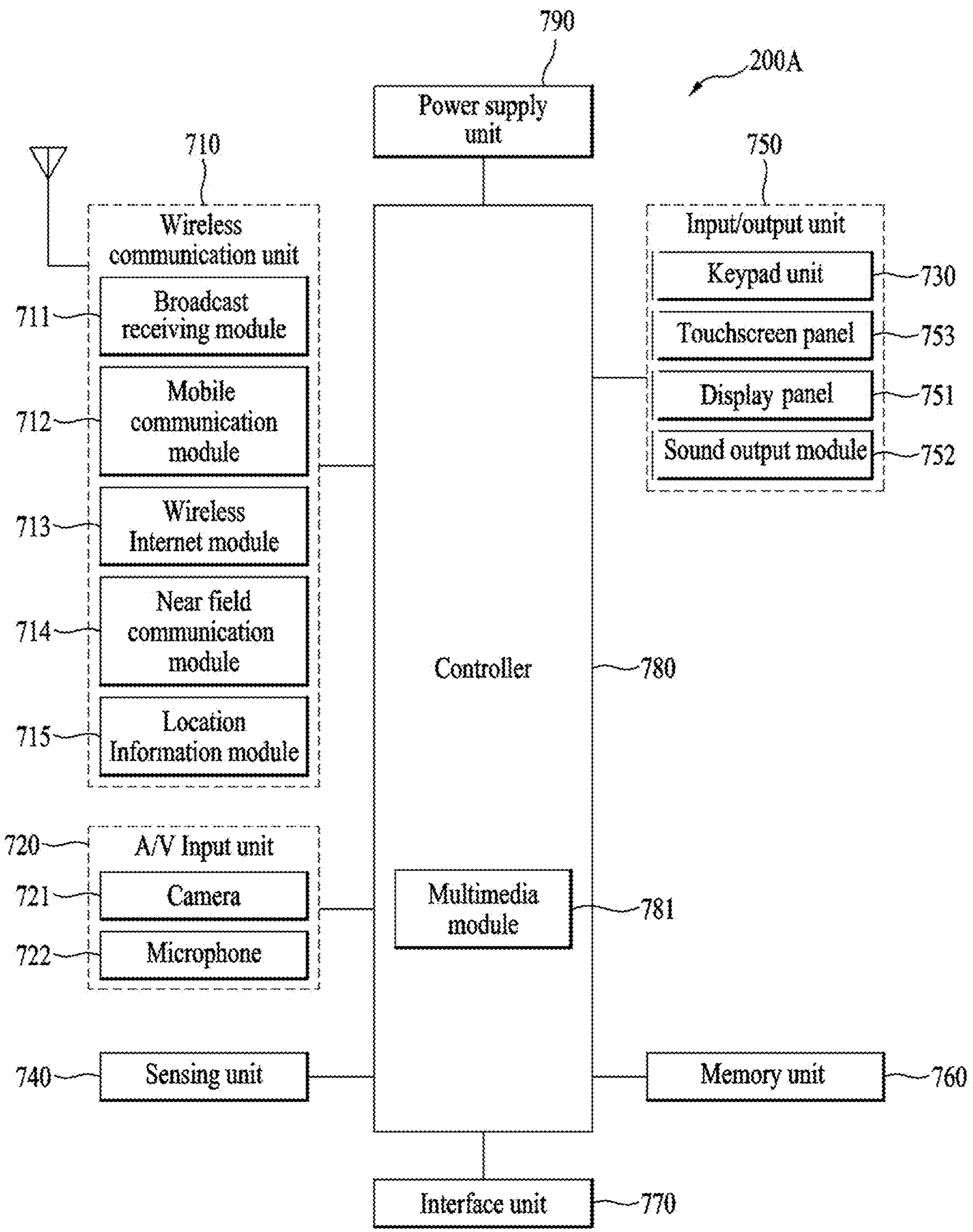
FIG. 35 is a configuration diagram of the optical instrument shown in FIG. 34.

FIG. 34 is a perspective view of an optical instrument 200A according to an embodiment, and FIG. 35 is a configuration diagram of the optical instrument 200A shown in FIG. 34.

Referring to FIGS. 34 and 35, the optical instrument 200A may include a body 850, a wireless communication unit 710, an A/V input unit 720, a sensing unit 740, an input/output unit 750, a memory 760, an interface unit 770, a controller 780, and a power supply unit 790.

The body 850 shown in FIG. 34 may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. In an example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the optical instrument 200A and a wireless communication system or between the optical instrument 200A and a network in which the optical instrument 200A is located. In an example, the wireless communication unit 710 may include a broadcast receiving module 711, a mobile communication module 712, a wireless Internet module 713, a nearfield communication module 714, and a location information module 715.

The audio/video (A/V) input unit 720 serves to input audio signals or video signals, and may include a camera 721 and a microphone 722.

The camera 721 may include the camera device according to the embodiment.

The sensing unit 740 may sense the current state of the optical instrument 200A, such as the open or closed state of the optical instrument 200A, the position of the optical instrument 200A, the presence or absence of a user's touch, the orientation of the optical instrument 200A, or the acceleration/deceleration of the optical instrument 200A, and may generate a sensing signal to control the operation of the optical instrument 200A. For example, when the optical instrument 200A is a slide-type phone, whether the slide-type phone is open or closed may be detected. In addition, the sensor serves to sense whether power is supplied from the power supply unit 790 or whether the interface unit 770 is coupled to an external device.

The input/output unit 750 serves to generate visual, audible, or tactile input or output. The input/output unit 750 may generate input data to control the operation of the optical instrument 200A, and may display information processed in the optical instrument 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. In an example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal receiving mode, a call mode, a recording mode, a voice recognition mode, or a broadcast receiving mode, or may output audio data stored in the memory 760.

The touchscreen panel 753 may convert variation in capacitance, caused by a user's touch on a specific region of a touchscreen, into electrical input signals.

The memory 760 may store programs for the processing and control of the controller 780, and may temporarily store input/output data (e.g., a phone book, messages, audio, still images, pictures, and moving images). For example, the memory 760 may store images captured by the camera 721, for example, pictures or moving images.

The interface unit 770 serves as a passage for connection between the optical instrument 200A and an external device. The interface unit 770 may receive data or power from the external device, and may transmit the same to respective components inside the optical instrument 200A, or may transmit data inside the optical instrument 200A to the external device.

For example, the interface unit 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the overall operation of the optical instrument 200A. For example, the controller 780 may perform control and processing related to voice calls, data communication, and video calls.

The controller 780 may include a multimedia module 781 for multimedia playback. The multimedia module 781 may be provided inside the controller 180, or may be provided separately from the controller 780.

The controller 780 may perform pattern recognition processing, by which writing or drawing input to the touch-screen is perceived as characters or images.

The power supply unit 790 may supply power required to operate the respective components upon receiving external power or internal power under the control of the controller 780.

The features, structures, effects, and the like described above in the embodiments are included in at least one embodiment of the present disclosure, but are not necessarily limited to only one embodiment.

Furthermore, the features, structures, effects, and the like exemplified in the respective embodiments may be combined with other embodiments or modified by those skilled in the art.

Therefore, content related to such combinations and modifications should be construed as falling within the scope of the present disclosure.

INDUSTRIAL APPLICABILITY

Embodiments may be used for a camera device capable of improving electromagnetic force for AF operation and electromagnetic force for OIS operation and an optical instrument including the same.

The invention claimed is:

1. A camera device comprising:
- a fixed unit;
- a first magnet disposed on the fixed unit;
- a first moving unit comprising a first coil, the first moving unit being configured to be moved in an optical-axis direction by interaction between the first magnet and the first coil;
- a second moving unit comprising a first board unit disposed so as to be spaced apart from the fixed unit, a second coil facing the first magnet in the optical-axis direction, and an image sensor disposed on the first board unit; and
- a first yoke disposed on the fixed unit so as to be opposite to the first magnet in the optical-axis direction,
- wherein the second moving unit is moved in a direction perpendicular to the optical-axis direction by interaction between the first magnet and the second coil,
- wherein the first magnet includes a first magnet part and a second magnet part spaced apart from each other in the optical-axis direction,
- wherein a length of the first magnet part of the first magnet is greater than a length of the second magnet part of the first magnet in the optical-axis direction,
- wherein a spacing distance between the second coil and the first yoke in the optical-axis direction is longer than a spacing distance between the first magnet and the second coil in the optical-axis direction, and
- wherein the spacing distance between the first magnet and the second coil in the optical-axis direction is shorter than a spacing distance between the first magnet and the first yoke in the optical-axis direction.

2. The camera device according to claim 1, wherein the first magnet is disposed above the second coil, and the first yoke is disposed below the second coil.

3. The camera device according to claim 1,
- wherein the first magnet part comprises a first N pole and a first S pole; and
- wherein the second magnet part comprises a second N pole and a second S pole, the second magnet part being disposed under the first magnet part.

4. The camera device according to claim 3, comprising a partition wall disposed between the first magnet part and the second magnet part,
- wherein the partition wall is a neutral zone.

5. The camera device according to claim 3, wherein a length of the first magnet part of the first magnet is greater than a length of the second magnet part of the first magnet in the direction perpendicular to the optical-axis direction.

6. The camera device according to claim 3, wherein the first N pole is in contact with the second S pole, and the first S pole is in contact with the second N pole.

7. The camera device according to claim 3, comprising a second yoke disposed between the first magnet part and the second magnet part.

8. The camera device according to claim 1, comprising a third yoke disposed on a side surface of the first magnet.

9. The camera device according to claim 1, comprising a fourth yoke disposed on an upper surface of the first magnet.

10. The camera device according to claim 1, wherein the first yoke is a magnetic body.

11. The camera device according to claim 3, comprising a fifth yoke disposed on a side surface of at least one of the first magnet part and the second magnet part.

12. The camera device according to claim 1, wherein the first yoke overlaps at least a portion of the first magnet in the optical-axis direction.

13. The camera device according to claim 1, wherein the fixed unit comprises:
- a second board unit disposed so as to be spaced apart from the first board unit; and
- a support board conductively connecting the first board unit to the second board unit.

14. The camera device according to claim 13, wherein the first yoke is disposed between the second coil and the second board unit.

15. The camera device according to claim 13, wherein the first yoke is disposed on an upper surface of the second board unit.

16. A camera device comprising:
- a fixed unit;
- a first magnet and a yoke disposed on the fixed unit so as to be spaced apart from each other;
- a first moving unit comprising a first coil facing the first magnet in a direction perpendicular to an optical-axis direction; and
- a second moving unit comprising a first board unit disposed so as to be spaced apart from the fixed unit, an image sensor disposed on the first board unit, and a second coil facing the first magnet in the optical-axis direction,
- wherein the second coil is disposed between the first magnet and the yoke and moves the second moving unit in a direction perpendicular to the optical-axis direction by an interaction with the first magnet,
- wherein the first magnet includes a first magnet part and a second magnet part spaced apart from each other in the optical-axis direction, wherein a length of the first magnet part of the first magnet is greater than a length of the second magnet part of the first magnet in the optical-axis direction, wherein a spacing distance between the second coil and the yoke in the optical-axis direction is longer than a spacing distance between the first magnet and the second coil in the optical-axis direction, and wherein the spacing distance between the first magnet and the second coil in the optical-axis direction is shorter than a spacing distance between the first magnet and the yoke in the optical-axis direction.

17. The camera device according to claim 16, comprising a second magnet disposed on the fixed unit so as to be opposite to the second coil in the optical-axis direction, and wherein the first magnet is disposed above the second coil and the second magnet is disposed under the second coil.

18. A camera device comprising:

a fixed unit comprising a cover member, a first magnet, and a yoke disposed in the cover member;

a first moving unit comprising a bobbin disposed in the cover member and a first coil disposed on the bobbin and the first moving unit being configured to be moved in an optical-axis direction; and a second moving unit comprising a first board unit disposed so as to be spaced apart from the fixed unit, a second coil facing the first magnet, and an image sensor disposed on the first board unit, the second moving unit being configured to be moved in a direction perpendicular to the optical-axis direction by interaction between the first magnet and the second coil, wherein the cover member comprises a protruding portion protruding therefrom toward the bobbin, and at least part of the protruding portion overlaps the first magnet in a direction perpendicular to the optical-axis direction, wherein the first magnet includes a first magnet part and a second magnet part spaced apart from each other in the optical-axis direction, wherein a length of the first magnet part of the first magnet is greater than a length of the second magnet part of the first magnet in the optical-axis direction, wherein a spacing distance between the second coil and the yoke in the optical-axis direction is longer than a spacing distance between the first magnet and the second coil in the optical-axis direction, and wherein the spacing distance between the first magnet and the second coil in the optical-axis direction is shorter than a spacing distance between the first magnet and the yoke in the optical-axis direction.

19. The camera device according to claim 18, wherein the protruding portion is formed of a metallic material or a magnetic material.

* * * * *